US012267374B2

(12) United States Patent
Al-Dahleh et al.

(10) Patent No.: US 12,267,374 B2
(45) Date of Patent: Apr. 1, 2025

(54) INTERCOMMUNICATION SYSTEM

(71) Applicant: Palomar Products, Inc., Rancho Santa Margarita, CA (US)

(72) Inventors: Iad Al-Dahleh, Rancho Santa Margarita, CA (US); Pierre Charbonneau, Ladera Ranch, CA (US); Scott Coleman, Irvine, CA (US)

(73) Assignee: Palomar Products, Inc., Rancho Santa Margarita, CA (US)

( * ) Notice: Subject to any disclaimer, the term of this patent is extended or adjusted under 35 U.S.C. 154(b) by 165 days.

(21) Appl. No.: 17/721,430

(22) Filed: Apr. 15, 2022

(65) Prior Publication Data
US 2022/0337651 A1 Oct. 20, 2022

Related U.S. Application Data

(60) Provisional application No. 63/175,203, filed on Apr. 15, 2021.

(51) Int. Cl.
*G06F 15/16* (2006.01)
*G06F 3/0482* (2013.01)
*G06F 3/16* (2006.01)
*G10L 19/16* (2013.01)
*H04L 65/611* (2022.01)

(52) U.S. Cl.
CPC .......... *H04L 65/611* (2022.05); *G06F 3/0482* (2013.01); *G06F 3/162* (2013.01); *G06F 3/165* (2013.01); *G10L 19/167* (2013.01)

(58) Field of Classification Search
CPC ...... H04L 65/611; G06F 3/0482; G06F 3/162; G06F 3/165; G10L 19/167
See application file for complete search history.

(56) References Cited

U.S. PATENT DOCUMENTS

| | | | | |
|---|---|---|---|---|
| 6,611,537 | B1* | 8/2003 | Edens | H04N 21/4363 375/E7.274 |
| 8,131,389 | B1* | 3/2012 | Hardwick | G11B 27/002 700/94 |
| 2002/0124097 | A1* | 9/2002 | Isely | H04L 12/2838 709/246 |

(Continued)

OTHER PUBLICATIONS

Palomar Products et al., "Palomar SCS 3.0 Secure Communication System", Sep. 30, 2019, XP055938887, Retrieved from the Internet: URL: https://www.palomar.com/wp-content/uploads/2019/09/Palomar-SCS-3_0-page-format_Final.pdf [retrieved on Jul. 5, 2022], the whole document.

(Continued)

*Primary Examiner* — Oleg Survillo
(74) *Attorney, Agent, or Firm* — Tucker Ellis LLP

(57) ABSTRACT

An intercommunication system includes one or more modular units utilizing a standards-based audio-over-IP configuration. The modularity of the system provides improved scalability. For instance, a number of audio channels is not limited by physical constraints (e.g. number and type of ports) of a central switch. Accordingly, the addition of audio channels may not require swapping one central switch for a larger switch. Moreover, security applications may be layered onto the standards-based audio-over-IP configuration to implement security requirements often found with intercommunications systems.

19 Claims, 44 Drawing Sheets

(56) References Cited

U.S. PATENT DOCUMENTS

| | | | | |
|---|---|---|---|---|
| 2003/0008616 A1* | 1/2003 | Anderson | ............ | H04B 1/1646 |
| | | | | 455/45 |
| 2004/0044742 A1* | 3/2004 | Evron | ..................... | G06F 16/40 |
| | | | | 709/217 |
| 2004/0098745 A1* | 5/2004 | Marston | ................. | H04N 7/106 |
| | | | | 348/E7.071 |
| 2005/0105052 A1* | 5/2005 | McCormick | ........... | G03B 31/02 |
| | | | | 352/40 |
| 2005/0159833 A1* | 7/2005 | Giaimo | ................... | A63F 13/30 |
| | | | | 704/E15.045 |
| 2005/0262217 A1* | 11/2005 | Nonaka | ............ | H04N 21/43622 |
| | | | | 348/E7.071 |
| 2007/0142944 A1* | 6/2007 | Goldberg | ............. | G10H 1/0025 |
| | | | | 700/94 |
| 2008/0310609 A1 | 12/2008 | Brady, Jr. et al. | | |
| 2011/0206211 A1 | 8/2011 | Dahan et al. | | |
| 2014/0363059 A1* | 12/2014 | Hurewitz | ........... | G06Q 30/0201 |
| | | | | 382/118 |
| 2017/0195987 A1* | 7/2017 | Zarifi | .................... | H04W 68/02 |

OTHER PUBLICATIONS

International Search Report of corresponding International Application No. PCT/US2022/024944, dated Jul. 22, 2022, 3 pages.
Written Opinion of corresponding International Application No. PCT/US2022/024944, dated Jul. 22, 2022, 5 pages.

* cited by examiner

INTERCOMMUNICATION SYSTEM

CROSS-REFERENCE TO RELATED APPLICATIONS

This application is a non-provisional of and claims priority to U.S. Provisional Patent Application No. 63/175,203, filed on Apr. 15, 2021. The entirety of the aforementioned application is incorporated herein by reference.

BACKGROUND

An intercommunication system (ICS), commonly employed in aircraft or ships, distributes routes and/or distributes to and/or from crewmembers, radio sources, intercoms, or other systems (e.g. altimeter warning system, radar warning receiver (RWR), missile warning system (MWS), etc.). Conventional ICS may employ proprietary protocols with a centralized switch responsible for conferencing and routing decisions with respect to a plurality of audio channels. Further, such ICS may include one or more crew units to enable crewmembers to select one or more channels to monitor and/or select an audio channel on which to transmit

BRIEF SUMMARY OF THE INVENTION

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of the summary is to present some concepts related to some exemplary non-limiting embodiments in a simplified form as a prelude to the more detailed description of the various embodiments that follow.

According to various, non-limiting implementations, an intercommunication system includes one or more modular units utilizing a standards-based audio-over-IP configuration. The modularity of the system provides improved scalability. For instance, a number of audio channels is not limited by physical constraints (e.g. number and type of ports) of a central switch. Accordingly, the addition of audio channels may not require swapping one central switch for a larger switch. Moreover, security applications may be layered onto the standards-based audio-over-IP configuration to implement security requirements often found with intercommunications systems.

These and other embodiments are described in more detail below.

BRIEF DESCRIPTION OF THE DRAWING

Various non-limiting embodiments are further described with reference the accompanying drawings in which.

DETAILED DESCRIPTION OF THE INVENTION

Figure 1:
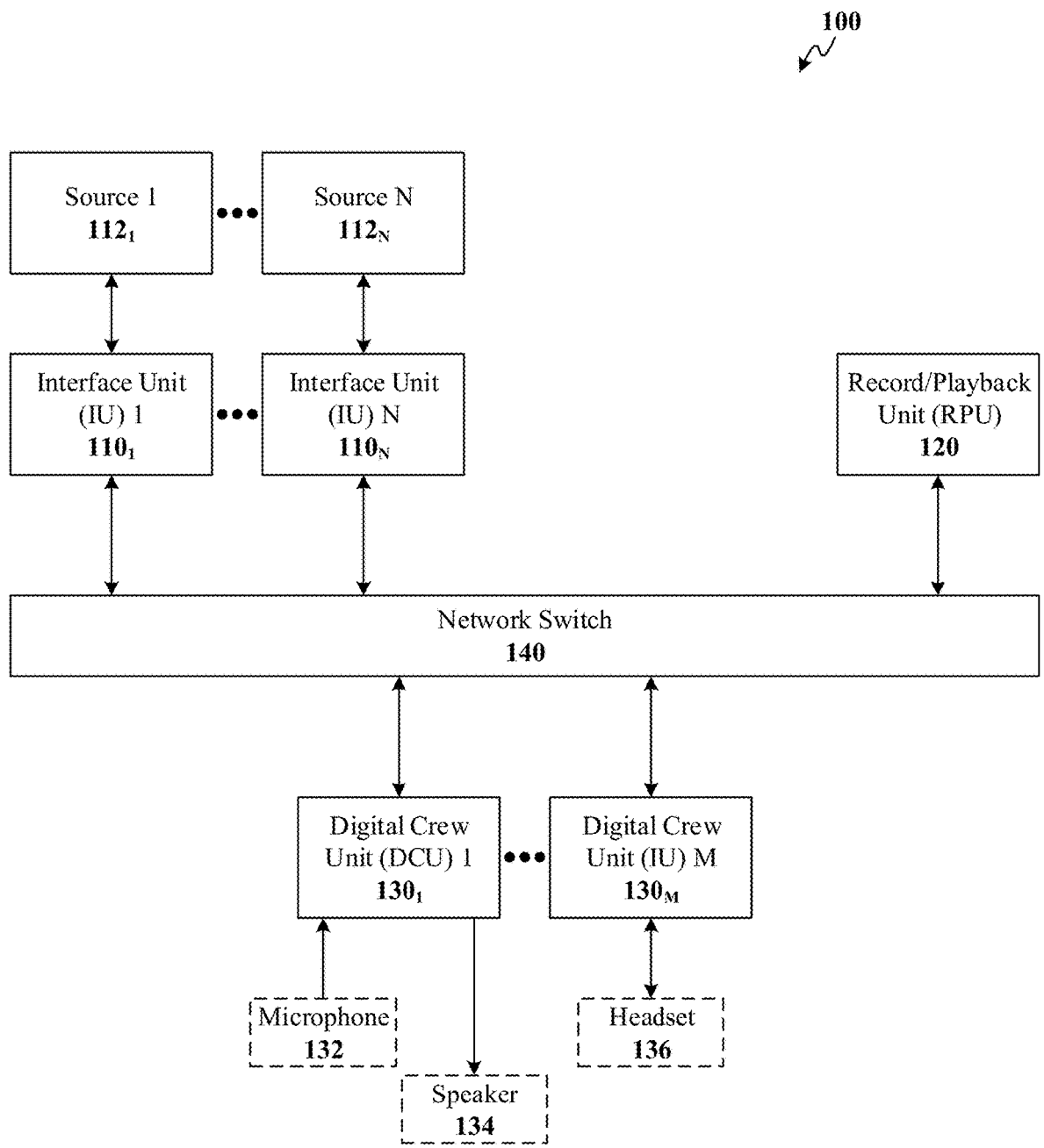
FIG. 1 is a schematic block diagram of an exemplary, non-limiting implementation of an intercommunication system according to one or more aspects.

An intercommunication system described herein utilizes a standards- and IP-based configuration to distribute audio throughout an aircraft or other vehicle (e.g. ships). The intercommunication system utilizes various types of modules, each of which provides an interface between the standards/IP-based aspects and a respective set of functionality. For example, one module may interface with a radio or other baseband audio source. Another module may provide a user interface or control panel to enable a user to interact with the intercommunication system. In addition, some examples may include a module responsible for recording and/or playback of channels of the intercommunication system.

The modularity further provides an intercommunication system that is highly scalable. A total number of channels or streams supported by the intercommunication system is a function of network infrastructure underlying the system. Unlike conventional systems, utilizing a central switch for example, there are no hard-coded limits with the intercommunication system described herein. For instance, if a new radio or baseband audio source is needed, a corresponding interface module is added to the network. If additional bandwidth is needed (e.g. due to addition of new streams), more and/or faster network switches can be installed.

Further, the standards/IP-based approach described herein enables a security configuration to be implemented thereon without extensive modification. A full-featured security suite may be applied to the intercommunication system, thus, reducing certification costs associated with validating security requirements commonly found with intercommunication systems.

In an aspect, an intercommunication system (ICS) described herein may include one or more audio control panels (ACPs), which may include physical and/or virtual control panels and interfaces for one or more microphones and/or headsets. In some implementations, ACPs can be hardwired or wireless. The ICS may also include one or more radio interface units (RIUs), which connect to baseband audio sources and provide a networked interface to other components of the system. RIUs may interface with devices other than radios such as, but not limited to, public address systems, cockpit voice recorders, etc. Further, each audio source or other device may have an associated RIU in the system. Alternatively, an RIU may interface with multiple devices and/or sources. Still further, the ICS may include a record/playback unit (RPU) configured to capture all audio streams on the network and store captured audio on an attached filesystem. Capture and stored audio is available for playback on command and/or downloaded elsewhere for further analysis. In some implementations, the system may also include a mixer unit configured to capture multiple, separate audio streams and combine the streams into a single, composite audio stream. The mixer unit may assist components of the system lacking local mixing functionality.

In exemplary implementations, baseband audio to and from each asset is digitized separately and converted into streams of network packets for distribution. Each stream is multicast throughout the system, which allows any number of authorized listeners to "tune in" to the single instance of the stream, minimizing network bandwidth utilization. Further optimization is achieved using IGMP snooping, which only routes packets from any given stream to the network nodes that have specifically requested to receive that stream. This optimization minimizes network bandwidth utilization and enhances security.

The parameters of each stream are advertised using the Session Announcement Protocol (SAP) and described using the Session Description Protocol (SDP). The audio data itself is transported across the network within Real Time Protocol (RTP) packets. Each stream also has a corresponding control channel running the Real Time Control Protocol (RTCP). RTP and SAP both support authentication and encryption. Only authorized users will be able to access a given audio stream and streams at different security levels will be separated by different encryption keys, possibly of different lengths. Synchronization of the audio sampling clocks is accomplished using Precision Time Protocol (PTP) version 2 (IEEE 1588-2019). Inter-operability with third-party audio processing equipment is accomplished by adherence to the AES67 standard.

According to an exemplary process, when a component in the system begins transmitting an audio stream, an announcement describing the contents of that stream is transmitted to a multicast group using SAP. Other components monitor that group and receive these announcements to become aware of which streams are available. This allows the number of streams to change dynamically during flight, as opposed to being fixed within a configuration file. The system is configurable to enable or disable a particular crew position from accessing a particular audio source. An ACP unit then makes the listing of streams that the user is authorized to access available on that ACP's panel, where the user can then select one or more streams for monitoring. Each ACP also transmits one or more streams corresponding to each operator's microphone audio. For instance, when the user selects an asset for transmit and presses the PTT button, the corresponding unit will begin capturing audio packets from the user's microphone audio stream and routing them to the corresponding asset(s).

In a further aspect, the system is highly scalable because the system is modular. The total number of streams that can be supported is a function of the network infrastructure. There is not a hard-coded limit dictated, for instance, by physical considerations or the like. Accordingly, the system is easily expanded. For example, if another radio is needed, a corresponding RIU can be added to the network to support it. If more network bandwidth is needed, more and/or faster network switches can be installed.

As mentioned above, security features can be overlaid on the intercommunications system described herein. With security enabled, the system acquires various properties such as, but not limited to, encryption of data at rest, secure boot, attack surface reduction, hardware resources partitioning, security communications, least privilege and mandatory access control, data input validation, secure build configuration, container and isolation, integrity monitoring and auditing, etc.

Further, a security suite, when integrated with the IP-based ICS described herein, provides additional protections. For instance, access may be denied, by default, to protected entities even from root-level users. In addition, secure software updates are enabled and prevent unsigned loading of modules while enforcing keychain controls. The security suite, in connection with the ICS, limits an attacker's ability to debut or subvert protected applications and libraries. Protected entities are authenticated, verifying that the entities have not be altered, and decrypting files only as needed with decryption keys being protected and stored out-of-band. Sensitive applications, data files, and/or configurations may be cryptographically bound to particular deployment hardware, which defeats efforts to copy and run applications on non-authentic or instrumented hardware. File signatures, checksums, and provenance parameters (such as file location) on data and configuration files may be verified before accessed by protected applications. Application whitelisting may be enabled to enforce static deployments of critical embedded systems (i.e. deployments that cannot be modified at runtime). Zero-day exploits that could compromise root or administrative functionality of an operating system are prevented, which provides time for a developer to develop patches.

According to an aspect, an intercommunications system is provided. The system includes an interface unit associated with a source and communicatively coupled to a network. The system also includes a record/playback unit associated with a storage device and communicatively coupled to the network, and a digital crew unit associated with at least one of an audio input device or an audio output device. The digital crew unit includes a user interface and is communicatively coupled to the network. Each of the interface unit, the record/playback unit, and the digital crew unit is configured to at least one of transmit or receive an audio stream multicasted via the network.

In an example, the system includes a plurality of units interconnected via the network. The plurality of units include at least the interface unit, the record/playback unit, and the digital crew unit. The plurality of units is scalable through addition of one or more units. The one or more units include at least one of a second interface unit, a second record/playback unit, or a second digital crew unit.

In another example, the interface unit, the record/playback unit, and the digital crew unit collectively operate to implement a plurality of channels on the intercommunication system. A total number of supportable channels is a function of at least one of an infrastructure or a capacity of the network.

In yet another example, the audio stream is a stream of network packets converted from digitized audio from a baseband audio source.

Still further, at least one of the interface unit, the record/playback unit, and the digital crew unit are configured to advertise the audio stream via a session announcement protocol, to describe the audio stream via a session description protocol, and to transport the audio stream via the network using a real time protocol. The at least one of the interface unit the record/playback unit, and the digital crew unit is configured to control transport of the audio stream via the network via corresponding control channel utilizing a real time control protocol.

In another example, the source includes at least one of a radio source, a baseband audio source, a public address system, a cockpit voice recorder, or a warning system. The digital crew unit includes an interface for the at least one of the audio input device or the audio output device. The audio input device includes at least one of a microphone or a headset, and the audio output device includes at least one of the headset or a speaker.

According to further examples, the system includes a plurality of digital crew units, wherein each digital crew unit of the plurality of digital crew units is associated with a different crew position within a craft. The system further includes a plurality of interface units, wherein each interface unit of the plurality of interface units is associated with a source available within a craft. The interface unit is associated with a plurality of sources and provides access to the network for the plurality of sources. The record/playback unit is configured to receive the audio stream from at least one of the interface unit or the digital crew unit, store the audio stream received in the storage device, and transmit a stored audio stream to at least one of the interface unit or the digital crew unit for playback. The network is configured to route packets associated with the audio stream to nodes subscribed to receive the audio stream.

In another example, each unit of the interface unit, the digital crew unit, and the record/playback unit include a processor, a communication interface to communicatively couple the unit to the network, and a component interface to couple to the unit to a peripheral device. The peripheral device is the source for the interface unit, the storage device for the record/playback unit, and the at least one of the audio input device or audio output device for the digital crew unit. The digital crew unit includes a user interface for at least one of display of available audio streams or selection of one or more of the available audio streams to monitor. The audio stream includes audio encoded using a 24-bit linear pulse-code modulation, encapsulated in a user datagram protocol datagram, and appended with an internet protocol header.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

FIG. 1 shows a schematic block diagram of an exemplary, non-limiting implementation of an intercommunication system. System 100 includes modular units configured for distribution and routing of audio streams or channels. For instance, as shown in FIG. 1, interface unit 110 is a module for interfacing with source 112, which may be a radio source or other source of baseband audio. While the term source is utilized, the interface unit (IU) 110 may also transmit audio streams from other units of intercommunication system 100 via the associated source 112 (e.g. radio). As shown in FIG. 1, the system 100 can include a plurality of sources 112, source 1 $112_1$ to source N $112_N$, respectively associated with a plurality of IUs, IU $110_1$ to IU $110_N$, where N is an integer greater than or equal to 1.

In addition, to radios and other baseband audio (analog) sources, sources 112 may also include other devices such a public address (PA) systems, cockpit voice recorders, etc. The IUs 110, in general, provides a networked interface for the sources 112 to other components of the intercommunication system 100.

Intercommunication system 100 includes one or more digital crew units (DCUs) 130 that can provide physical and/or virtual control panels to users as well as provide an interface for various audio devices such as microphones 132, speakers 134, and/or headsets 136. Similar to IUs 110, system 100 can include a plurality of DCUs, DCU $130_1$ to DCU $130_M$, where M is an integer greater than or equal to 1. For instance, system 100 may include a DCU 130 at each user or crew station. Moreover, similar to IUs 110, the DCUs 130 may output audio streams source from other components and/or transmit audio streams, captured by microphone 132, for example, to other components of the intercommunication system 100. The DCU may also generally be referred to herein as an audio control panel (ACP).

System 100 may also include a record/playback unit (RPU) 120 configured to receive audio streams from other modules and record received streams to storage, and playback (e.g. transmit) recorded audio streams to other modules.

Each of IU 110, RPU 120, and DCU 130 provides a networked interface via which audio streams are received and transmitted. The streams are conveyed via a network that may include a network switch 140 to interconnect the units. Network may be a wired or wireless network, such as a local area network. In one example, network may be an Ethernet network. Accordingly, network switch 140 may be an Ethernet switch. It is to be appreciated, however, that other types of networks may be employed to implement the intercommunication system 100. In general, any network capable of supporting the protocols described below may be a suitable network.

In accordance with an aspect, a modular unit, such as IU 110 or DCU 130, receives analog audio, digitizes the audio (using L24 for example), and packetizes the audio for transmission via the network. An inverse process may be carried out by a receiving modular unit, with some steps omitted if not necessary (e.g. audio may be recorded in digital form).

Audio processed and transmitted via the network from a particular source is referred to as a stream or channel. In accordance with an exemplary implementation, for a particular source, a modular unit (e.g. IU 110, DCU 130, or RPU 120) advertises the stream using a session announcement protocol (SAP) and describes the stream using a session description protocol (SDP). Other nodes on the network can subscribe or tune-in to the advertised and described stream. The audio data of the stream is transported across the network using real time protocol (RTP) packets. RTP streams have a corresponding control channel using a real time control protocol (RTCP). The RTP packets are multicasted to other nodes. Moreover, the network switch 140 may employ IGMP snooping to route multicasted packets to nodes that have specifically requested to receive the corresponding stream.

Figure 2:
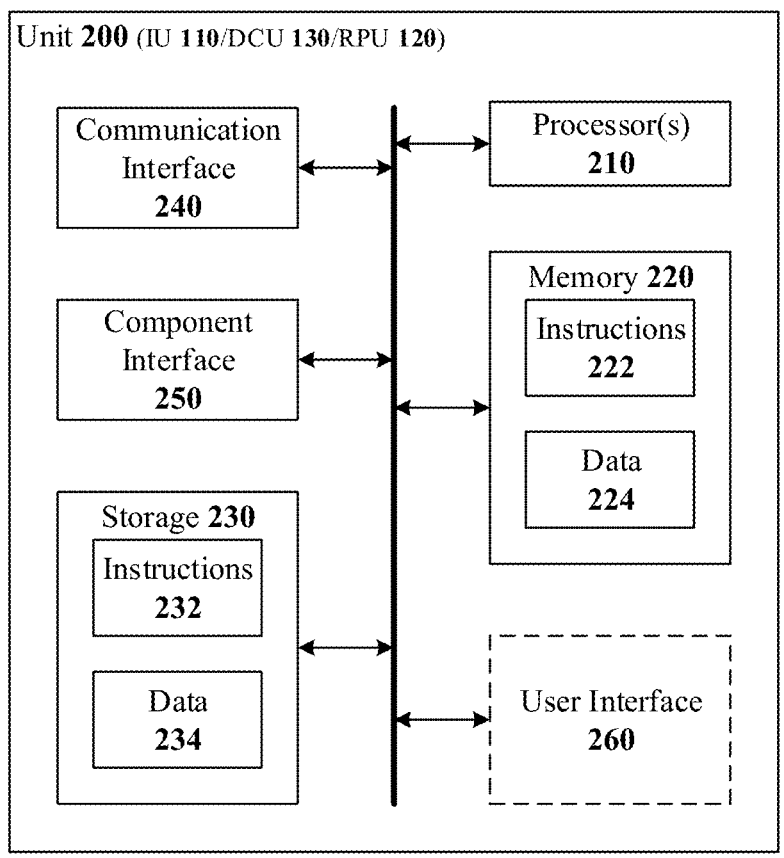
FIG. 2 is a schematic block diagram of an exemplary, non-limiting implementation of a modular unit of the intercommunication system of FIG. 1.

FIG. 2 illustrates a schematic block diagram of a modular unit 200, which may be an exemplary implementation of an interface unit 110, record/playback unit 120, or digital crew unit 130 of intercommunication system 100 of FIG. 1. As shown in FIG. 2, unit includes one or more processor(s) 210 configured to execute computer-executable instructions. Such computer-executable instructions can be stored on one or more computer-readable media including non-transitory, computer-readable storage media such as storage 230 and memory 220. Storage 230 can include non-volatile storage to persistently store instructions 232 and/or data 234 (e.g., audio data, sessions lists, etc.) Memory 222 can include volatile storage that stores instructions 222 and other data 224 (or portions thereof) during execution by processor 210.

Unit 200 includes a communication interface 240 to communicatively couple unit 200 to a network for transporting and receiving audio streams. Communication interface 240 can be a wired or wireless interface including, but not limited, a WiFi interface, an Ethernet interface, a fiber optic interface, a cellular radio interface, a satellite interface, etc.

A component interface 250 is provided to communicatively and/or operatively couple unit 200 to peripheral devices. Peripheral devices may include sources 112, microphone 132, speaker 134, headset 136, etc. Further, a user interface 260 may be provided (e.g. on DCU 130) that incorporates various input and output devices such as displays, touch screens, buttons, switches, keyboards, touchpads, etc.

Figure 3:
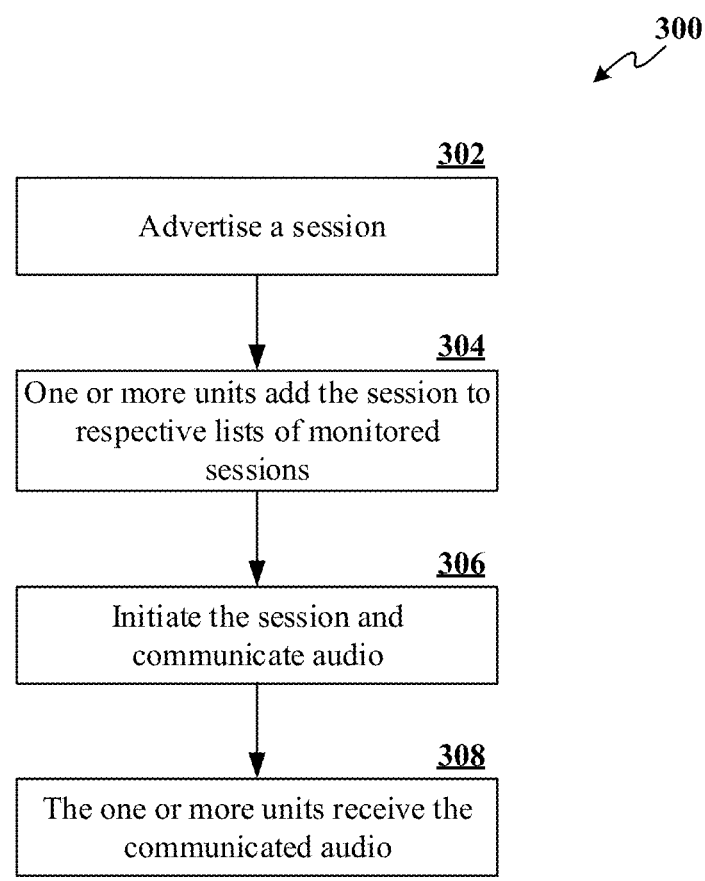
FIG. 3 is a flow diagram of an exemplary, non-limiting method for monitoring and recording a channel according to various aspects.
Figure 4:
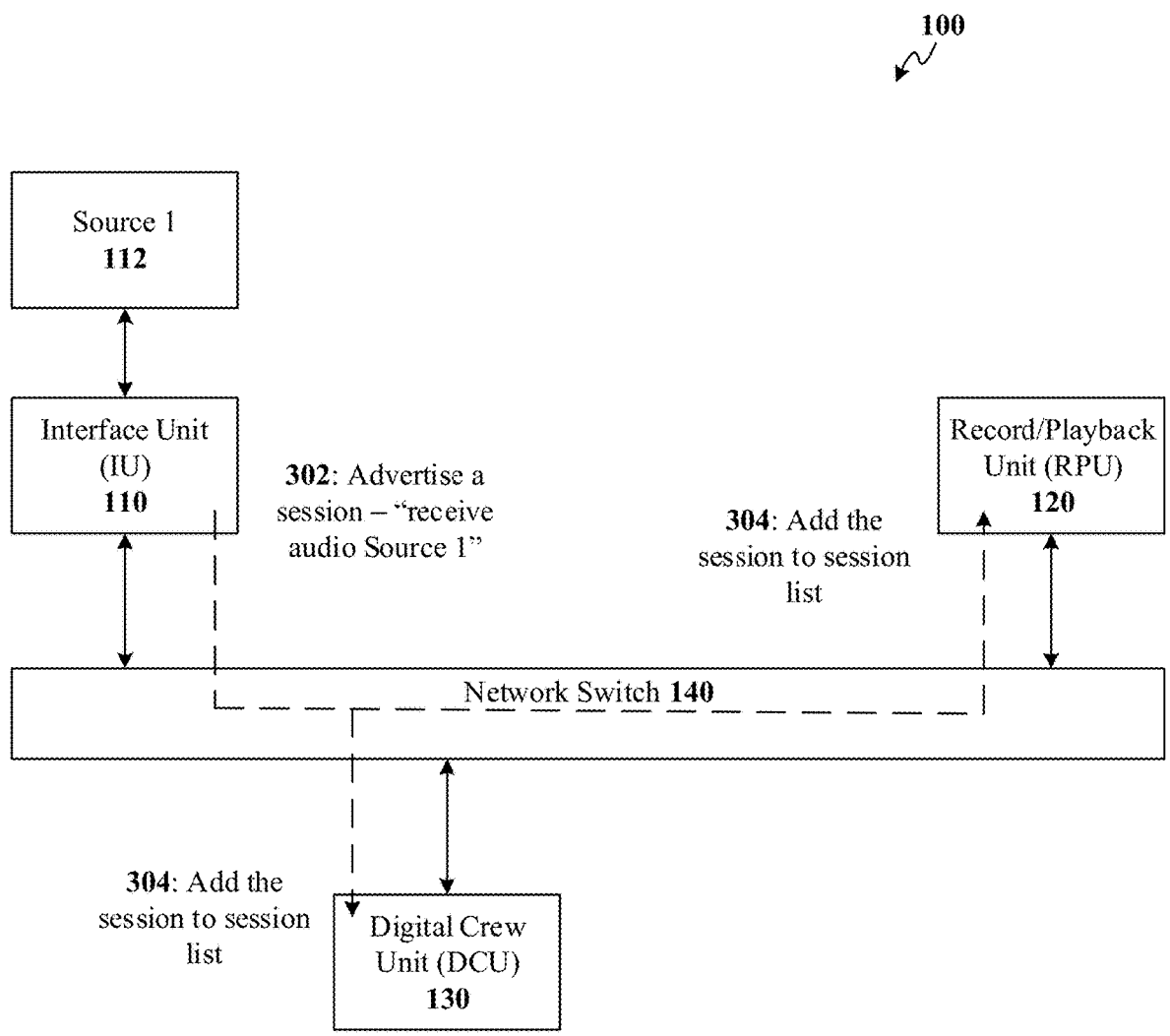
FIG. 4 is a schematic block diagram of a portion of the method of FIG. 3 performed by the intercommunication system of FIG. 1.

Turning now to FIG. 3, an exemplary, non-limiting method 300 of monitoring and/or recording a channel of the intercommunication system 100 is illustrated. Method 300 may be performed by unit 200 and, more particularly, individual steps may be performed by one or more of IU 110, RPU 120, or DCU 130. At 302, a session for an audio stream is advertised (using SAP/SDP for example). For instance, as shown in FIG. 4, IU 110 can advertise a session "receive audio Source 1". The advertisement can be received by DCU 130 and RPU 120, and one or more of DCU 130 and RPU 120 can add the session to a list of sessions to be monitored or received at step 304.

Figure 5:
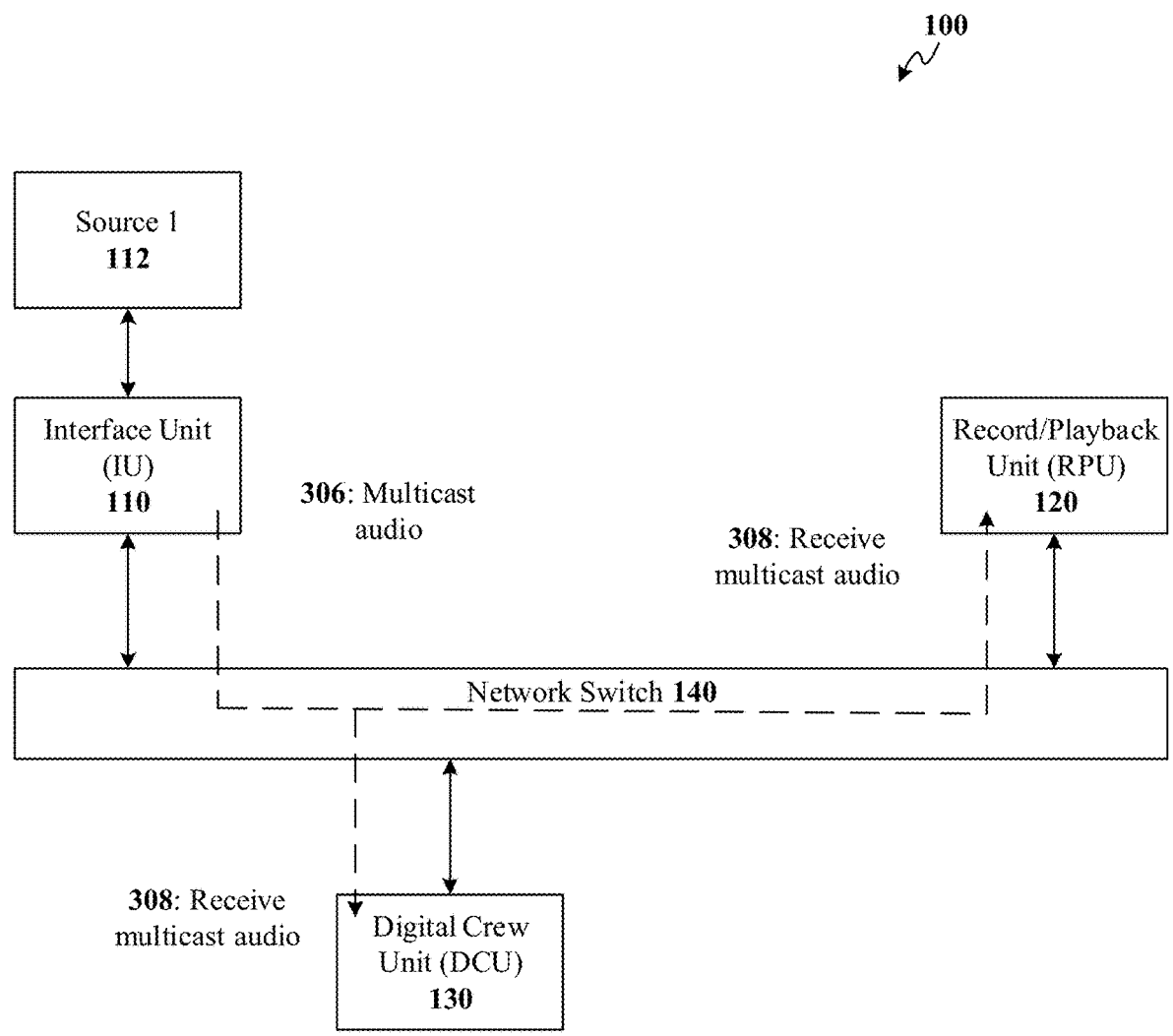
FIG. 5 is a schematic block diagram of a portion of the method of FIG. 3 performed by the intercommunication system of FIG. 1.

At 306, the session is initiated and audio is communicated via a network. For example, audio data may be transported using RTP packets. Communicated audio is received by the one or more units listening to the session at 308. This is schematically shown in FIG. 5 by IU 110 multicasting audio, which is received by DCU 130 and/or RPU 120. In the case of DCU 130, audio may be output via speaker 134 or headset 136. For RPU 120, received audio may be stored to a computer-readable storage medium, such as a solid state drive.

Figure 6:
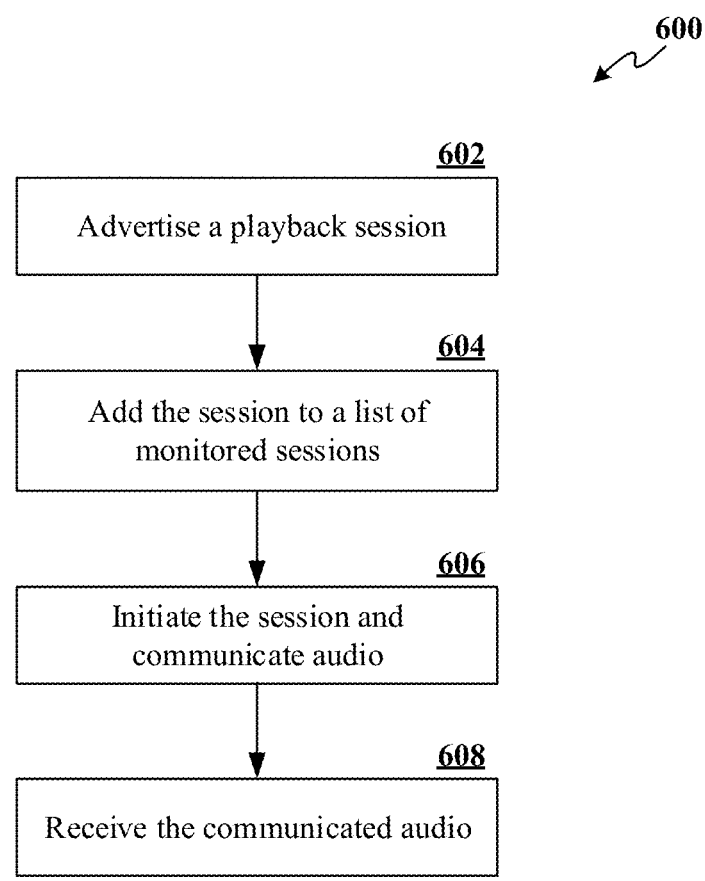
FIG. 6 is a flow diagram of an exemplary, non-limiting method for playback according to various aspects.
Figure 7:
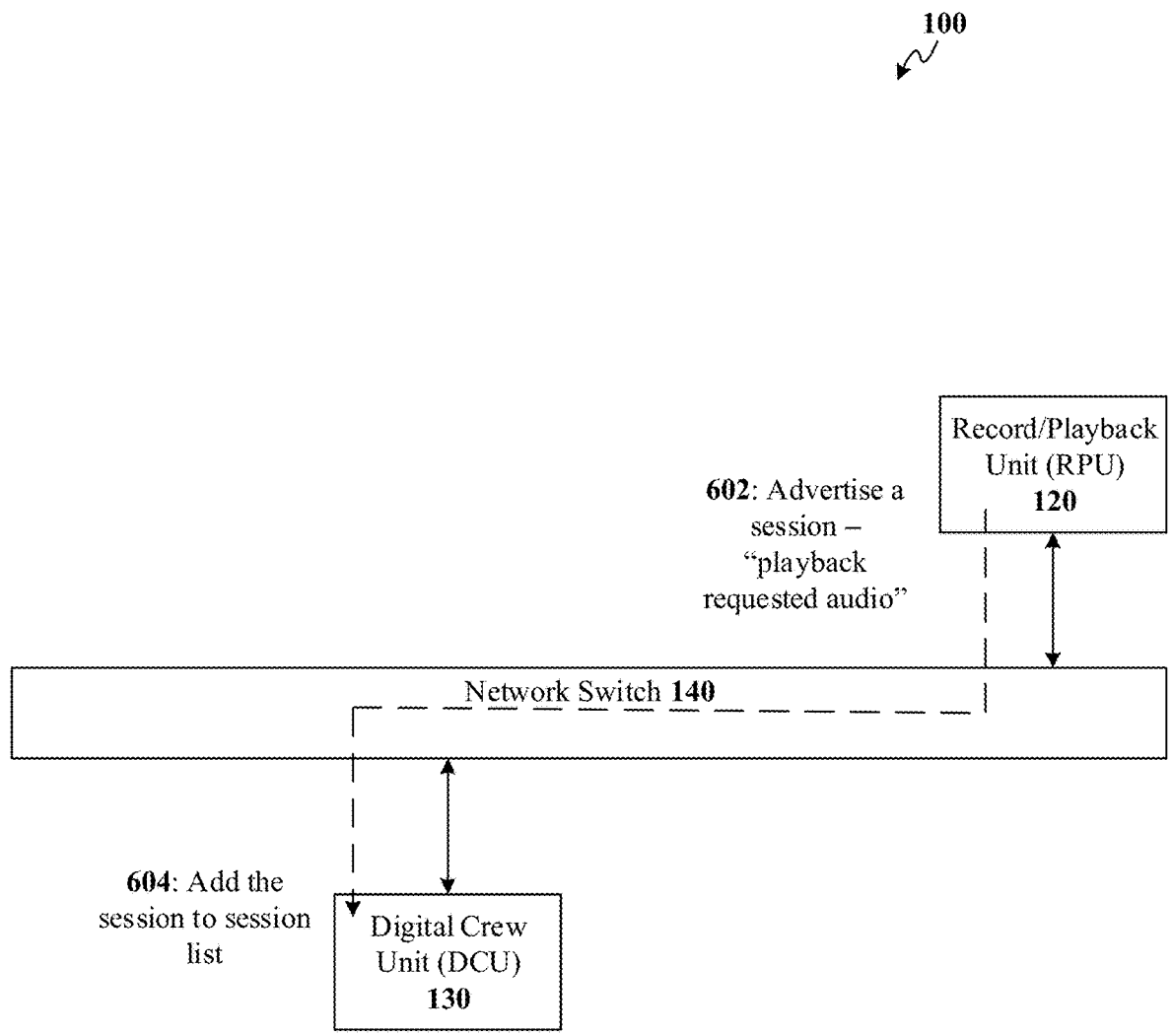
FIG. 7 is a schematic block diagram of a portion of the method of FIG. 3 performed by the intercommunication system of FIG. 1.

Turning to FIG. 6, an exemplary, non-limiting method 600 for playback of audio in the intercommunication system 100 is illustrated. Method 600 may be performed by unit 200 and, more particularly, individual steps may be performed by one or more of RPU 120 or DCU 130. At 602, a playback session is advertised (e.g. using SAP/SDP). For instance, as shown in FIG. 7, RPU 120 can advertise a session "playback requested audio". The advertisement can be received by DCU 130, which adds the session to a list of sessions to be monitored or received at step 604.

Figure 8:
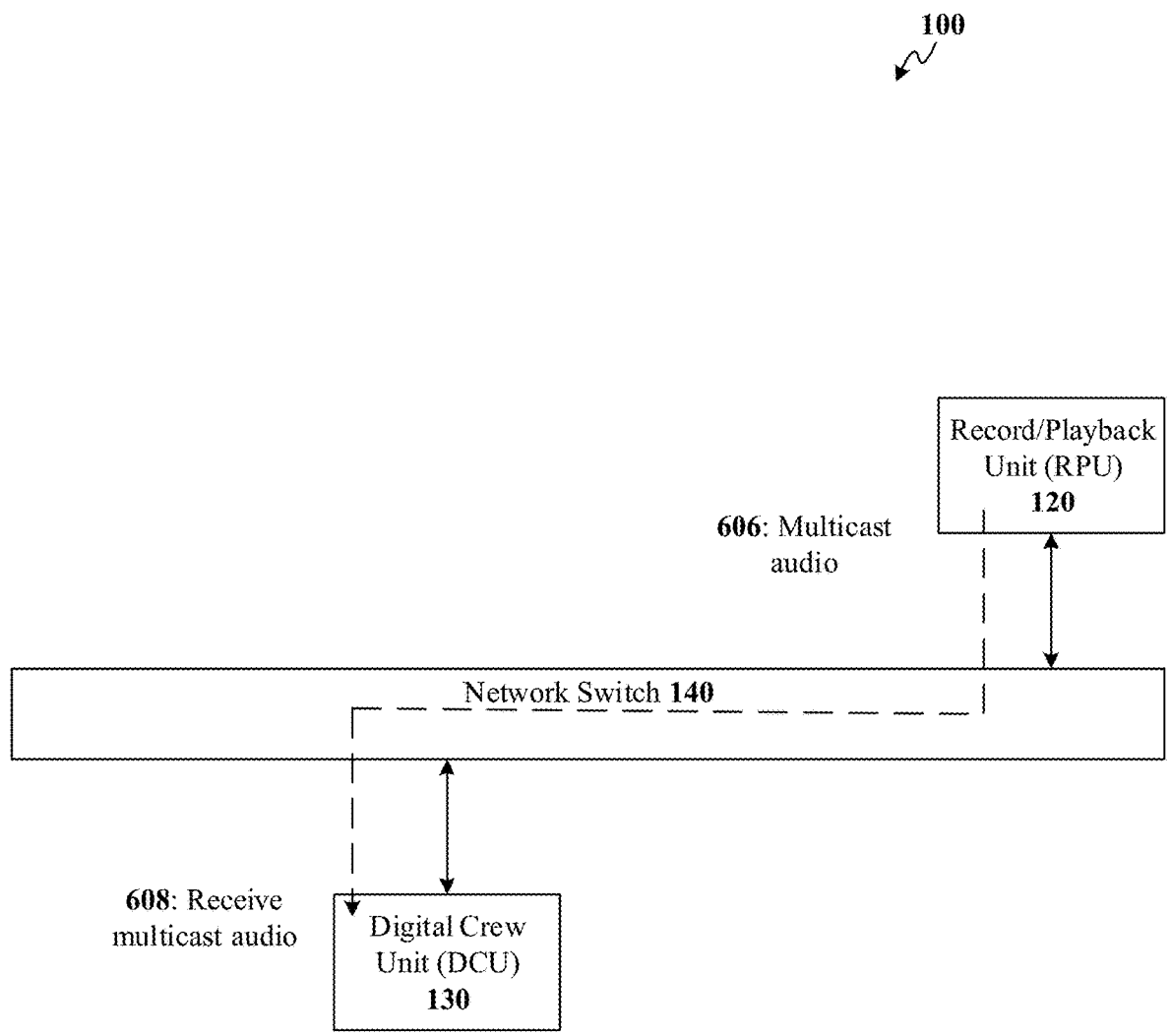
FIG. 8 is a schematic block diagram of a portion of the method of FIG. 3 performed by the intercommunication system of FIG. 1.

At 606, the session is initiated and audio is communicated via a network. For example, audio data may be retrieved from storage and may be transported using RTP packets. Communicated audio is received by the one or more units listening to the session at 608. This is schematically shown in FIG. 8 by RPU 120 multicasting audio, which is received by DCU 130. The audio received by DCU 130 may be output via speaker 134 or headset 136.

Figure 9:
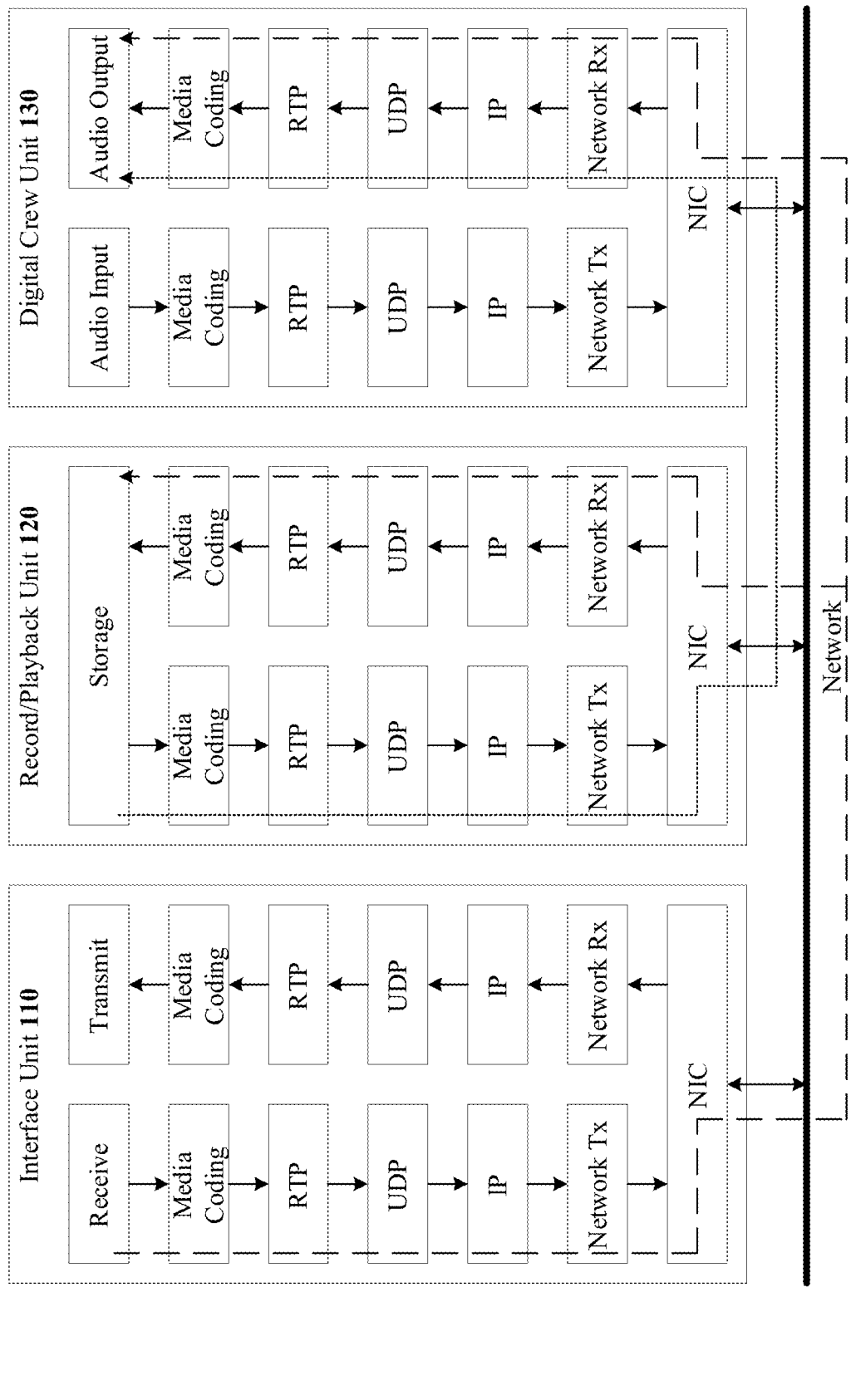
FIG. 9 is a schematic block diagram of an exemplary, non-limiting protocol stack for the intercommunication system of FIG. 1.

Turning now to FIG. 9, a schematic block diagram of an exemplary, non-limiting protocol stack for the intercommunication system of FIG. 1 is illustrated. As shown in FIG. 9, each of interface unit 110, record/playback unit 120, and digital crew unit 130 provides a corresponding set of functions. For instance, interface unit 110 provides transmit/receive functionality with respect to an associated radio, record/playback unit 120 provides storage and retrieval of audio data, and digital crew unit 130 provides audio input and output functions for a user. While these units may differ in terms of this functionality, each unit provides an interface for that functionality to a network and/or to the other units. This commonly provided interface is implemented as protocol stack, an example of which is shown in FIG. 9.

The protocol stack includes a plurality of layers through which audio data is passed. For example, for audio data passing from a functional source, such as a radio, storage, or audio input device (e.g. microphone), to a network, the audio data goes through media coding. In one example, the audio may be coded using a 24-bit linear pulse-code modulation (PCM), which is also referred to as L24. It is to be appreciated that other codecs may be employed. The encoded audio is incorporated into an RTP packet. The RTP packet is encapsulated in a user datagram protocol (UDP) datagram for transport. The datagram is provided with an IP header at the Internet Protocol (IP) layer, then transmitted at a network transmit layer (e.g. a link layer) via a physical layer, which include a network and a network interface card (NIC).

For received audio data, a transmitted packet from the network is received at the NIC as, for example, a link frame. The link frame is processed by a network receive layer to extract an IP header and IP data. The IP header is processed at the IP layer and the IP data (e.g. datagram) is processed by the UDP layer to recover a RTP packet. The RTP application layer processes the RTP packet to extract encoded audio, which may be decoded for storage and/or output via an audio output device (e.g. speaker or headset).

FIG. 9, in an example, shows respective data paths through the protocol stack for an exemplary monitor/record session associated with a radio source (dashed line) and an exemplary playback session to an audio output device associated with a user (dotted line).

Figure 10:
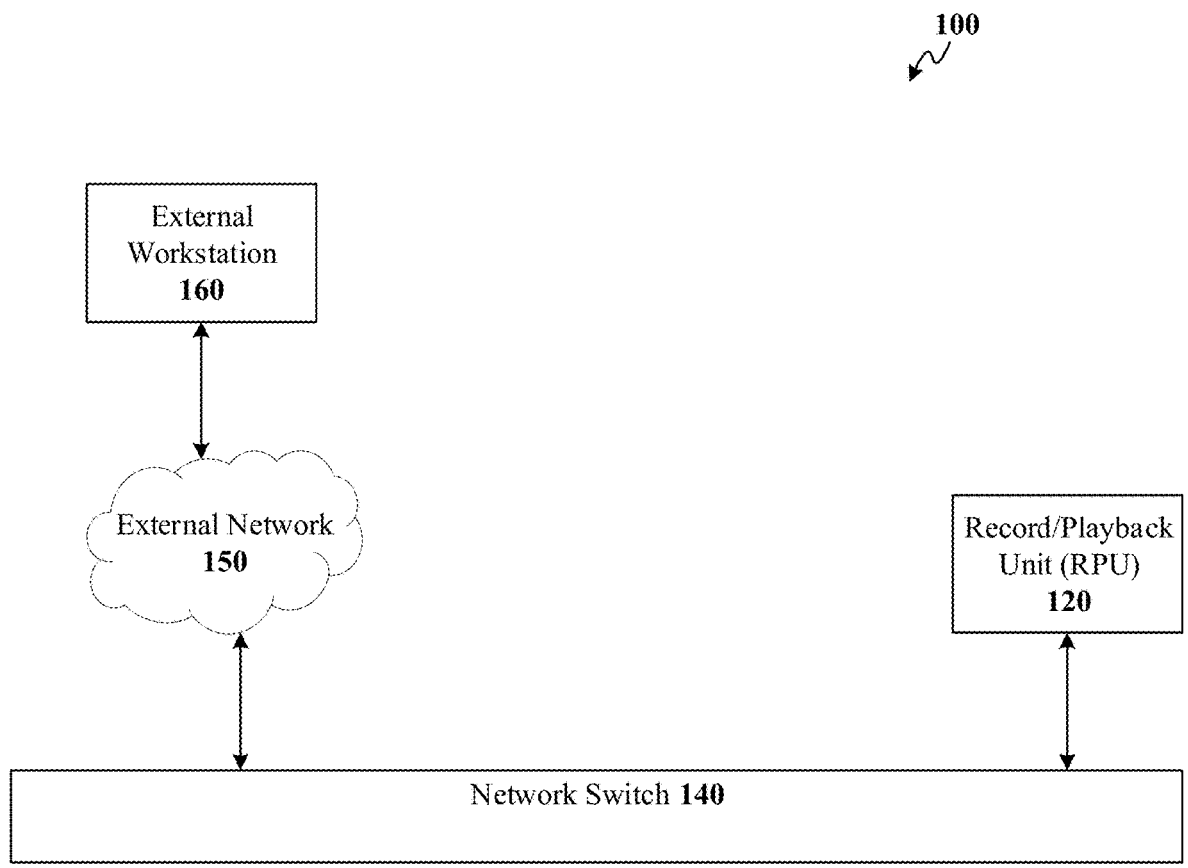
FIG. 10 is a schematic block diagram of an exemplary, non-limiting implementation of the intercommunication system supporting external playback.

Turning now to FIG. 10, the intercommunication system 100 enables audio playback at an external system. Stored audio files managed by the RPU 120 may be transferred to an external workstation 160 for playback. The transfer may occur over an external network 150 to which the external workstation 160 and the system 100 (via network switch 140) are both communicatively coupled.

The intercommunication system 100 is a general implementation of a standards- and IP-based configuration to distribute audio throughout an environment, such as an aircraft. The intercommunication system 100 may be adapted to specifics of a particular environment in which the system is deployed. A few such specific, exemplary implementations are described below.

First Exemplary Implementation

FIGS. 11-18 illustrate a first exemplary implementation of an intercommunication system (ICS) according to various aspects. The first exemplary implementation may be deployed in an aircraft and, in particular, a long-range assault aircraft (LRAA). The first exemplary implementation of an ICS, as shown in FIG. 11-18, may be a specific implementation of the general ICS described above with regard to FIGS. 1-10.

Figure 11:
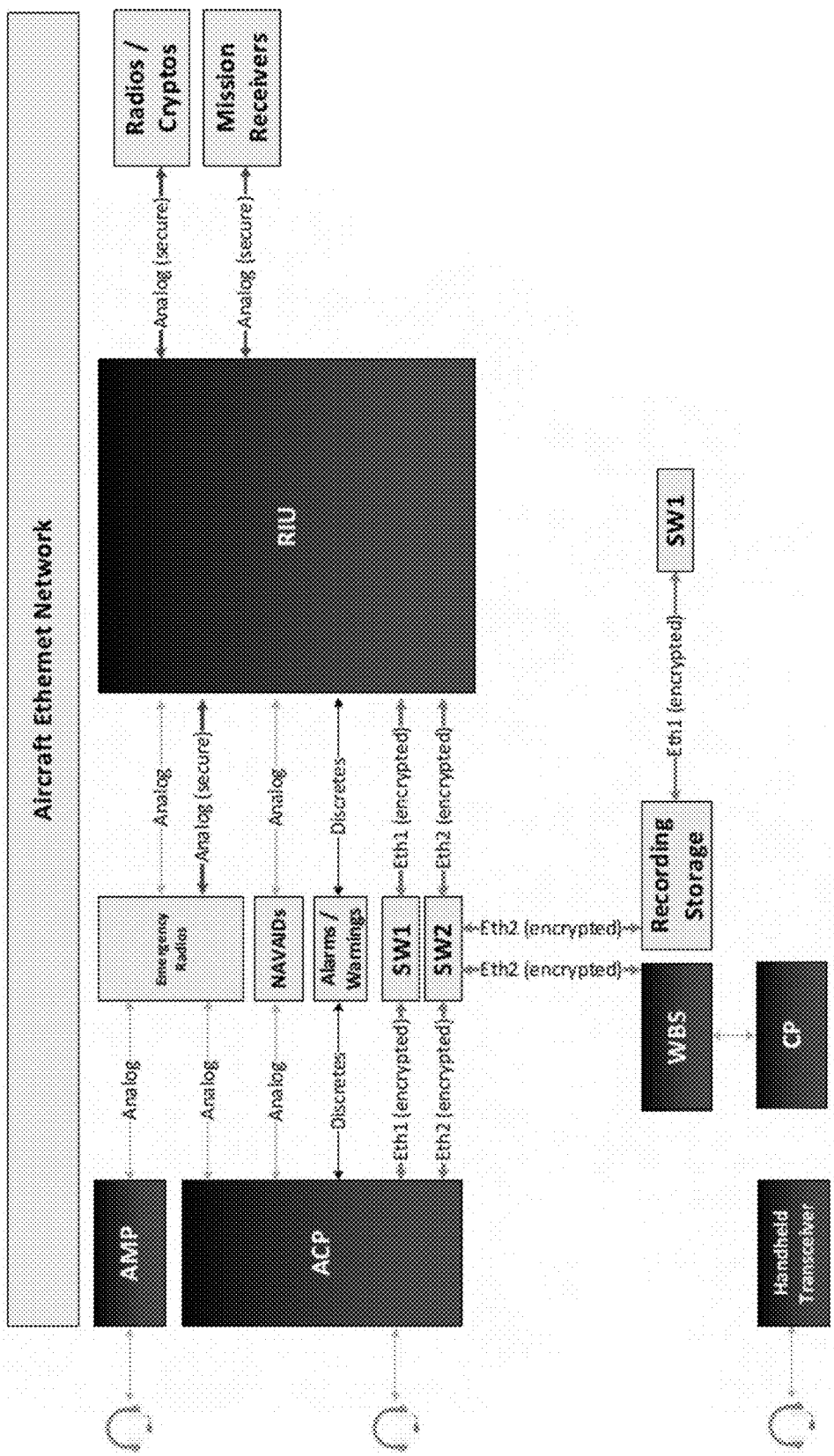
FIG. 11 is a schematic block diagram of an exemplary, non-limiting implementation of an intercommunication system (ICS) according to various aspects.

Turning initially to FIG. 11, a block diagram of an ICS according to the first exemplary implementation is illustrated. As shown in FIG. 11, the ICS may include one radio interface unit (RIU), a plurality of audio control panel (ACP) units, and one or more audio maintenance panel (AMP) units. In addition, the ICS may include a wireless system having a base station, a control panel, and a plurality of handsets. Communication between units utilizes Audio over IP (AoIP) protocols leveraging AoIP interoperability protocols. Further, communications involve the use of Ethernet, wireless, gigabit Ethernet, etc., as shown in FIG. 11. In an aspect, the ICS provides one RIU supporting up to 12 ACPs used for crewmembers and/or passengers. The ACP provides a crew and passenger interview to the ICS to enable audio control functionality.

As shown in FIG. 11, the ICS includes line-replaceable units (LRUs) that include the RIU interfacing a plurality of ACP units. In some deployments, the plurality of ACP units includes nine ACP units. The architecture is scalable and allows for additional ACP to be integrated in the system. The RIU is interfacing the ACP units via Ethernet, allowing for simple integration and easy field maintenance. The RIU is interfacing all the aircraft avionics and external LRUs. The other main LRUs are the AMPs used to enable communication to ground personnel and the wireless base station that provides communication with four wireless radios.

Figure 12:
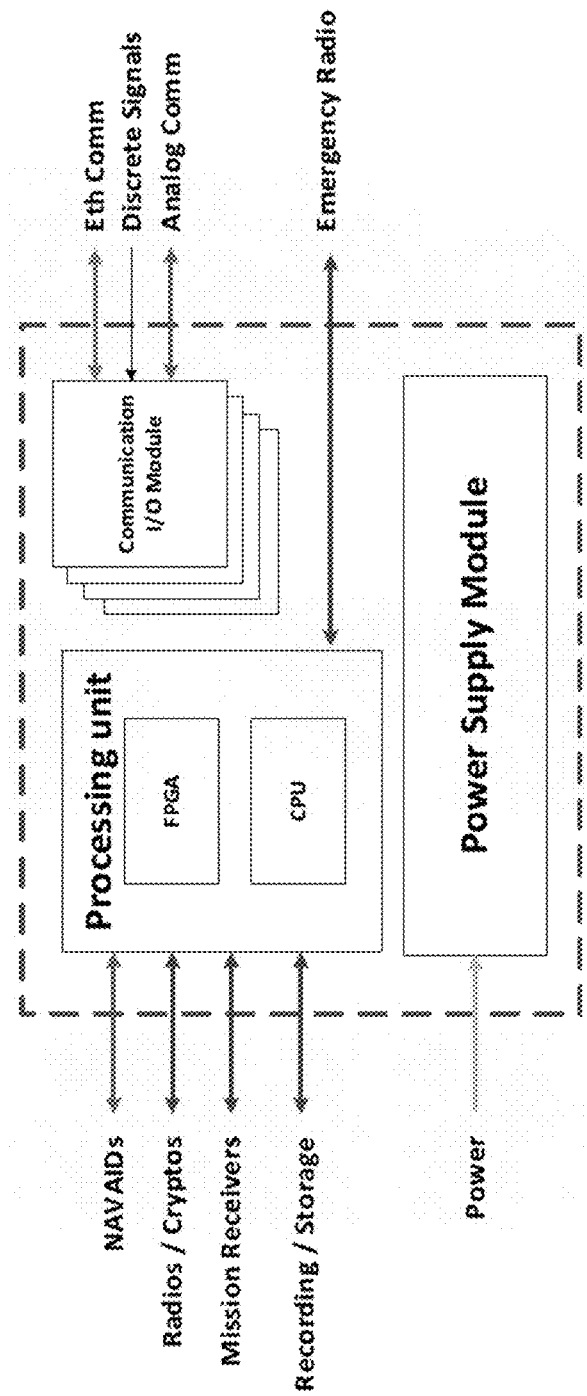
FIG. 12 is a schematic block diagram of an exemplary, non-limiting implementation of a radio interface unit (RIU) of the ICS of FIG. 11.

FIG. 12 illustrates a simplified block diagram of the RIU of FIG. 11. The RIU is responsible for communication with aircraft avionics systems, aural warning messages and managing the analog communications. The AoIP methodology described above simplifies the functionality of the RIU compared to legacy systems, which enables space savings and weight reduction.

Figure 13:
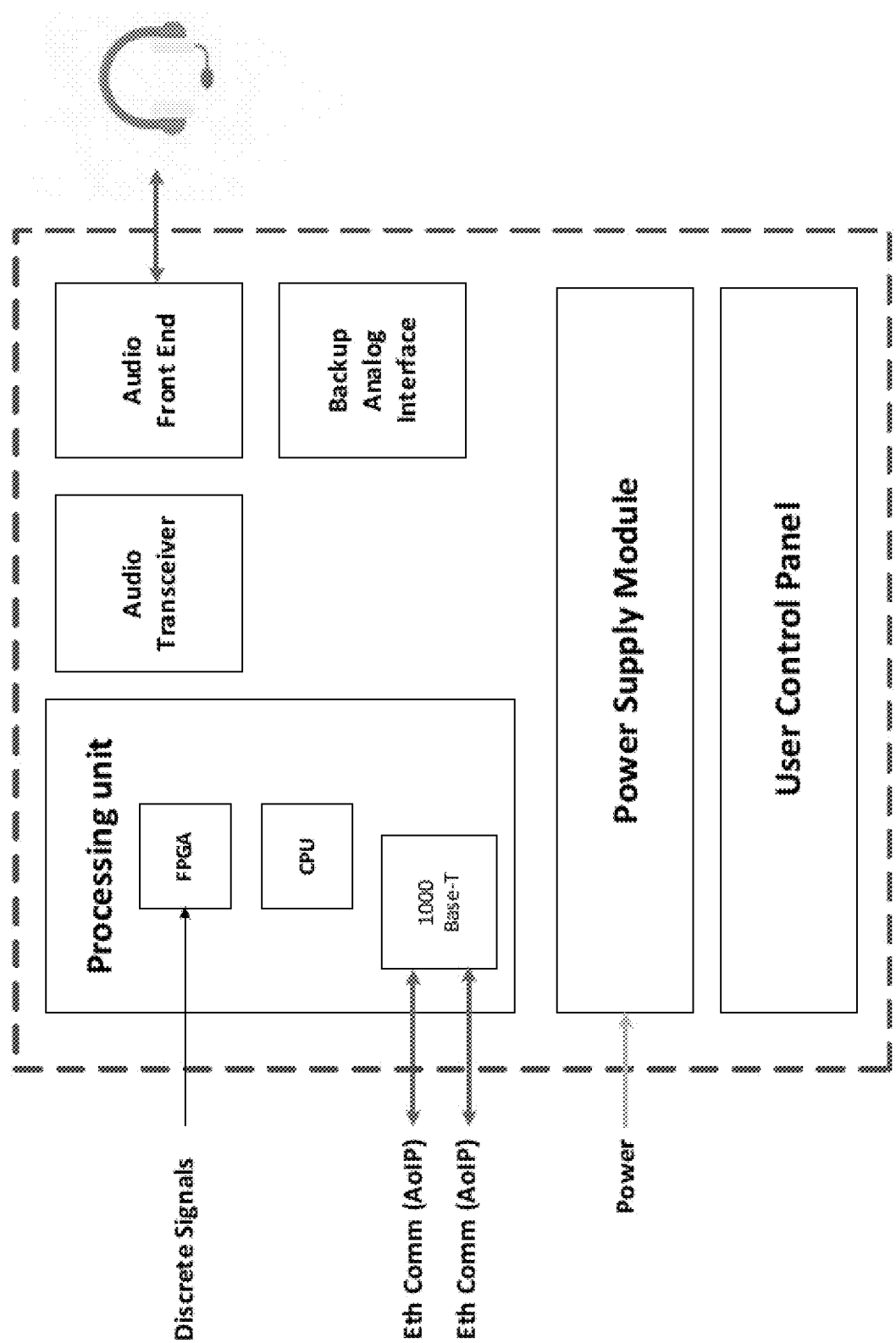
FIG. 13 is a schematic block diagram of an exemplary, non-limiting implementation of an audio control panel of the ICS of FIG. 11.

FIG. 13 illustrates a simplified block diagram of the ACP unit of FIG. 11. The ACP may be a standalone unit including a processor, audio circuit for the headsets, headset amplifier, and power supply. A 1000Base-T (IEEE 802.3ab) Ethernet interface connects the ACP to the RIU and emergency radios are directly connected to the ACP to provide the required communications in emergency and backup mode. The implementation is fault tolerant and has graceful degradation in the event of a fault. There are three modes of operation: Normal, Backup, and Emergency. Transitioning among the three modes is automatic. Backup Mode occurs when the RIU fails, and the hardware-only Emergency Mode occurs when the ACP processor fails. In all modes of operation, clear transmit and receive functionality for RAD1 and RAD2, Intercom, and (optionally) receive access to two NAVAIDS and two alarms can be accessed. There are controls for ten transceivers and four receivers on the ACP.

The ACP units and/or the RIU may utilize Power-over-Ethernet (PoE) (IEEE 802.3xx) to power the units utilizing Ethernet wires. Further, each LRU may have two encrypted Ethernet links, enabling transmit of both clear and secured communication on the same link, while also maintaining two links for redundancy.

In some deployments, the first exemplary implementation may include nine ACP panels, one RIU, two AMPs, an optional wireless base station (WBS), four optional wireless handheld transceivers, and an optional wireless control panel (CP). It is to be appreciated that a greater or lesser number of each unit may be deployed.

The ICS according to the first exemplary implementation provides interphone functionality for aircrew, cabin, and passengers; optional integrated secure wireless; secure and clear communication over flight deck and mission transceivers and receivers (including radios with embedded cryptography); configurable audio distribution based on user-defined communication plans; TEMPEST certified audio communication utilizing encryption used for ICS data in transit, ICS data at rest, and wireless transmission; Type I Class A Night Vision Device compatibility and sunlight-readable audio control panels; aural warning generation based on discrete signals or Ethernet messages; advanced audio performance capability to dramatically increase situational awareness and intelligibility with features including: Active Noise Reduction (ANR) with stationary and dynamic noise source elimination, 3D audio spatial separation and orientation of audio signals, multi-microphone beam-forming, customizable filtering, spectral subtraction, signal processing, and wave shaping, and audio environment adaptation using dynamic range control, automatic gain leveling, and audio ducking; compatibility with AES67-based IP audio sources in addition to legacy audio support for analog audio sources not converted to IP-based audio; and backup and emergency modes to provide graceful degradation from normal Mode (Emergency Mode provides hardware-based critical, flight essential communications (RAD1, RAD2, and Intercom at all ICS stations) within 1 second of power-up or upon demand); supportability via robust BIT-reporting features that provide maintainer-actionable faults and status over Ethernet.

According to an aspect, each ACP may provide headset (mic and earphone) audio to an operator. With a narrowband bandwidth of 100 Hz-10000 Hz and SNR better than 75 dB, audio quality for intercom is better than 0.8 on the Articulation Index. In addition, each operator is able to select the desired audio source using the dedicated ACP controls, which include: 10 Transceiver On/Off/Volume Controls (VHF AM, UHF, VHF FM 1&2, LK16 1&2, ADNW 1&2, SAT, BFT); 1 Radio Transmit Select Control (Radios 1-10); 4 Receiver On/Off/Volume Controls (TAC, VOR/ILS, MB, IFFT); 5 Net On/Off/Volume Controls (NET 1, NET 2, NET 3, NET 4, ALL NET); and 1 ICS Transmit Select Control (Nets 1-4, ALL NET).

In addition to audio transmit and receive controls, the ACP may include other operational controls such as, but not limited to: master volume; VOX (fully counter-clockwise Off, Threshold Adjust, fully clockwise HOT MIC); CALL (communicates with all other ACPs and AMPs in all ICS Modes); MUTE (mutes all sources except those that are transmit enabled); Mode Switch (operator can manually place the ACP in BKUP or hardware-based EMER modes to access their assigned Emergency radios).

Further, the ACP may provide 3 push-to-talk (PTT) Inputs: radio PTT, ICS PTT, and generic PTT. Generic PTT is programmable and will be capable of being configured as a radio PTT, ICS PTT, or remote CALL PTT for positions where the operator may not be within arm's distance of the ACP to press the CALL button on the ACP front panel. The AMP will use the generic PTT of the Operator 2 Headset interface of an ACP to allow ground crew to talk to the crew on the CALL Net.

The RIU Processor may provide a flexible aural warning generator that supports up to 600 pre-recorded aural messages that can be triggered by Ethernet messages or discrete signals. Ethernet control messages contain aural message ID, play, stop, continuous play, volume level above communication plan default, etc. The RIU Processor may distribute aural warnings to crew stations as defined in the communication plan, or to RIU port destinations defined in the Ethernet message. Up to three aural warning may be able to play at a time, with the highest priority messages played at the suspension or cancellation of lower priority messages. Aural messages files (voice and tones) will be loaded via an ARINC-615 compatible loader over Ethernet.

The ICS is highly configurable with ACP, RIU, and system parameters that can be modified by the user. These parameters include, for example: ACP and RIU Hardware configuration; Interface impedances; Interface gains/voltages; Programmable inputs and outputs; Radio and Net Circuit Assignments for each operator station/role based on communication plan; Security Access Rights for each operator station/role (Clear Only or Clear and Secure); Operation under the active communication plan and 3 stored communication plans to select via Ethernet message; ICS is capable of loading configuration changes via ARINC 615; Aural Warnings distributed to ACPs based on communication plan; default audio levels, transmit selection, and receive selection defined by communication plan.

To address degraded modes of operation and the Flight Essential and Mission Critical aspect of radio control, the ACP may operate in Normal Mode ("NORM"), Backup ("BKUP") or Emergency Mode ("EMER"). DO-178C compliant software may run on the ACP Processor in Normal Mode and Backup Mode. The ACP may use high-impedance audio inputs and current-mode outputs to allow any ACP to access two assigned emergency radios ("RAD1 and RAD2") in EMER mode, when the radios will be externally wired to the ACP in parallel with the RIU to support this function. If communication with the RIU fails, or the RIU Processor fails, the ACP may switch automatically to run in Backup mode. If the ACP Processor or power supply fails, a watchdog timer may activate hardware to provide basic RAD1, RAD2, and CALL functionality. When the system is in EMER mode, it is only hardware-based (software is not required in Emergency Mode). For pilots, the two emergency radios are the two flight deck flight essential radios. The ACP may allow both RAD1 and RAD2 radios to be supported in this mode, along with two NAVAID radios and two warnings. This hardware-based design makes flight essential communications impervious to cyber-attack.

The ICS may be modified to add the ability to pair radios to support retransmission between compatible radios. An RxIND discrete from one radio may be used to generate the PTT for the second radio.

Figure 14:
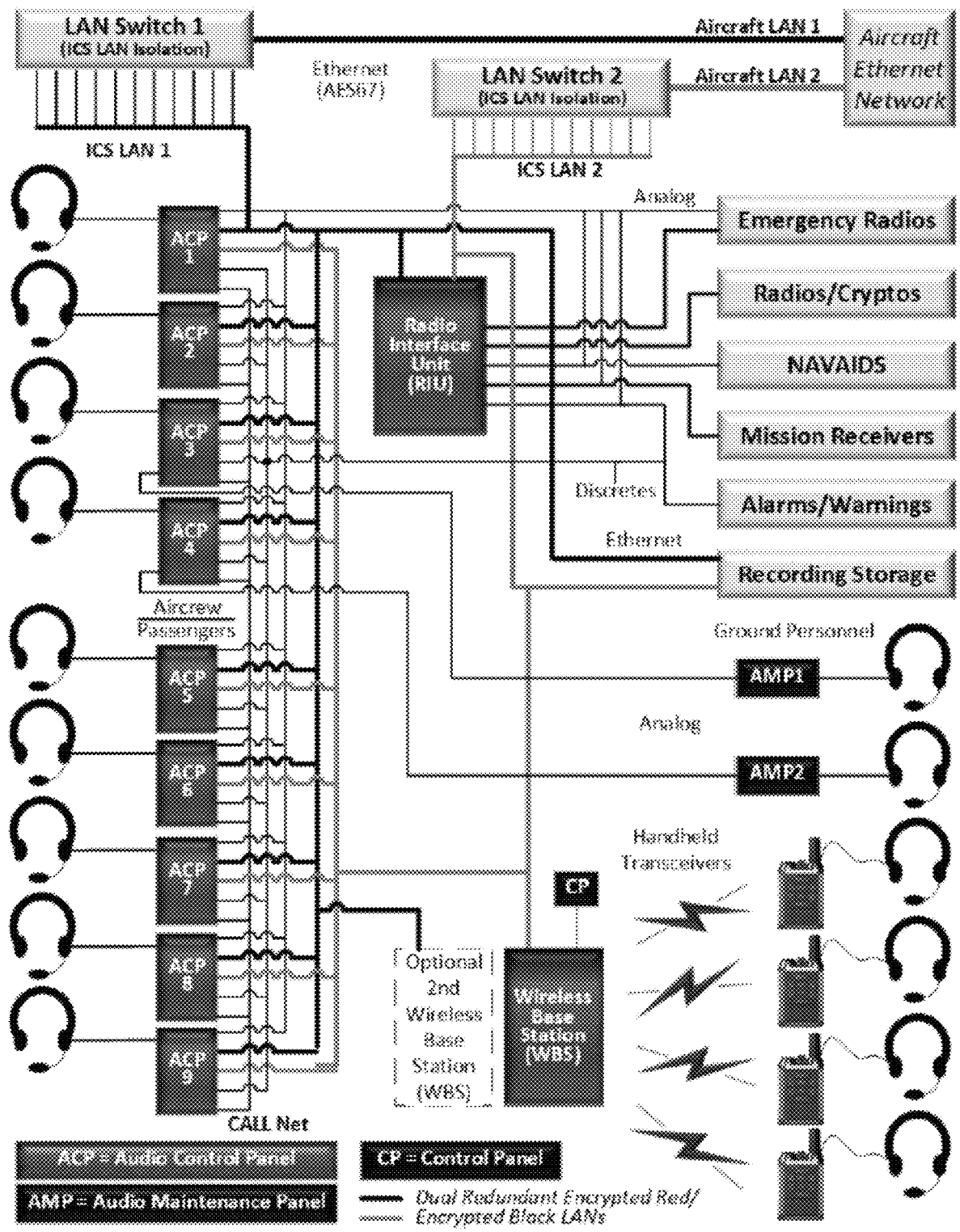
FIG. 14 is a schematic block diagram of the ICS of FIG. 11.

Turning now to FIG. 14, a detailed block diagram of an ICS according to the first exemplary implementation is illustrated. In this example, the ICS includes nine ACPs, two AMPs, one wireless base station, four handsets, and a central RIU.

The RIU serves as a central interconnect for the ICS. The RIU may be housed in a sealed enclosure that uses captive fasteners and may be conduction cooled without the need for forced air. The RIU houses pre-programmed system configurations, an aural warning generator for mission and flight related aural warnings, interfaces for radios, NAVAIDs, external aural warnings, and auxiliary interfaces unrelated to flight operations such as mission radios, modems, cryptography, and sensors. The RIU may be a software controlled central digital switch that supports simultaneous usage of all radios by all ACPs without degradation in performance.

At power-up, the ICS may operate with a default system configuration or communications plan that defines the characteristics of the external interfaces (e.g. signal levels and impedances) and the accessibility of external interfaces to each of the ACPs. The communications plan may be stored in internal memory and may be specifically configured to support the current and future interfaced assets on the ICS. Mission related functionality will allow cryptographic units (cryptos) to be used in line with external radios for secure communications.

Figure 15:
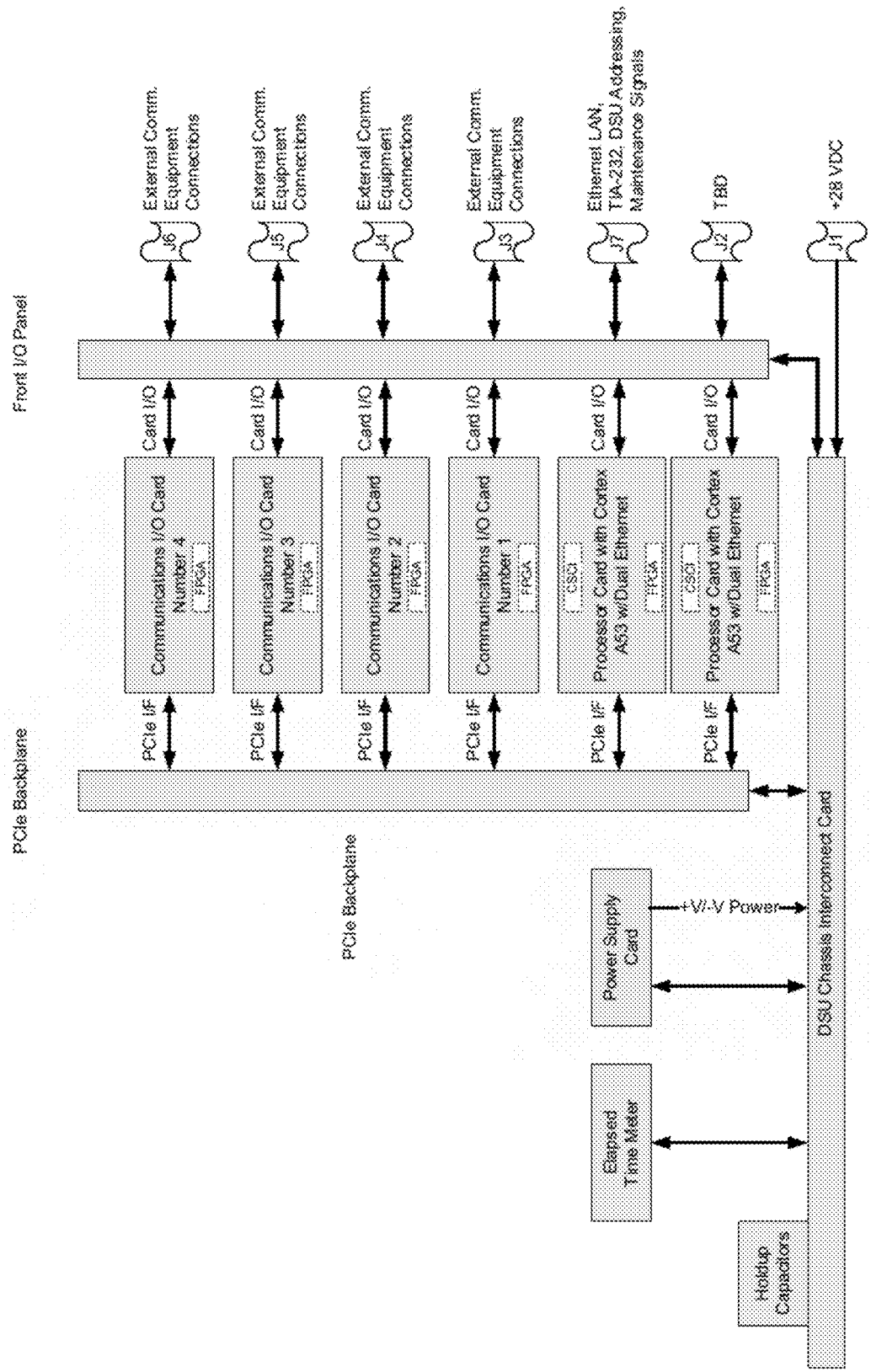
FIG. 15 is a schematic block diagram of the RIU of the ICS of FIG. 11.

The RIU may utilize a standard PCI (PCIe) backplane that interfaces with PCIe circuit cards. The RIU has communication I/O Cards that interface to radio/intercom channels. The RIU may be powered by 28 VDC and include a power supply card, two processor cards where the software operates, and four communication I/O cards to support all the Inputs/Outputs required for the FLRAA aircraft as shown in FIG. 15. As further shown in FIG. 15, the RIU may include seven connectors (e.g. M38999 connectors) on a front I/O panel. These connectors include a J1 connector for input power, a J2 connector for later expansion, J3-6 connectors for communication I/O, and a J7 connector for LAN, TIA-232, RIU addressing, and other maintenance signals.

Figure 16:
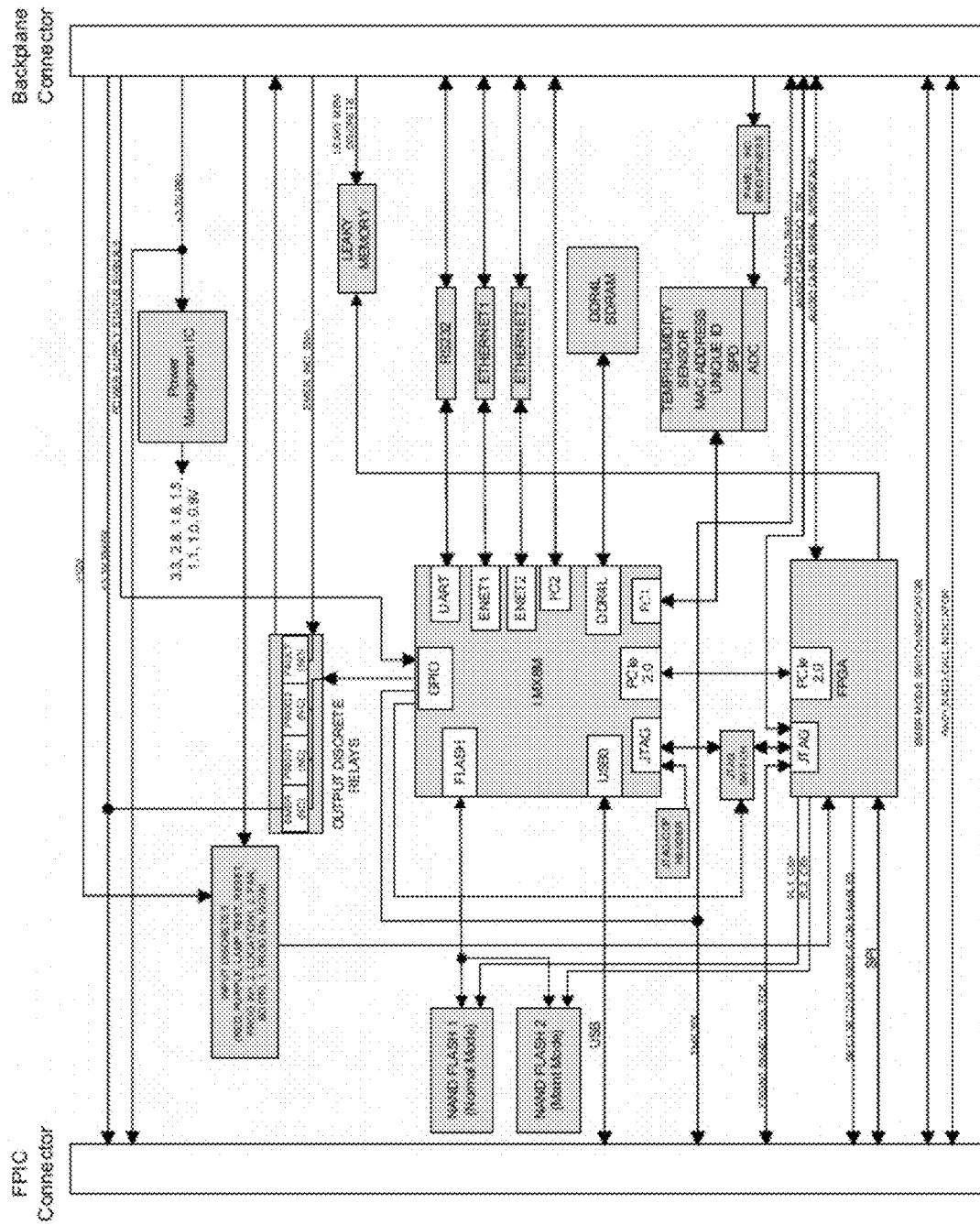
FIG. 16 is a schematic block diagram of a processor card of the RIU of FIG. 15.

Turning now to FIG. 16, an exemplary RIU processor card is depicted. The RIU processor card supervises and controls all switching throughout the RIU. The processor card also provides two gigabit Ethernet interfaces. One Ethernet port on each processor may be used to interface with redundant encrypted black/encrypted red LANs since encrypted data makes the LAN black. The Transmit, Receive, and security status for each circuit controlled by the RIU may be reported via its Ethernet interface. The RIU Computer Software Configuration Items (CSCIs) will run on the RIU Processor Cards.

In an aspect, the RIU processor card may include a processor (e.g. a Cortex A53 processor). The processor card also provides storage and playback capability for alarm and alert messages. The processor card may generate the aural warnings when commanded to do so from an external computer using the Ethernet interface or via input discretes of the CIO CCA. The processor memory supports an alert/warning library with at least 600 aural warnings, each with a maximum duration of 16 seconds, up to a combined length of 15 minutes. The ICS may support 3 aural warnings at once with prioritization and configurable volume levels.

Figure 17:
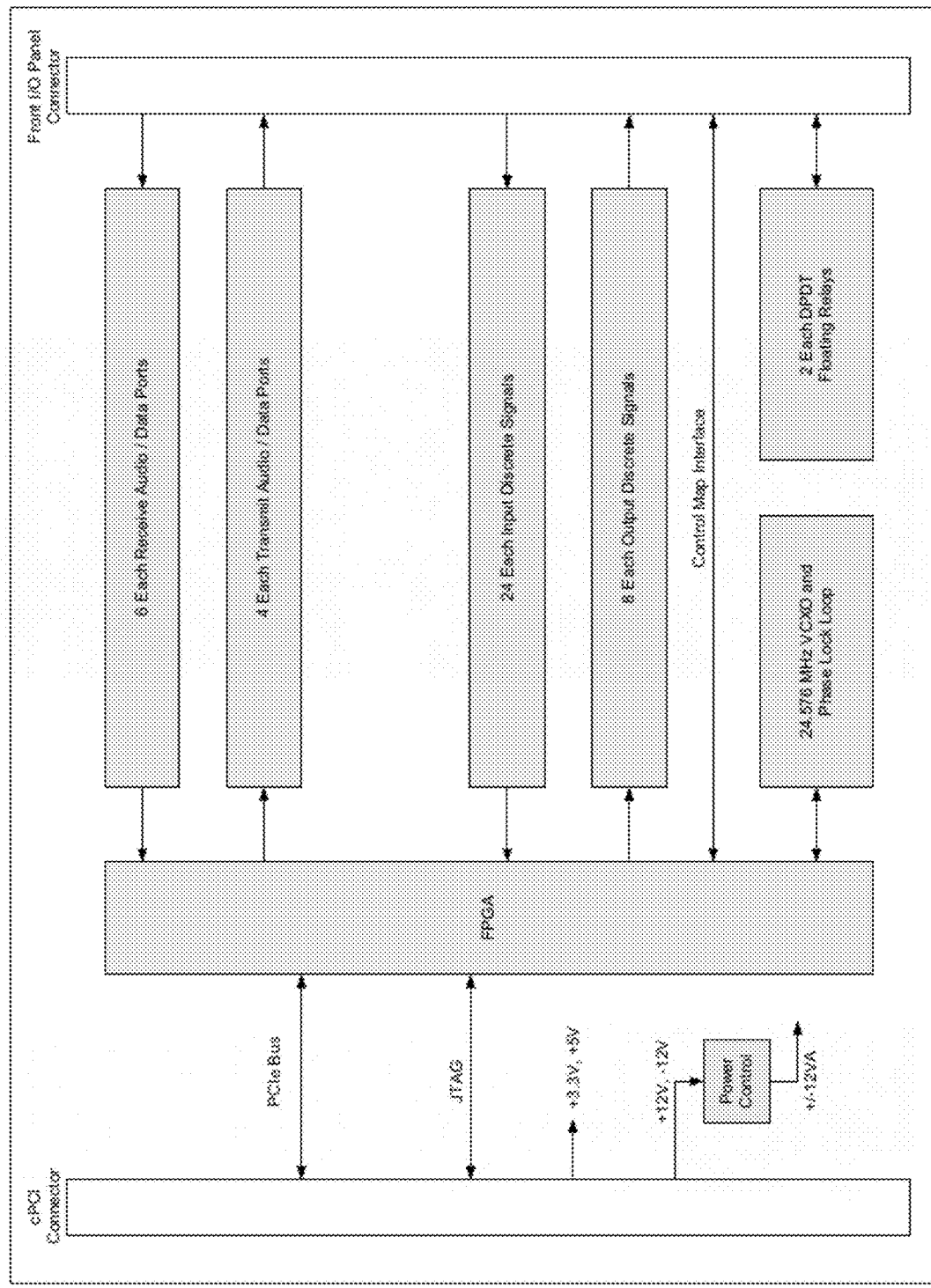
FIG. 17 is a schematic block diagram of an input/output (I/O) card of the RIU of FIG. 15.

FIG. 17 illustrates an exemplary RIU communications I/O (CIO) card. The CIO card interfaces to radios, cryptos, navigation aids, data modems, etc. The CIO card may also accommodates legacy type analog and digital interfaces. In one example, the CIO card may include six audio/data receive ports, four audio/data transmit ports, 24 discrete inputs, and eight discrete outputs (e.g. relay closure).

Each CIO may support six transformer coupled analog receive ports, and four transformer coupled analog transmit ports. With 4 CIO cards, the RIU supports 16 transceiver interfaces, 8 receive only interfaces, and 4 intercom channels using virtual ports that do not require a physical interface. The CIO supports 24 bit 48 kHz sampling. Each CIO card supports various discrete inputs and discrete outputs to connect with external equipment. The port type, analog or digital, as well as analog input and output voltage and impedance levels are programmable via the communication plan. The levels are pre-programmed during manufacturing and may be reprogrammed using the Ethernet interface using the ARINC 615A data loader.

The control of transmit and receive ports is handled in conjunction with programmable hardware (RIU Comm. FPGA, RIU Processor FPGA and ACP Processor FPGA). Each RIU circuit may be assigned a fixed security control level based on Control Map information provided to the CIO card, via a serial connection between the RIU Processor FPGA and the RIU Comm. FPGA. The security control level of an RIU port and each ACP may be allowed to vary between allowable security levels as defined in the Control Map and authority strapping of the ACP. Invalid connections between clear and secure circuits are disallowed by hardware and software interlocks, and non-authorized ACPs are blocked from access to secure circuits using these mechanisms.

In some examples, the CIO card does not have a processor and therefore, no software will be running on the card. Encryption/Decryption logic may be added at the CIO to mitigate latency. Security interlocks used to define channel security level and detect security misrouting may be hardware-based.

The RIU power supply card is a standard form factor, conduction cooled, PCIe card that plugs into the RIU and provides the standard DC voltages needed by PCIe cards. The power supply card converts the +28 VDC nominal input voltage to +5 VDC, +3.3 VDC and +/−12 VDC for use by the other PCIe cards. The power supply card has the ability to work in a redundant load sharing fashion if another power supply card is installed in the RIU. However, a single power supply card has the ability to power the entire RIU. In addition, a single power supply card may also provide energy storage to allow the entire RIU to remain powered during a power drop out up to 150 ms. This time interval that the RIU remains powered without input power applied is often referred to as hold-up time. If two power supply cards are installed in the RIU, the unit hold-up time may be longer than 150 ms.

Figure 18:
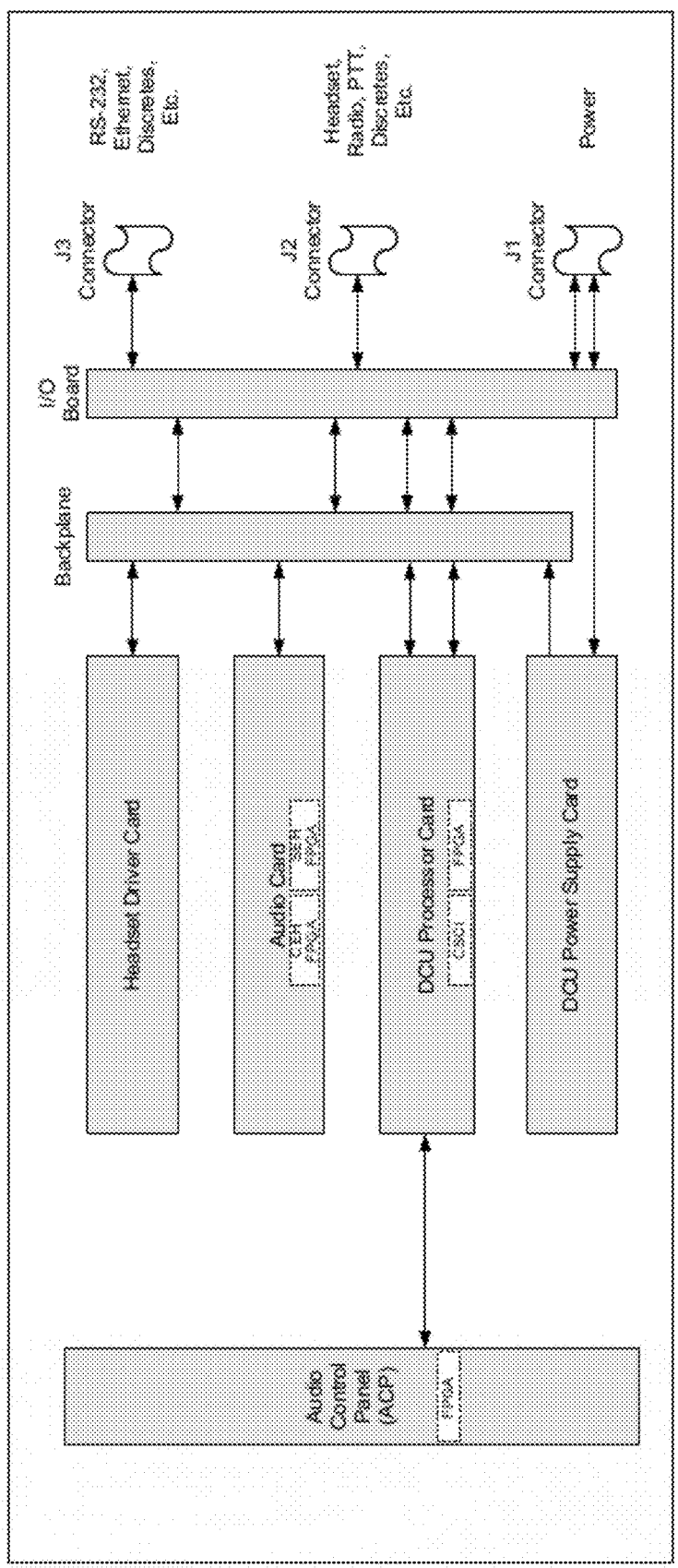
FIG. 18 is a schematic block diagram of the ACP of the ICS of FIG. 11.

Turning now to FIG. 18, illustrated is a block diagram of an ACP according the first exemplary implementation of the ICS. The ACP is housed in a sealed enclosure that uses captive fasteners and may be conduction cooled without the need for forced air. The ACP may communicate with the RIU over an Ethernet interface to provide access to all audio channels available to the pilot. Additionally, the ACP may provide backup capability to provide radio communication to the ACP operator in the event the RIU is not operating normally. The ACP may include three M38999 connectors on the rear of the unit. One M38999 connector is used for maintenance signals and strapping for discrete inputs. A second M38999 connector is used for analog I/O and discrete control connections. The third connector may be used for input power, supporting two independent power sources.

As shown in FIG. 18, the ACP includes a DCU processor card having a processor to facilitate automatic gain control (AGC), volume control, etc. The audio card accommodates the analog audio and additional discrete control interfaces associated with the ACP. The audio card provides the A/D conversion for analog inputs such as microphone audio and the local asset interfaces for radios and the CALL Net as well as the D/A conversion for outgoing audio signals such as headset earphone and local asset interfaces such as radios, Cockpit Voice Recorder (CVR), and the CALL Net. The headset driver card provides the analog amplification necessary to drive low or high impedance headset earphones for each headset and also drives the CVR interface on the ACP. Analog connections associated with backup/emergency mode are supported on the audio card. The DCU power supply card converts +28 VDC Main and Emergency inputs to lower DC voltages for circuits. Emergency power supports Flight Essential/Mission Critical functionality such as COM 1/COM 2 operation when in Emergency Mode (loss of Processor or loss of Main power). The backplane distributes signals among the DCU processor, audio, headset driver, and power supply cards. The I/O board provides mounting for connectors (such as circular MIL-DTL-38999 connectors) and routes I/O signals to and/or from the backplane.

The ACP Application (Main and Maintenance) and Bootloader Computer Software Configuration Item (CSCI) executes on the ACP Processor board. Configuration files, loaded during manufacturing or updated with the ARINC 615A data loader, identify, to the ACP main application, the controls available at the front panel, allowing the available functions to be provided to the user. A panel identifier may be provided to the ACP main application via the serial interface. The panel identifier, in examples, matches the identifier in the configuration file to enable the ACP main application to use the panel.

ACPs may provide each pilot with access to internal communications and radio audio functions. The ACP units may have panel control interfaces that allow the operator to control these circuits and other ICS related assets. The ACP may provide the audio interface for each crew member headset. The ACP contains a headset audio amplifier, a microphone audio amplifier, PTT interfaces and the VOX threshold sensitivity control. The ACP may include Hot Mic and VOX functions to enable the operators to operate intercom circuits in a hands free manner.

In addition to "Normal Mode" operation, the ACP may provide an Emergency Mode for degraded operation when main power is lost or the processor fails to run properly (as determined by a watchdog timer). Upon power up, the ACP hardware provides emergency mode functionality by default.

The processor (i.MX 8M based on Arm Cortex A53) may be used in the RIU and in the ACP. For the ACP, the processor facilitates automatic gain control (AGC), volume control, external control of the ACP panel brightness, discrete signals, etc. The processor card may also provide two gigabit Ethernet interfaces. One Ethernet port on each processor may be used to interface with redundant encrypted black/encrypted red LANs since encrypted data makes the LAN black. The Transmit, Receive, and security status for each circuit controlled by the ACP may be reported via its Ethernet interface. The microprocessor may be modified to support the zeroize function.

The audio card may accommodate the analog audio and additional discrete control interfaces associated with the ACP. The audio card provides the configurable levels and bias voltages as well as the linear A/D conversion for analog inputs such as microphone audio and the local asset interfaces for radios and the CALL Net as well as the linear D/A conversion for outgoing audio signals such as headset earphone and local asset interfaces such as radios, Cockpit Voice Recorder (CVR), and the CALL Net. The audio card may support dedicated radio, ICS, and a generic PTT input discrete for each operator.

The audio card may support both Analog and Digital interfaces to earphones and microphones. The audio card may be configured to detect the MIC type and auto switch to a low level dynamic microphone with low impedance earphones or a high level microphone with high impedance earphones.

An ACP front panel may include a plurality of controls and/or indicators. The controls or indicators may include, for example: a master volume applied to all sources, an interphone transmit selector to select one radio to transmit, an radio transmit select control to select a radio to transmit, a circuit receive selection status indicator (e.g. solid indicating enabled and blinking indicating receive activity), circuit transmit selection status (e.g. solid indicating transmit enabled), circuit security status indicators that show a normal or encrypted status indication for transceivers, radio transceiver circuits having push button toggles selection of a radio for receive, NAVAID or Rx only circuits having a push button toggle to select receiver to receive, an emergency and backup mode indicator (e.g. EMER LED On=Emergency Mode and BKUP LED On=Backup Mode), a mode selector switch (e.g., Middle=NORM, Up=EMER, Down=BKUP), a mute button to mute all reception except radio and net selected for transmit, a call button for crew communication in normal, backup, and emergency modes, an interphone circuits push button to select/deselect NET for receive, a VOX status indicator to indicate which NET ICS PTT is activated by voice, and a VOX control sets threshold (e.g. Fully Clockwise=HOT MIC).

Using the front panel, a user may select a radio and an interphone for transmit and any combination of clear or secure receive channels. The ACP provides the user the ability to safely navigate and communicate both internally and externally. External brightness control, by way of voltages and discrete signals interfaced to the ACP processor, may supports full OFF to full ON via a configurable lighting curve.

On an ACP operator interface, an operator can select a desired audio source using dedicated ACP rotary controls. These controls includes, for example, 10 transceiver on/off/volume controls for 10 specified transceivers, 1 radio transmit select control (e.g. a 10 position rotary), 4 receive on/off/volume controls for the 4 specified receivers, 5 Net on/off/volume controls (configurable NET1-4 and an ALL NET), 1 ICS transmit select control (5 position rotary for NET1-4 and ALL NET). In addition, to audio transmit and receive controls, other operational controls (e.g. rotary and/or push buttons) for master volume, VOX (off, threshold adjust, hot mic), CALL pushbutton, MUTE pushbutton, and a mode switch.

The ACP provides 10 independent radio controls. These controls include and/or provide smooth potentiometers for radio receive volume control, push on/off rotary switches with a blue LED indicator for a radio receive enable/disable indication (i.e. saves a volume level when the transceiver cycles through selection and deselection), receive volume to be decreased when turned counterclockwise and to be increased when turned clockwise, and a security (e.g. clear or secure) indicator having a green LED above the radio control. A radio transmit selector switch allows selection of a single radio for transmission. The selector may be a rotary switch to allow for quick transition from one radio to another. Radio transmit enable may be indicated by a pointer pointing at the radio number matching a number at the radio control and a middle white Tx Enable LED above the radio control.

Multiple ACPs have the ability to select the same radio for transmission, but in Normal Mode, the first to initiate a Radio PTT takes control and the other crew stations are locked out from transmission on the radio. Flight Deck ACPs may have automatic Transmit Priority over any Passenger ACPs for all on-board radios. This may be accomplished by designating the ACP type in the communication plan configuration (Flight Deck vs Cabin), and the software will use this to enforce priority keying of flight deck radios.

The ACP provides four rotary controls for the four specified receivers. Each rotary control provides a smooth potentiometer for receiver volume control and includes a push On/Off rotary switch with a single blue LED indicator for the receiver Receive Enable/Disable indication to allow the volume level to be saved when the receiver cycles through selection and deselection. The rotary control decrease volume when turned counterclockwise and increases the volume when turned clockwise. A security indicator (e.g. a green LED) indicates a clear or secure status above the radio control. Multiple transceivers and receivers can be selected for simultaneous reception, including simultaneous red and black reception in Normal Mode with no degradation on ICS performance.

The ACP provides five independent NET1, NET2, NET3, NET4, and ALL NET controls. Each control can be a smooth potentiometer for ICS Net volume control and include a push On/Off control with a blue LED indicator for Net Receive Enable/Disable indication. This allows volume level to be saved when the Net cycles through selection and deselection. Receive volume is decreased as it is turned counterclockwise and increased as it is turned clockwise. The ACP also provides a Net Tx Selector switch (NET Tx Sel) that allows selection of a single net for transmission. The switch may be a rotary switch to enable quick transition from one net to another for flexible and responsive transmission. Net transmit enable can be indicated by NET TX SEL pointer pointing at the Net number and/or a middle white Tx Enable LED indicator lights above the radio control. In an example, the right-most white LED above each Net control can indicate that VOX is active for that net (described in the paragraph below). Thus, one net can be selected to be activated by ICS PTT and another net can be activated by VOX PTT.

A VOX control for the microphone can, for ICS Nets, be switched to VOX off when turned fully counter-clockwise, adjusted to a particular sensitivity level when moved clockwise, and set to full VOX sensitivity (HOT MIC) when rotated to the farthest clockwise position. The Master Volume control adjusts the conference of all audio sources, except for any warnings that are configured to be not adjustable. Although the ICS may automatically support three modes of operation (NORM, BKUP, and EMER), the Mode Control switch allows the operator to override of Normal Mode to Backup Mode or Backup Mode to hardware-based Emergency Mode. Backup and Emergency Modes provide flight essential communications via analog emergency radios that are wired to that ACP's emergency radio ports. The MUTE pushbutton allows for the operator to exclude all ICS net and radio audio except for the net and radio that are selected for transmit. The MUTE pushbutton acts as a latched toggle (latched MUTE On/MUTE Off) with an LED above the MUTE pushbutton to indicate when MUTE is active. The CALL pushbutton allows for the operator to talk on the CALL Net, which is heard by all operators in NORM, BKUP, and EMER modes. The CALL pushbutton acts as a momentary pushbutton that activates CALL transmit when pushed and deactivated CALL transmit when released. An LED indicator above the CALL pushbutton lights when CALL transmit or receive is active.

The ACP power supply card is a conduction cooled, circuit card assembly that plugs into the ACP and provides the standard DC voltages needed by ACP cards. The power supply card converts the +28 VDC nominal input voltage to +5 VDC, +3.3 VDC and +/−12 VDC for use by the other CCAs. The ACP power supply supports both main and emergency power forms and provides overvoltage protection, holdup capacity, Dc regulation, redundancy and BIT.

The headset driver provides 5 drivers to support 2 ears for 2 operators and a Cockpit Voice recorder. The 2 ears for the operators support binaural or stereo operation and are configurable to support 19 ohm, 300 ohm, and 600 ohm earphones. The drivers are designed to provide up to 1 watt of power to an H-157 headset and 125 mW into the 300 ohm earphone of a Bose A-20 headset which should be able to meet the required 125 dBSPL.

An Audio Maintenance Panel (AMP) is a wired station. The unit may use a connection to a secondary MIC and HDST connection of a nearby ACP and may utilize unused input discrete signals to support volume up/down controls for the received audio volume.

An optional wireless system enables crew members to maintain full duplex communication in the noisiest and most extreme environments. Clear communication enhances safety and situational awareness during missions by removing cable hazards and allowing multi-channel, full duplex, hands-free communication for every crew member working in or outside the platform. The system can provide unmatched noise cancellation and is designed to provide clear communication even when operating in surrounding noise from rotor blades or wind. The system is fully airworthiness qualified and the handsets have a robust metal housing, allowing full operation when submerged in seawater. Typical operation range is up to 5 km line of sight range from the platform. A proven, high-performance solution for harsh, demanding environments, as demonstrated by the ability to overcome extreme noise and provide high-quality waterproof communications. The system is designed to work in voice activation (VOX) mode and also incorporates two push-to-talk switches.

The wireless solution offers a unique and state-of-the-art software-defined radio, operating in the UHF band. The wireless system can accommodate more than sixteen (16) handheld transceivers. The system supports intercom group configurations, mixing both wireless and wired crew. The transceivers' optional GPS feature provides the position of external crewmembers to onboard crew or wired directly into the aircrafts sensor system for immediate acquisition of personnel. The wireless system is a versatile platform which includes the following key system features and capabilities: inherent encrypted secure communications (AES256); support for common aircraft headsets/helmets, including dynamic, amplified and carbon level microphones; handset rechargeable battery—12-16 hours of mission operation with up to 30-hours of stand-by operation; operates in the UHF band for added reliability; adaptive noise canceling; high audio quality in a high noise environment; applique battery module to extended missions or hot-swappable power replenishment; unmatched noise canceling, enabling enhanced Voice Activation (VOX) function; full duplex; compact and small form factor; NIVOX Mode: Non-Interrupted VOX mode operation; PTT Mode: Pressing a single button takes the unit from VOX to PTT if desired; PTT-2 feature enables direct relaying through aircraft mounted C4/radio equipment; advanced Echo canceling enables undelayed sidetone on long transmission paths; line-of-sight range; shock absorbing aircraft charging cradle (12-28 VDC); unlimited number of users; easy set-up with limited training required; group configurations available; and optionally Dual Band operation utilizing UHF and VHF band channels.

The optional wireless system communicates with the wired ICS via a Wireless Base Station (WBS) using AES67 Audio over IP Ethernet. The WBS provides 2 wireless channels (e.g., ICS and Radio) that are available to the RIU and ACPs that are assigned to those channels via the communication plan. A net (e.g., ICS NET 4) may be assigned as the "Wireless Net" to ACPs via the communication plan such that authorized wired operators can talk to wireless users and vice-versa. The communication plan can provide a default radio connection to the Radio channel for wireless access when desired. Wireless user ICS and Radio access can be assigned by the communication plan to follow a designated ACP for flexible communication (Wireless Mirroring). Thus, whatever that ACP operator enables on that panel will be what the wireless users will hear and transmit on. For example, if the communication plan designates ACP #5 as the Wireless Mirror and Net 4 as the Wireless Net, and the operator has selected VHF AM for transmit, UHF AM to receive, and IFFT to receive, all wireless users will be hearing VHF AM, UHF AM, IFFT, and ICS NET 4. When they press ICS PTT on the wireless handset, they will transmit on ICS NET 4 and any ACP with NET 4 receive-enabled will hear the wireless user on NET 4 (the designated Wireless Net). When they press RAD PTT, they will transmit on VHF AM. When they talk on VOX, only wireless users will hear them.

The wireless system control panel allows for configuration and real-time control of the wireless system. The control panel is designed with a DZUS 146 mm mechanical format, five height units, to be installed in the platform. The control panel is connected to the base station via a dedicated CAN bus. An additional power supply is not required, as power is supplied by the base station through the same cable. The control panel is remotely dimmable and may be wired to a central dimming system. The Wireless System Control Panel (CP) can be used to select the Low Power antenna for Low Power Mode, or the operator can set the wireless system to High Power mode which uses the High Power antenna.

The first exemplary implementation enables: audio to/from two independent headset interfaces (microphone, array, earphones, PTT In); audio to/from five configurable ICS nets (five nets individually selectable for transmit); audio to/from all crew stations during any operational mode (CALL Net at 6 dB higher than all other audio); audio to/from 10 transceivers (10 radios individually selectable for transmit); audio from 4 receivers (mutable and unmutable are user configurable); simultaneous Red/Black operation with Red interlocks during Black transmission to prevent ear to microphone coupling; side tone (Analog sidetone source is configurable. Digital sidetone is "local" per AES67 protocol); voice messages and tones generated by the ICS, triggered by Ethernet messages or external discrete inputs; configurable recording streams the selected source to the network storage; available composite analog audio for a Cockpit Voice Recorder (CVR) from each ACP; master volume control for all mutable audio sources; analog radio/crypto interfaces with discrete signals (PTT Out, Rx Indicate, Mode Indicate, etc.); dual redundant encrypted ICS Ethernet interfaces to support the ICS LANs; three modes of operation support graceful degradation: NORM, BKUP, and EMER; hardware-based EMER mode is activated upon power-up to provide each ACP with 2 Emergency Radios and CALL to all ACPs within 1 second of power-up; 7 spare ACP positions, 5 spare transceivers, and 4 spare receivers provide growth for the FLRAA configuration; built-In-Test providing system and LRU BIT to the Ethernet interface; setup (Comm Plan) and modes communication control via Ethernet; and EMCON providing full ICS functionality for operators within the aircraft while limiting RF transmissions. The optional Wireless System offered by Palomar provides:dthernet interface on wireless base station provides two wireless channels; wireless base station provides low-power (cabin) and high-power (external) UHF antenna interfaces; and the wireless base station communicates with the wireless handsets using encrypted audio.

Second Exemplary Implementation

FIGS. 19-44 illustrates various aspects of a second exemplary implementation of the systems described above. The second exemplary implementation may be a multilevel voice over internet protocol (MVIS) intercom system (MVIS) that may be deployed in an aircraft, for example.

Figure 19:
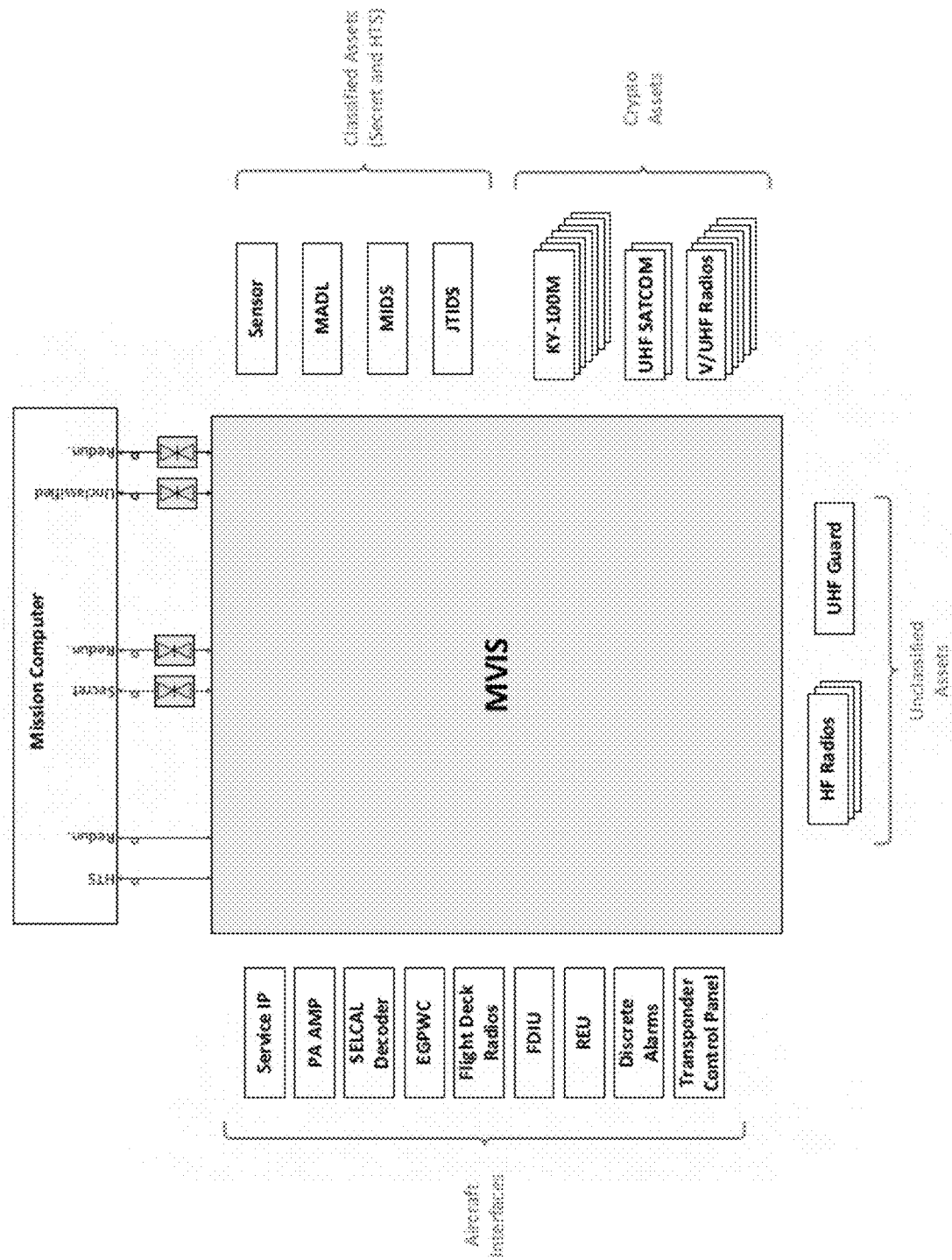
FIG. 19 is a schematic block diagram of a multilevel voice over IP (VoIP) Intercom System (MVIS) according to various aspects.

Turning initially to FIG. 19, a high-level diagram of an environment in which the MVIS is deployed is illustrated. FIG. 19 depicts the interfaces of the MVIS, including external components of an aircraft in which the MVIS is deployed. The system interfaces are divided into the following: classified assets (top right area), crypto assets that connect to all three security levels (bottom right), unclassified assets (bottom), aircraft interfaces (left), and connection to Mission Computer System (top). The link to the unclassified and secret connections to the Mission Computer is secured via data diodes to avoid data leakage between classification levels.

Figure 20:
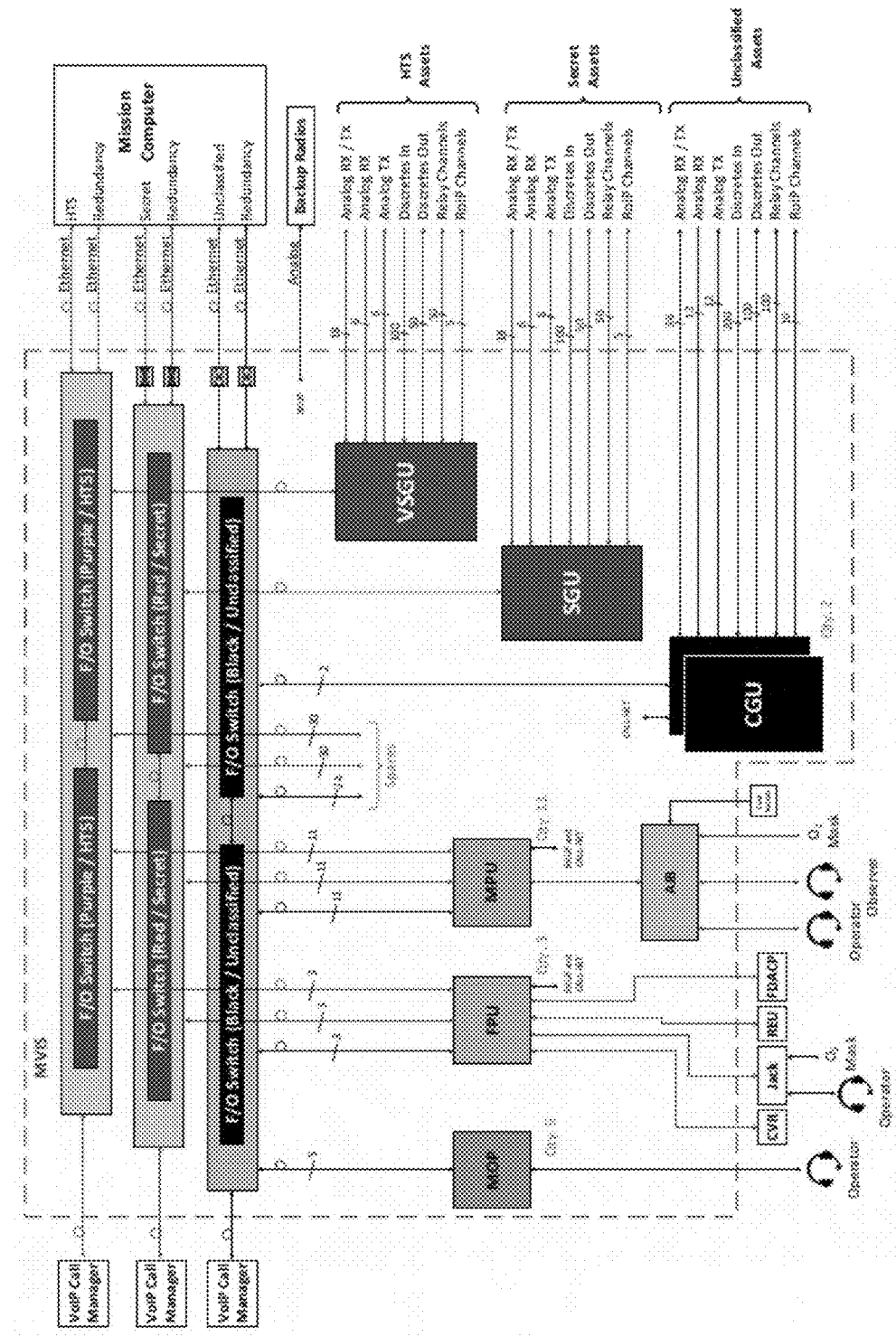
FIG. 20 is a schematic block diagram of an architecture of the MVIS of FIG. 19.

FIG. 20 illustrates an architecture of the MVIS. The MVIS, as shown in FIG. 20, includes three networks, data diodes, four gateway units, flight-deck position unit (FPU), mission position unit (MPU), maintenance operator panel (MOP), and an audio jackbox (AJB). The three networks include physically separated fiber-optic network switches for unclassified, secret, and higher than secret (HTS) classification networks. An array of data diodes protect data leakage between the different networks (located between the Mission Computer and the Secret and Unclassified Switches). The Gateways connect to external interfaces (located on the right of the diagram). The Secret and HTS network features one Gateway, and the Unclassified network features two Gateways. The position units are crew positions for flight deck and mission areas and are connected to all three networks. The MOP is connected to an unclassified maintenance network. The jackbox extends the connection between MPUs and the operator headsets.

The system architecture is based on a distributed network approach with Fiber-Optic channels that connect the various Line Replaceable Units (LRUs) through a Commercial Off the Shelf (COTS) Fiber Optic network switch. The two main LRUs are the gateway units and the crew position equipment, which provide the required user interface. The gateways serve as the connection point to various radios, networks, and, other audio sources to the MVIS. The crew position equipment is the end device that provides the user the ability to choose which channels to listen to and which channels to talk on. The position equipment; Mission Position Unit (MPU) and Flight Deck Position Unit (FPU), have different user panels based on the operator use case, with the core hardware electronics being the same for each LRU type.

The MVIS architecture uses two 24-channel COTS Fiber-Optic switches for each network (Unclassified, Secret, and HTS), connected via link-aggregation. Since the MVIS requires multiple levels of security including Unclassified/Black, Secret/Red, and HTS/Purple, three parallel networks are provided: an Unclassified network, a Secure network and an HTS network. A single Gateway hardware design is provided for each network, referred to as "Gateway". Each network has a dedicated Gateway, a Clear Gateway Unit (CGU), a Secret Gateway Unit (SGU), and a Very Secret Gateway Unit (VSGU). Each network has a dedicated optical switch array and the three networks are carefully kept separate using multiple levels of security logic.

The VoIP capability of the Proposed MVIS architecture is divided into two capabilities. The VoIP Call Manager can be an externally provided Call Manager or an integrated Call Manager embedded in the MVIS Gateways. The VoIP Client can be a dedicated VoIP client running on the position Processor module. This will provide the capability to make VoIP calls from each crew position. An external Call Manager may bypass the Gateway and connect directly to the Fiber-Optic Network Switch, which can provide access to the crew positions. An integrated Call Manager may pass all VoIP communication through the Gateway before accessing the Fiber-Optic Network Switch.

Figure 21:
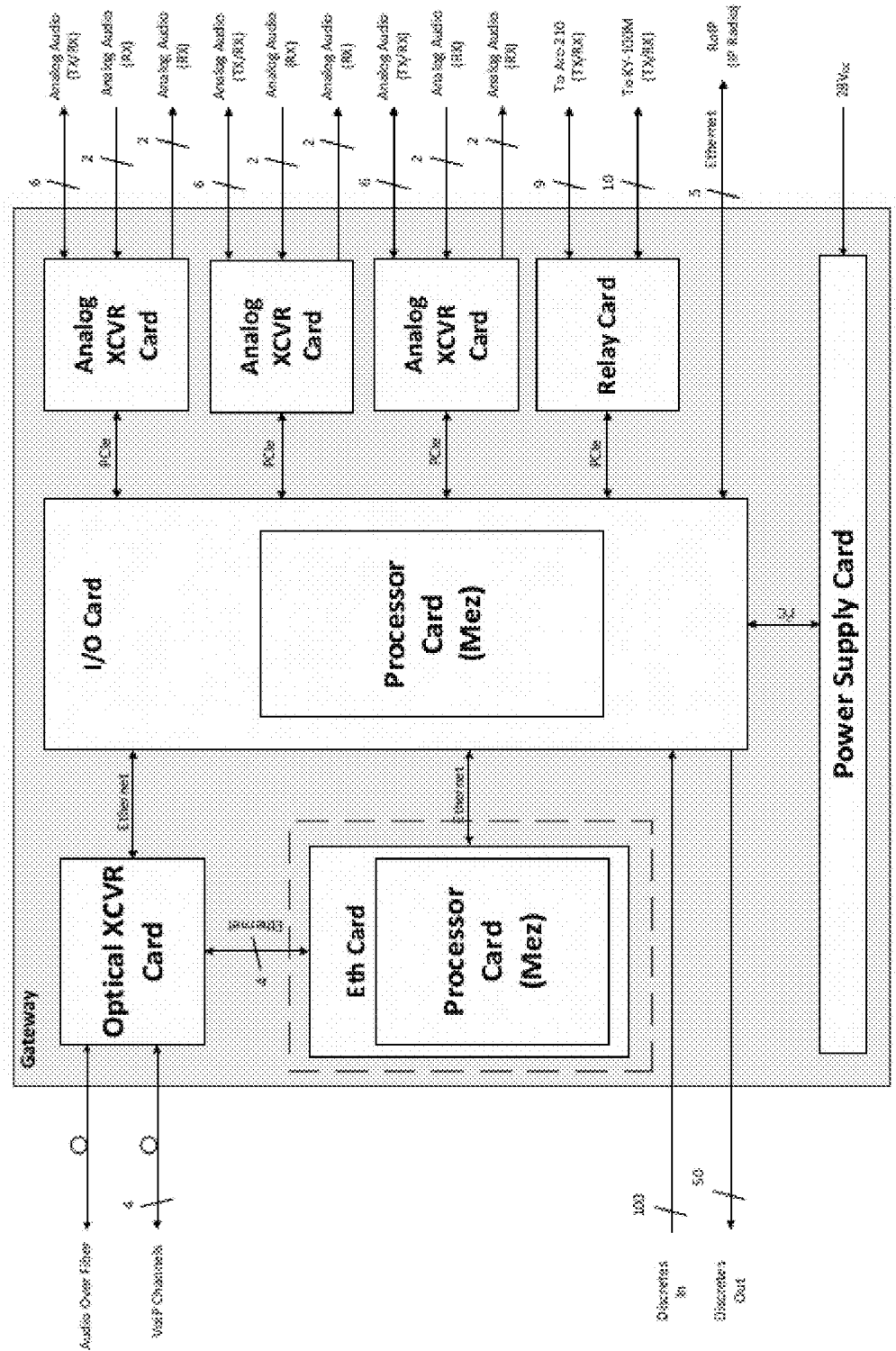
FIG. 21 is a schematic block diagram of an exemplary gateway device of the MVIS of FIG. 19.

FIG. 21 illustrates an exemplary gateway. According to an example, the MVIS reuses the same gateway for the three security levels. The Gateway provides an ANSI/VITA 65, 3U OpenVPX standard with eight card slots (seven populated slots and one spare slot for future growth). The Gateway interfaces the internal cards via Peripheral Component Interconnect Express (PCIe) protocol and Inter-Integrated Circuit (I2C) protocol. Communication outside the Gateway is achieved by various protocols based on the different assets connected to the Gateway.

The gateway includes various cards. The first card is the relay card located next to the front panel. This card is responsible for routing audio between Gateways for radios with embedded crypto (such as the ARC-210 radio), and to route audio to the KY-100 crypto devices. The second card is the power supply card based on the VITA 62 power supply for VPX systems. The next three cards are the Analog Transceiver cards. Each card supports six analog transceivers, two analog receive, and two analog transmit paths. The sixth card is the Processor module, which features a carrier IO card and a mezzanine Processor card based on the VITA 88 XMC+ standard. The seventh card is the VoIP module, which features a carrier Ethernet card and a mezzanine Processor card similar to the one used on the Processor module. In some cases, the reference is to a card and in other cases, the reference is to a module. In places where it is only a single card, the reference is "card" (for example Analog Transceiver card), and in cases where it is an assembly of a carrier and a mezzanine card, the reference is "module" (for example, processor module that includes an I/O carrier card and a processor card).

Figure 22:
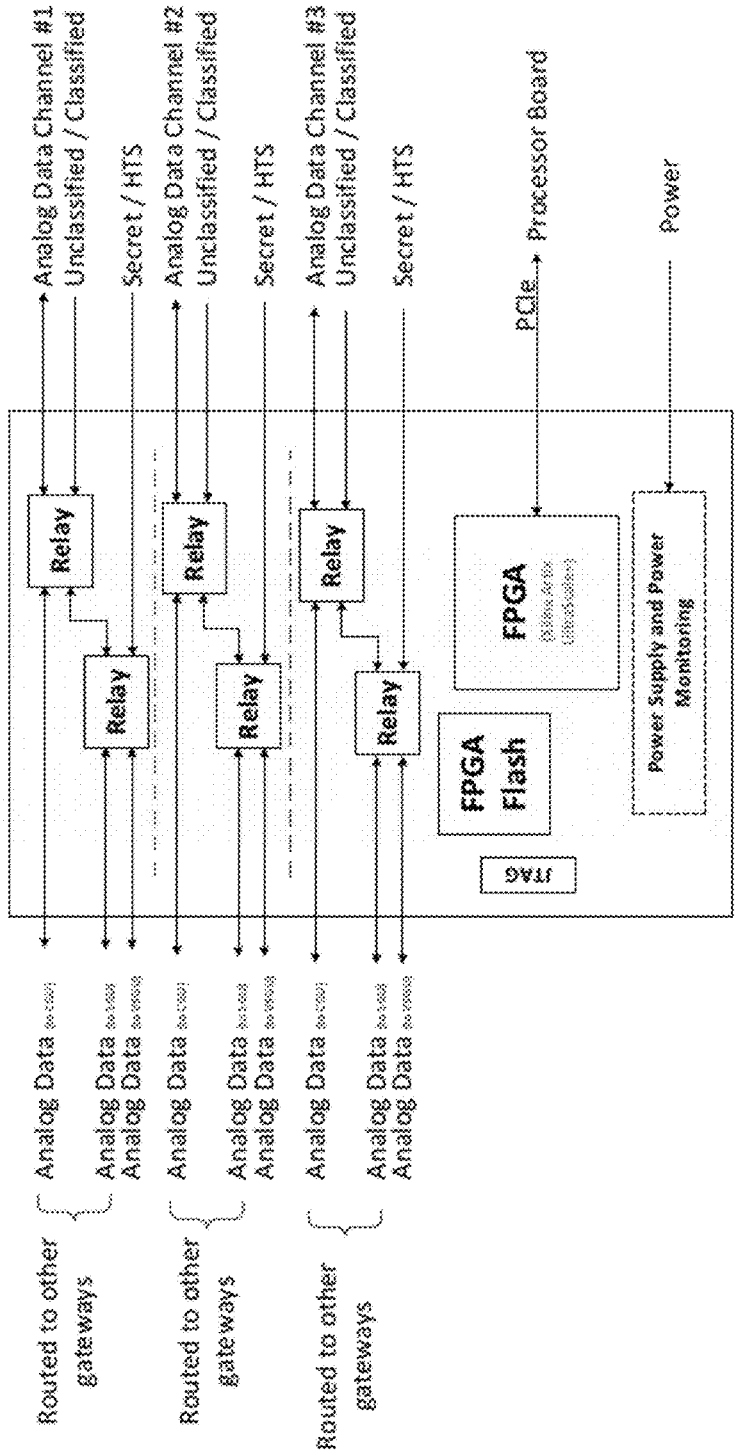
FIG. 22 is a schematic block diagram of an exemplary relay card of the gateway device of FIG. 21.

FIG. 22 illustrates an exemplary relay card. In the block diagram, there are three relay channels to represent the concept of relay isolation. It is to be appreciated that the actual number of relay channels is greater. The relay card is added to support the switching and isolation requirements that apply to support assets such as the KY-100 cryptos, ARC-210 cryptos, and Link22 topology. The concept is that assets such as ARC-210 have a single audio channel, but the received data may be in different classifications. The relay array can route the data to the correct Gateway without processing it. A goal is to prevent data in a certain security level to be sent to the wrong Gateway. To avoid data leakage, the relay methodology that provides proper isolation. The relay card is located as close as possible to the Front Panel of the Gateway to prevent signals flowing through the Gateway and prevent potential data leakage. The relay card will be based on ANSI/VITA 65 OpenVPX standard. The card can communicate with the Processor module via a PCIe Interface. The communication can be for control and status messages only.

Figure 23:
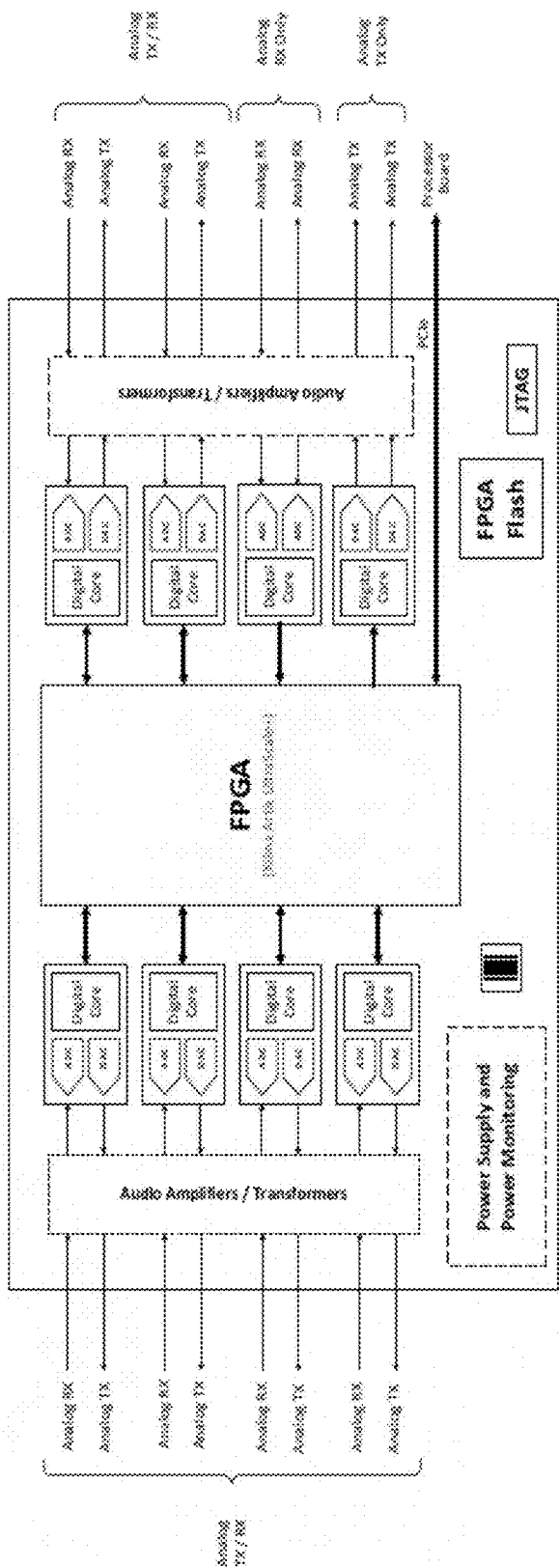
FIG. 23 is a schematic block diagram of an exemplary analog transceiver card of the gateway device of FIG. 21.

FIG. 23 illustrates an exemplary analog transceiver card. The card provides six analog transceivers, two analog receivers, and two analog transmitters. The Analog Transceiver card can be based on ANSI/VITA 65 OpenVPX standard. The card can communicate with the Processor module via a PCIe Interface. The communication can be for control and status messages, audio data. All audio data transferred between the Analog Transceiver card and the Processor card can be encrypted. Received analog audio can be converted into digital and then encrypted before flowing through the MVIS. Data received as digital from the processor can arrive encrypted and can be decrypted before being sent to the CODEC for analog conversion. The area marked as "Audio Amplifiers/Transformers" in the block diagram shows the location of the front-end components needed to support requirements such as input and output impedances and signal amplitude and power, etc. The Analog Transceiver card populates three slots in the Gateway, with an option for one additional card in the spare slot.

Figure 24:
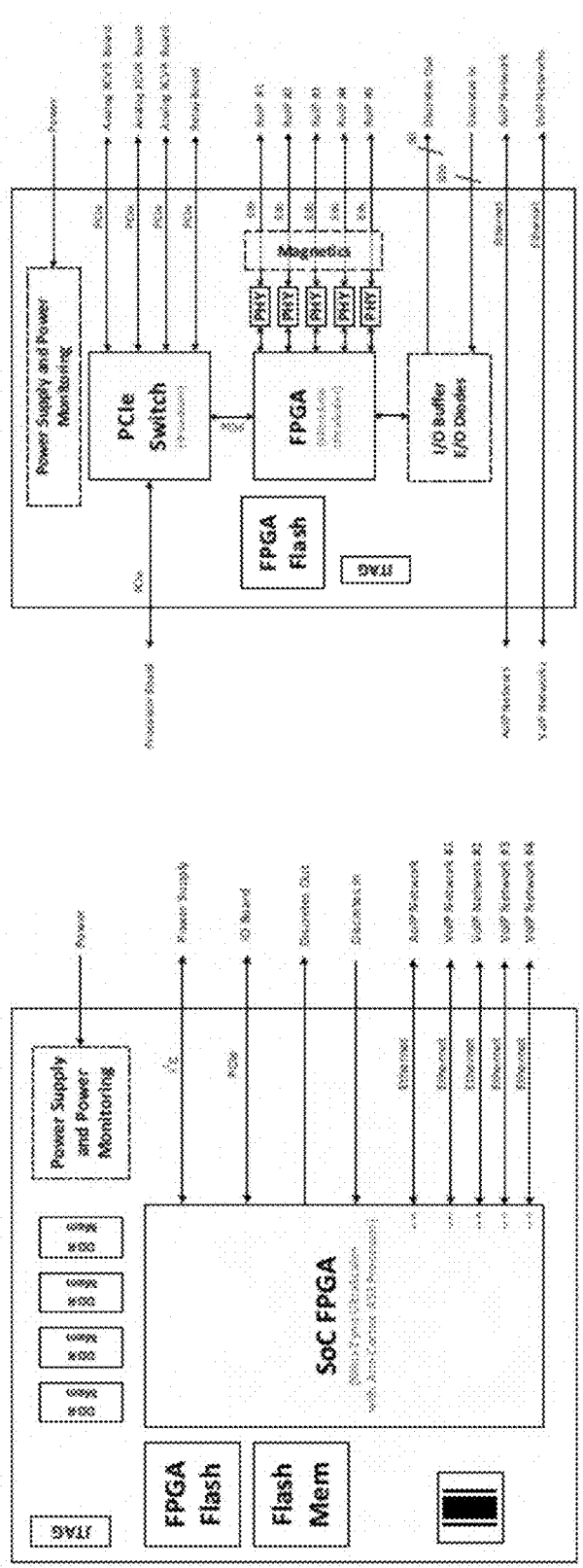
FIG. 24 is a schematic block diagram of an exemplary processor module of the gateway device of FIG. 21.

FIG. 24 illustrates an exemplary processor module. The processor module is based on ANSI/VITA 65 OpenVPX standard with an IO carrier card and a Processor Mezzanine card based on ANSI/VITA 88 XMC+ standard. The IO card interfaces the discrete signals, Ethernet signals from Radio over Internet Protocol (RoIP) assets, and contains a PCIe switch that allows the Processor card to communicate with all the cards in the Gateway. The RoIP assets can communicate audio data to the IO card. Since the IO card is the entry point for the RoIP data to the MVIS system, the audio can be encrypted when it enters the FPGA and before being sent to the Processor card. The Processor card utilizes a Xilinx Zynq UltraScale+ FPGA featuring a Quad-Core Arm Cortex-A53 embedded processor, running a Real-Time Operating System.

Figure 25:
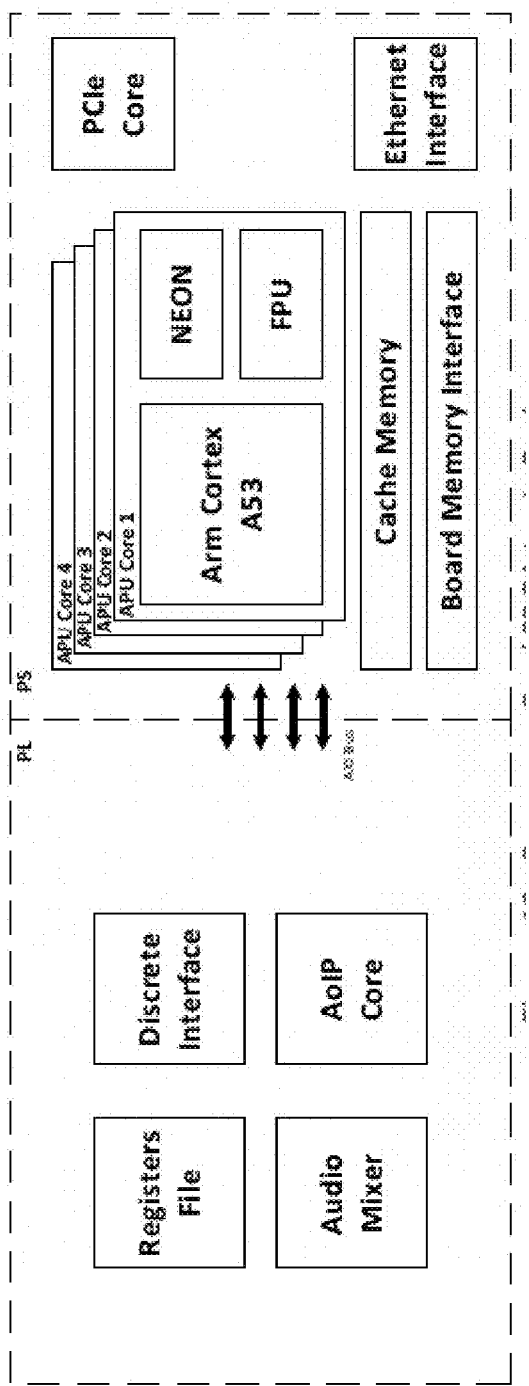
FIG. 25 is a schematic block diagram of an exemplary processor logic design for the processor module of FIG. 24.

FIG. 25 illustrates an exemplary logic design for the processor card. The FPGA features an embedded processor and the following two sections for the FPGA; the Processing System (PS) and the Programmable Logic (PL). The PS side has dedicated silicon to support features such as processor, PCIe core, memory interfaces. The PL side is dedicated to custom logic. The communication between PS and PL is done via the Advanced eXtensible Interface (AXI) bus developed by Arm. The PL side has a register file, an AoIP core, a discrete interface, and an audio mixer. All the data provided from the system via the AXI bus will be stored in dedicated registers. Registers can also include information such as card and firmware version. The AoIP core is a dedicated IP core. The core handles sending all the audio data to the AoIP network. As previously described, all audio in the MVIS architecture can be encrypted at the data source and therefore, all data going through the Processor card is encrypted. All the discrete signals can be received by the IO card and transferred to the processor card for processing. Audio mixing function may be done at the crew position levels and not at the Gateway. This audio mixer block, in an example, supports mixing between the MOP audio and the service interphone audio. The MOP data can be present on the AoIP network, but the Service Interphone may be connected to the Unclassified Gateway and therefore, a small mixer was added to the logic design.

Figure 26:
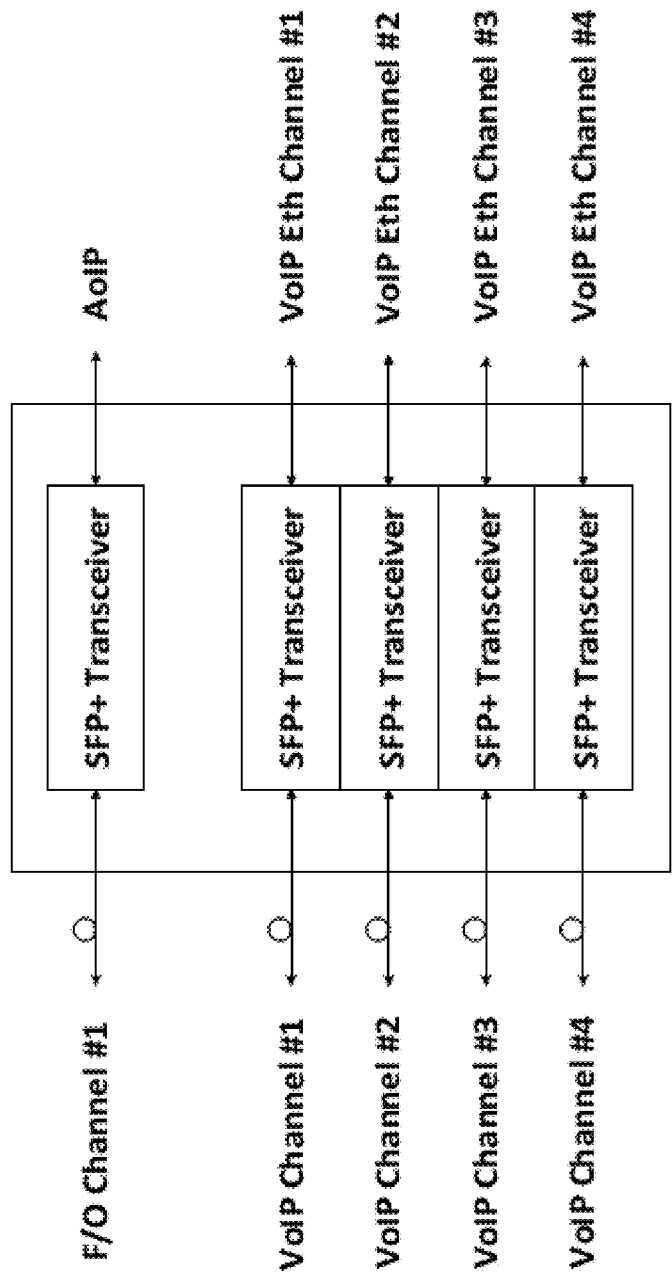
FIG. 26 is a schematic block diagram of an exemplary optical transceiver card for the gateway device of FIG. 21.

FIG. 26 illustrates an exemplary gateway optical transceiver card. The Optical Transceiver card provides the optical interface by housing the Small Form-Factor Pluggable (SFP) transceiver modules. SFP+ is an upgrade of the SFP form-factor that can support data rates of up to 10 Gigabit Ethernet (GbE). Each Gateway can support a single Fiber-Optic transceiver for the AoIP network and four Fiber-Optic transceivers for the VoIP channels. The VoIP channels may interface with VoW Call Managers embedded in the Gateway. If the VoIP Call Manager is external to the MVIS, the VoIP input from the Call Manager may bypass the Gateway and connect directly to the Fiber-Optic Switch. The optical transceiver is located under the Gateway backplane.

Figure 27:
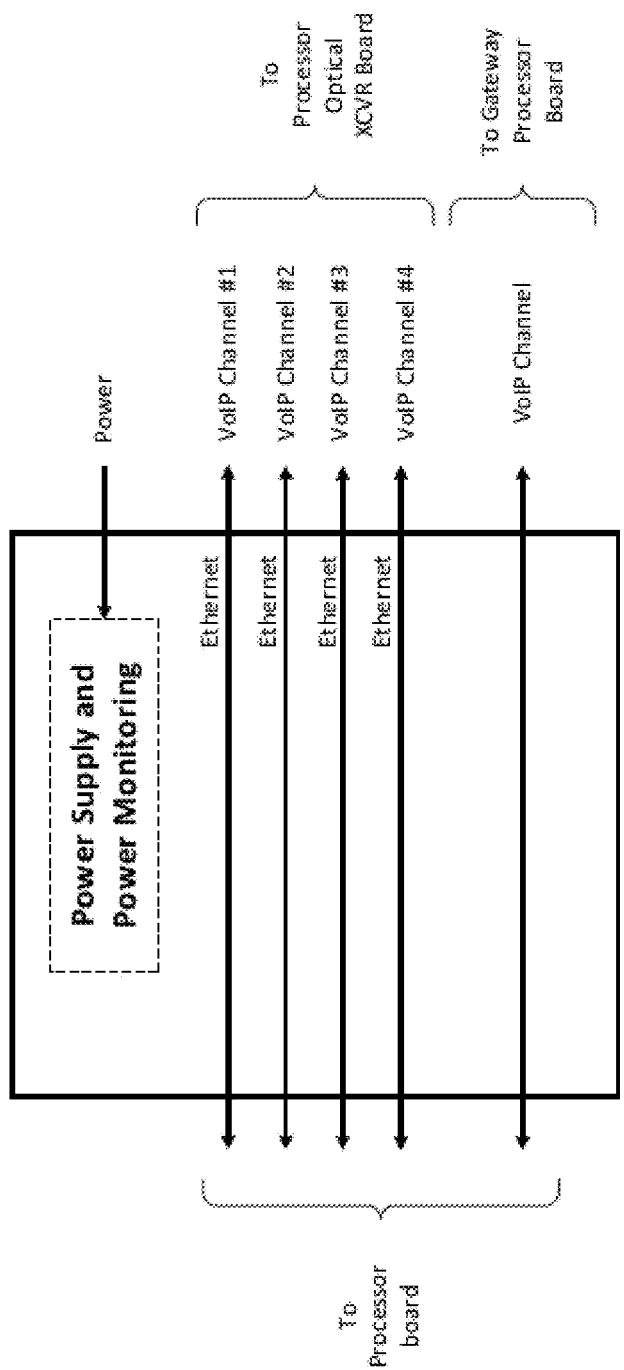
FIG. 27 is a schematic block diagram of an exemplary VoIP carrier card for the gateway device of FIG. 21.

FIG. 27 illustrates an exemplary VoIP carrier card. The VoIP module is based on ANSI/VITA 65 OpenVPX standard with a VoW carrier card and a Processor Mezzanine card based on ANSI/VITA 88 XMC+ standard. The mezzanine processor card for this application is the same card used on the Processor module, with a different carrier card. The theory of operation for VoIP is for VoIP messages to arrive at the Gateway via Fiber-Optic channel, be converted to Ethernet on the Optical Transceiver Card, and then routed to the Processor card on the VoIP module through the VoIP Carrier card. The VoIP data is at that point sent to the Processor Module to be sent out to the crew positions via the AoIP network.

Figure 28:
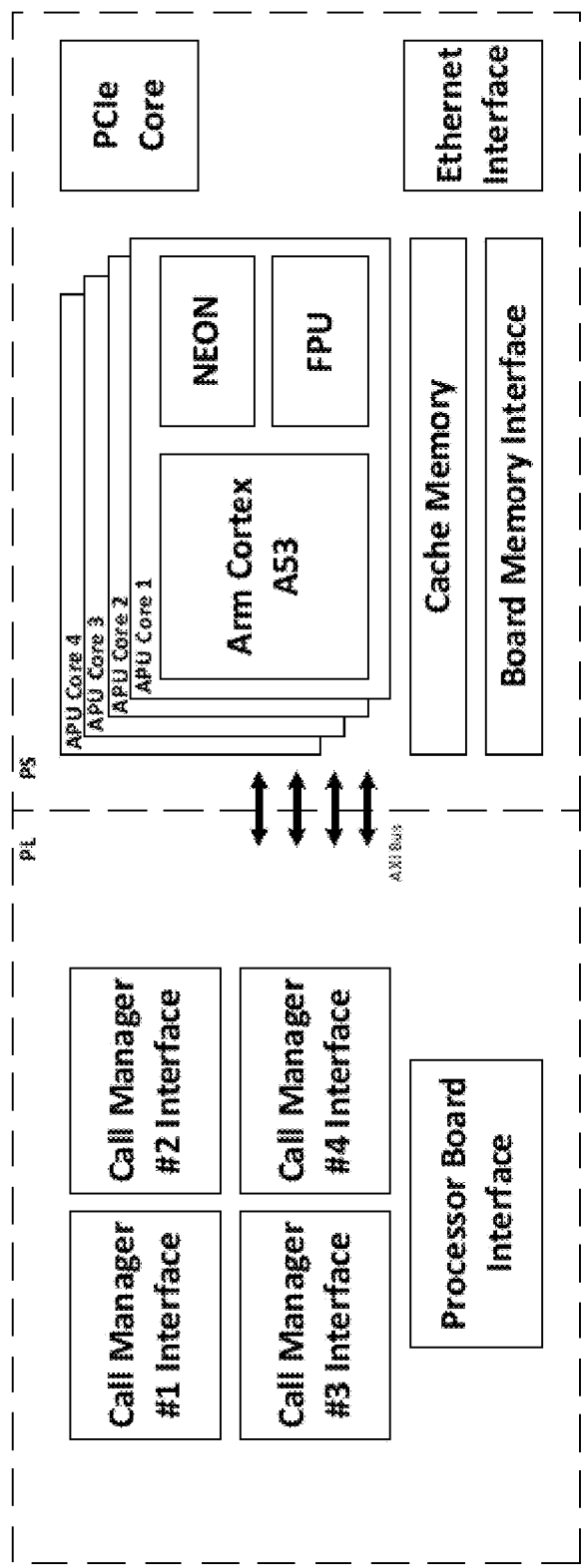
FIG. 28 is a schematic block diagram of a processor logic design for the VoIP carrier card of FIG. 27.

FIG. 28 illustrates an exemplary VoIP processor logic design. The logic design is responsible for interfaces between the Call Manager software and the processor module in the Gateway. The Call Manager is based on COTS software running in dedicated partitions on the PS side. Each VoIP module can support up to four Call Managers.

Figure 29:
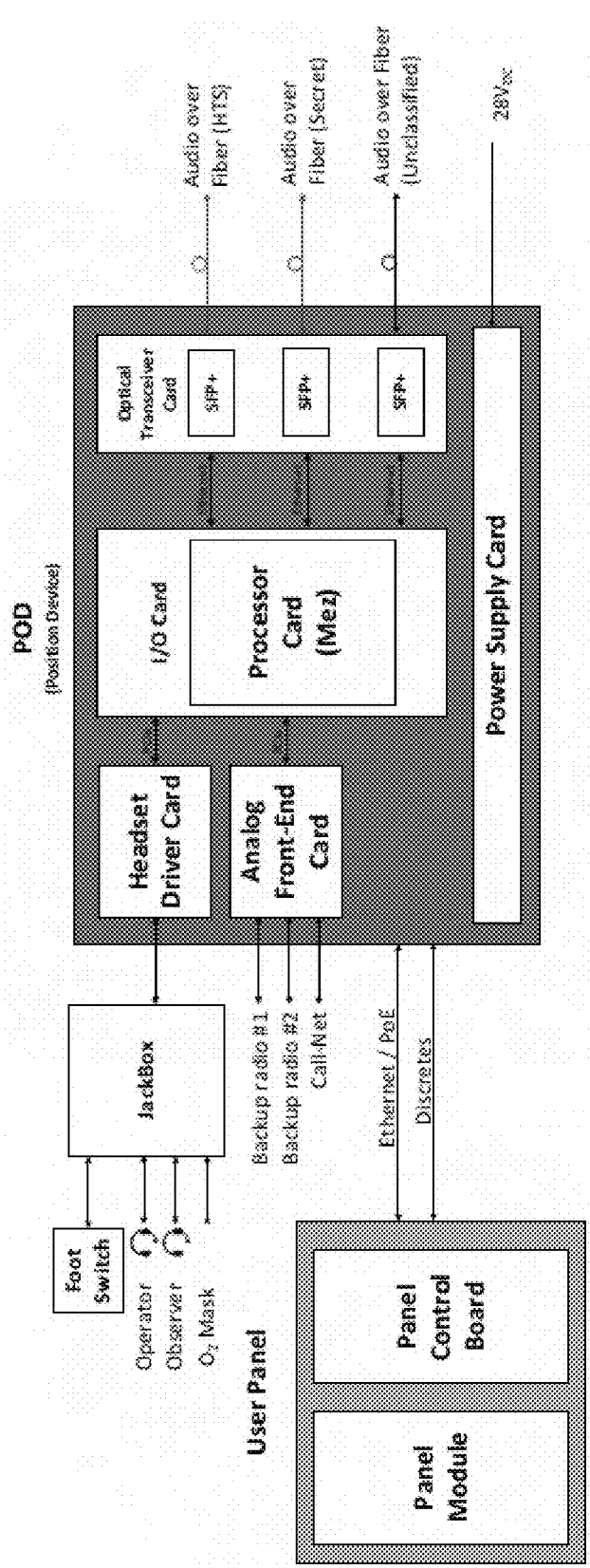
FIG. 29 is a schematic block diagram of an exemplary position device (POD) of the MVIS of FIG. 19.

A crew position of the MVIS includes a user panel (e.g. a mission panel or a flight deck panel) and a position device. FIG. 29 illustrates a block diagram of this architecture. A flight deck position unit (FPU) includes a position device (POD) and a flight deck panel (FP). A mission position unit (MPU) includes a POD and a mission panel (MP). This design enables a new or modified user panel to be introduced without affecting the design of the POD. A common POD can be used for either the flight deck or the mission area. The POD is based on ANSI/VITA 74 (VNX) standard. Similar to the Gateway design, a standard form factor assists in reducing design risk. The POD interfaces the internal cards via PCIe and I2C protocols. Communication outside the POD is achieved with Fiber-Optic cables (to the switch) and Ethernet protocol (to the Panel). The user panel is connected directly to the POD which receives both power and control. The interface between the POD and the user panel will be based on Ethernet using the IEEE 802.3at Type 1 Power over Ethernet (PoE) standard. Additionally, there can be discrete signals between the POD and the user panel. Using PoE will enable the use of a single connector for all communication and power between the panel and the POD. It can also simplify testing the panel as a stand-alone unit, and provide flexibility in the distance between the panel and the POD (PoE standard allows for up to 330 ft. between the two units).

The crew position's POD uses three Fiber-Optic connections for communications as part of the MVIS architecture. The three Fiber-Optic connections are the Unclassified, Secret, and HTS networks (color coded as Black, Red, and Purple). These three networks support MVIS control and audio using AoIP. The networks also provide Control and Status communication with the Mission Computer, along with configuration download. The Unclassified and Secret networks utilize data diodes to assure that only control and status data goes to and from the Mission Computer via the Unclassified and Secret Fiber-Optic switches, and also assures that Unclassified and Secret Record data goes to the Data at Rest (DaR) Storage. HTS Record and Playback are supported by the HTS network (including Secret and Unclassified Record Data for playback). Crew position microphone audio, based on the transmission security state (one of the seven security domains across the three security levels) is immediately encrypted with encryption keys that the MVIS obtains from the Mission Computer via the Key Management.

The MVIS crew position allows up to seven separate domains at the Unclassified, Secret, or HTS level for simultaneous MVIS and radio receive operation, subject to transmission security interlocks to assure no higher-level to lower-level security compromises occur. Receive audio from the three networks brings audio that is mixed after MVIS key decryption at the crew position. MVIS and radio transmission to any single one of the seven domains is based on the Security control on the crew position, the Net or radio security per the Comm Plan, or the radio/crypto security mode indication. Access rights for each mission is defined in the Comm Plan that is distributed to the crew position and Gateway units. The default Comm Plan would set all positions to equal priority access to mission radios and shared flight deck radios. In addition to nets and radios, the crew position can select up to two unclassified emergency distress guard radios for transmitting and/or receiving. The crew position is paired with a Jackbox that provides the operator with a headset and cordset connections to transmit and receive audio.

The flight deck panel is designed to support the connection of the flight deck users to the MVIS. The panel is designed with a high resolution touchscreen Liquid Crystal Display (LCD) and combination of knobs, soft keys and LED indicators. The use of the LCD screen provides ease of customization for different use cases or missions. In addition, the panel is highly configurable through software, and provides the operator the capability to easily modify configuration during missions for features such as Spatial Audio and Active Noise Reduction (ANR). The LCD View button toggles between different LCD views such as Main, active assets and system health status. This panel may be similar to the mission panel to enable higher reuse of software, hardware and firmware across the different crew positions, and due to the commonality potentially reduce cost of acquisition. The main features include 4.3" Touchscreen LCD with high resolution and 50° viewing angle; four backup radios for Air Traffic Control (ATC) and Mission Critical assets; four pages for radio assets supporting up to 32 receive and transmit assets and 20 receive only assets; and configuration is customizable by software to define assets order across pages, Comm. plan changes, etc.

Since the POD is designed to fulfill both the Flight Deck (FPU) and Mission Operator's (MPU) use, there are some FPU interfaces that overlap the MPU and some that are unique. The FPU's POD provides audio and programmable I/O discretes to support the Flight Deck Operator Audio, ACP, REU, and Oxygen Mask interfaces. The Flight Deck Operator Audio includes boom Mic (Audio Input) and Headset (Audio Output). The ACP Interface (SCD's MSN Select, ACP Mic Select, and AUX Panel Select) includes: FPU Radio Select (Discrete Output), FPU Net Select (Discrete Output), ACP Radio Select (Discrete Input), ACP NET Select (Discrete Input), Net PTT (Discrete Input), and Radio PTT (Discrete Input). The REU includes Oxy Mic Out (Audio), Boom Mic Out (Audio), and Headset In (Audio). The Oxygen mic includes Oxy Select (Input Discrete) and Oxy Mic (Audio Input). For the FPU, the POD's CVR interface is connected to the REU Boom Mic and Headset audio interface since the REU connects to the CVR.

The MP has similar features to the flight deck panel, with minor changes such as 5" Touchscreen LCD with high resolution and 50° viewing angle; Buttons to support VoIP functionality. Including a button to open the dedicated VoIP menu and four quick-dial buttons that can be configured by the user; Radio control knob is located at the top of the unit; and Four page Menu Secret switch for selecting radio assets and supporting up to 32 receive and transmit assets and 24 receive only assets.

The MP allows the following controls and functions: Selective Intercom Access (the MP keypad provides 2-digit station selection (calling); SEL (Select); DISC (Disconnect); Hot Line), clear/secure select (7 domains), volume control (master volume, individual net volume, individual radio volume, alarms and alerts volume). Intercom Network and Interphone Net Control includes Net select and deselect for transmit and receive; NET 1: Unclassified intercom conference net (pre-defined in the Comm Plan); NET2-NET5: Classified intercom conference nets (pre-defined in the Comm Plan); Service Interphone Net; Mission Maintenance Net; and Combined Service Interphone Net and Mission Maintenance Net. Radio Access Controls include Radio select and deselect for transmit and receive; Clear/Secure select (any of 7 domains); and Transmission restricted to same operator's voice to one radio group when groups are used. The MP enables Selection of any combination of intercom nets or radio channels for receive or transmit as authorized by the Comm Plan and security interlocks. Simultaneous transmission of both encrypted and unencrypted audio is not allowed. The MP controls include a Hot Mic for Intercom Nets and Push To Talk (PTT) via cordset or footswitch. PTT activation results in transmission of selected circuit or group (nets or radios). Spatial audio controls are available including binaural Audio On/Off and 3D Audio On/Off. Nets and Radios can be assigned to eight zones of a certain azimuth and three elevation zones.

Emergency Access controls enabling monitoring of Clear VHF 1, VHF 2, Public Address (PA), CALL Net (Mission Intercom Net) and Service Interphone (Flight Deck Intercom Net). Guard radio access controls are provided and Includes ability to monitor and transmit on two guard radios on any crew position. Any Operator monitoring either guard radio is sent an audible distress alarm (Guard Alarm) upon reception of an activity indication, from either of the Guard radios. A positive visual indication is also displayed on the MP display. The alarm does not inhibit the operator's ability to hear the guard audio. The alarm is also presented when transmitting over the guard radio. The alarm remains active until the call is terminated or the guard alarm muted. A MUTE button allows muting the guard alarm at that crew position. The Comm Plan will define Guard 2 (UHF Guard) as a transceiver with both transmit and receive capability and the Guard 1 (VHF) radio as receive only. When an Operator selects Guard 1 for transmit, the MVIS sends a tune request to the Mission Computer via the Fiber-Optic network, to retune another V/UHF radio (as designated in the COMM Plan) to the VHF Guard frequency. The MVIS will direct the Operator's voice to the substitute "commandeered" radio. The MVIS then presents a positive visual indication on the MP display that the substituted radio has been selected for Guard transmit for any affected MP operator. The MVIS notifies Mission Computing of the release of the transmit command and restores any affected operator's crew position to the pre transmit state. Any V/UHF radio can be configured to work as a Guard transmitter in the MVIS Comm Plan. The V/UHF radio used as a VHF Guard Transmit radio is capable of being assigned to other normal functions when not being commandeered by the crew for guard transmit function. Any operator who is using the radio prior to it being commandeered will hear the guard alarm and guard audio as well as receive a Guard alarm indication on their crew position. The Guard Alarm is not transmitted over the guard radios. The Guard Alarm audio is not loud enough to mask the guard audio from the receiver.

Record/Playback functionality is enabled by controls that include controls to Select Circuit or Composite Audio, Select Playback Time, Initiate In-Flight Playback, Select Pause, select FF (Fast Forward), Select REW (Rewind), and Terminate Playback. Record/playback functionality is further supported by a display providing Circuit or Composite Audio to be played back, Playback Start Time (Mission Time in hours, minutes, and seconds), Playback In-Progress Time (Mission Time in hours, minutes, and seconds), and Playback Status (Playback, Fast Forward, or Rewind in Progress, Paused, Terminated).

Public Address (PA) controls enables PA transmit (activates by PTT). PA transmit has priority over any other transmission from that crew position while not in emergency access mode. The crew position PA transmit and receive authority is configured in the Comm Plan.

The type of PTT that is activated is dependent on the discrete activated and the context (the circuit that is Tx-enabled) at the time of PTT activation, but is one of the following: CALL, ICS Net (NET1-5, Mission Maintenance Net, Service Interphone Net), PA, or Radio.

Figure 30:
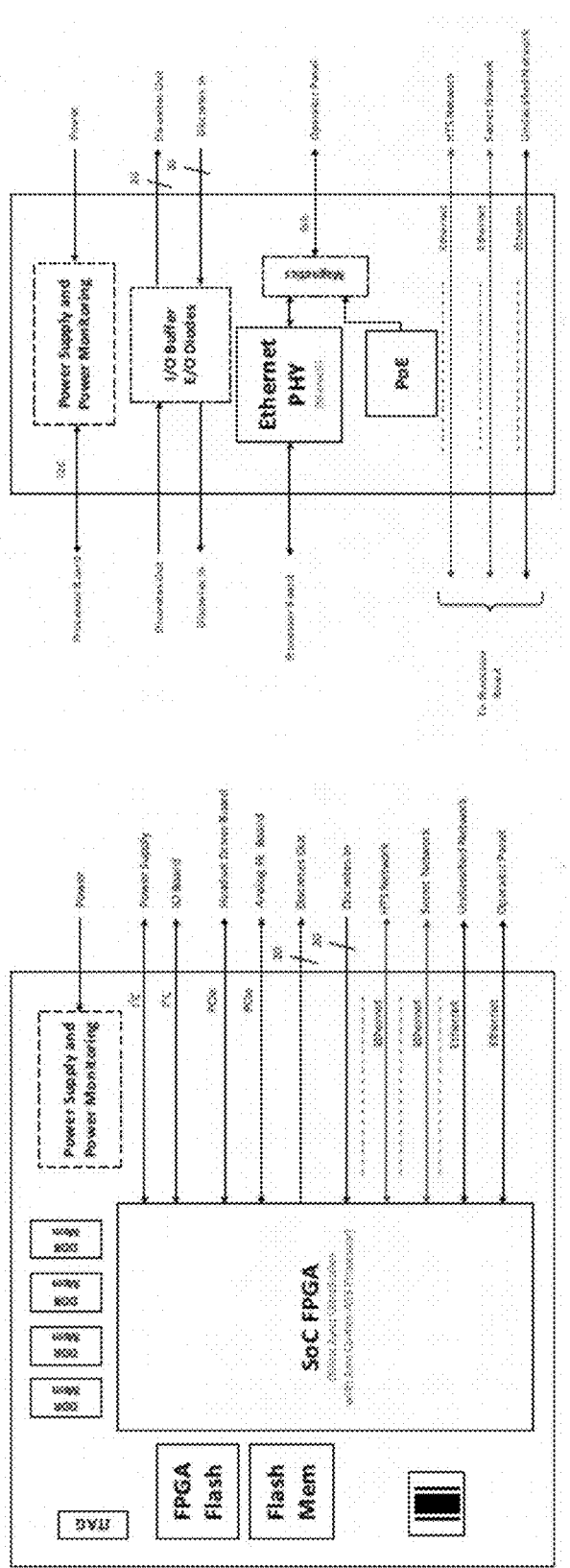
FIG. 30 is a schematic block diagram of an exemplary processor module for the POD of FIG. 29.

FIG. 30 illustrates an exemplary processor module of the POD that includes an I/O carrier card and a processor mezzanine card. The Processor module is designed based on ANSI/VITA 74 (VNX) standard for rugged Small Form Factor (SFF), using the 19 mm module size for carrier and Mezzanine cards. Similar to the processor design in the Gateway, the module is based on an I/O carrier card and a mezzanine Processor card. The design of the Processor module is based on the design of the Gateway Processor module modified to meet size and functionality differences of the position unit. Some of those differences include less PCIe channels (does not require a PCIe switch), communication to the Panel is done via Ethernet protocol; all three networks are directly connected to the Processor card.

Figure 31:
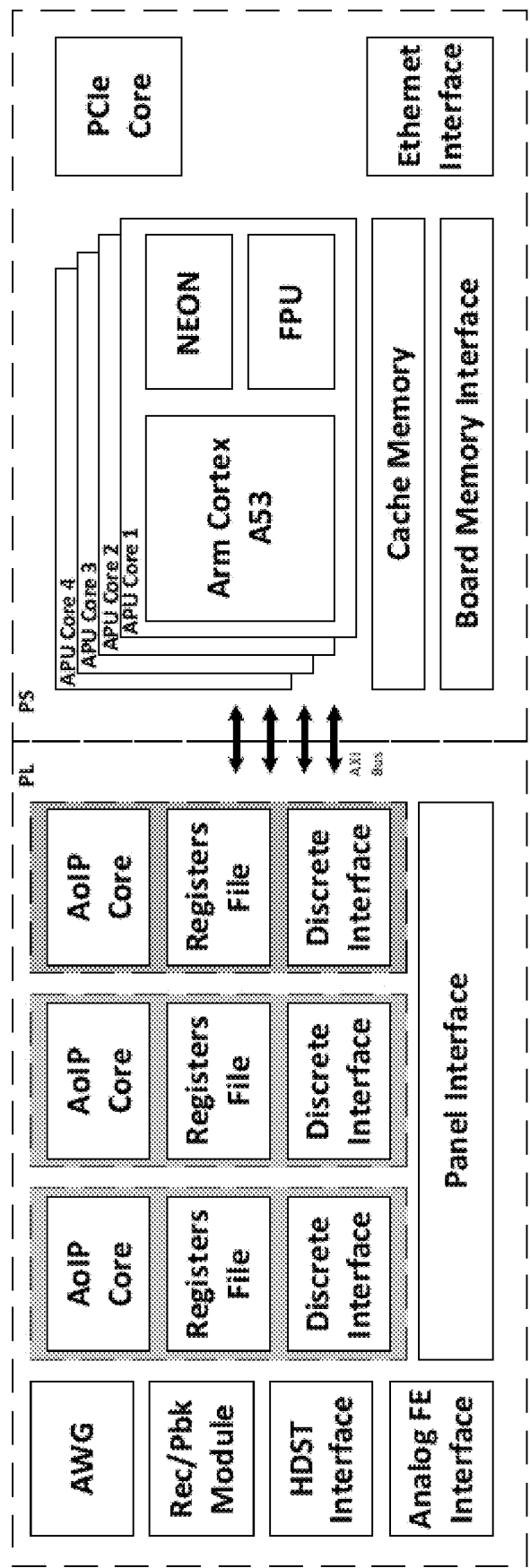
FIG. 31 is a schematic block diagram of an exemplary processor logic design for the processor module of FIG. 30.

FIG. 31 illustrates an exemplary processor logic design for the processor module of the POD. Similar to the Gateway processor, this FPGA has PL and PS areas. However, the PL area of the processor is more extensively utilized. This area includes three partitions, one for each network. Each partition has a dedicated AoIP core, dedicated register files and dedicated discrete interface. The PL area further includes the Aural Warning Generator (AWG) block which is responsible for handling Aural warnings. The PL area also includes the Record and Playback module that is responsible for writing to the NFS server in recording mode and reading from the NFS server in playback mode. The PL area also includes Headset card and Analog Front-End card interfaces.

Figure 32:
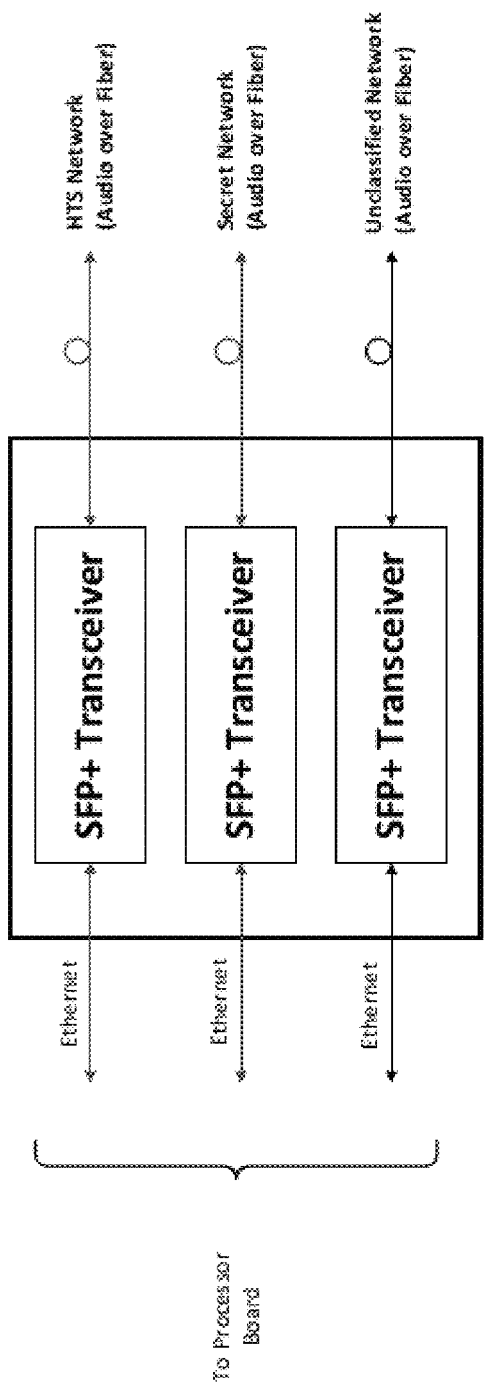
FIG. 32 is a schematic block diagram of an exemplary optical transceiver card for the POD of FIG. 29.

FIG. 32 illustrates an exemplary optical transceiver card. Similar to the Optical Transceiver card used on the Gateway, the optical transceiver card provides the optical interface by housing the SFP+ Transceiver modules. The POD supports three networks and therefore there are three SFP+ modules.

Figure 33:
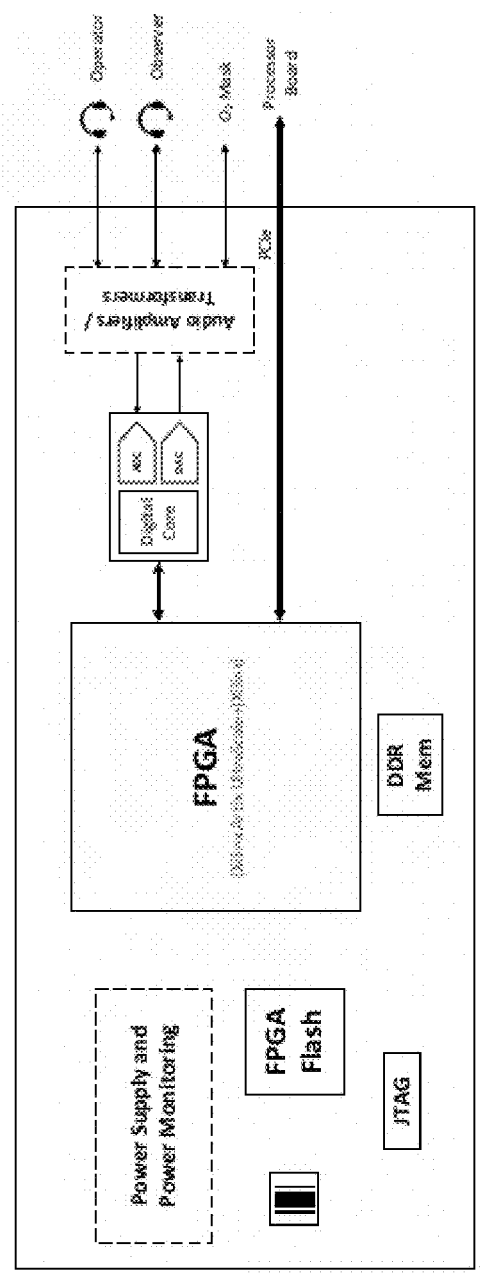
FIG. 33 is a schematic block diagram of an exemplary headset driver card for the POD of FIG. 29.

FIG. 33 illustrates an exemplary headset driver card. When the user selects assets for receive and transmit on the user panel, the audio for these channels is transferred from the Processor module to this card. The audio streams are then mixed together and are sent out to the CODEC to be converted to analog and then sent to the headsets via the Jackbox. The Headset Driver card is designed based on ANSI/VITA 74 (VNX) standard for rugged Small Form Factor (SFF), using the 19 mm module size. The 19 mm module size was chosen due to large components in the front-end. The card will communicate internally with the Processor module via a PCIe Interface. The communication will be mainly for control and status messages, audio data.

Figure 34:
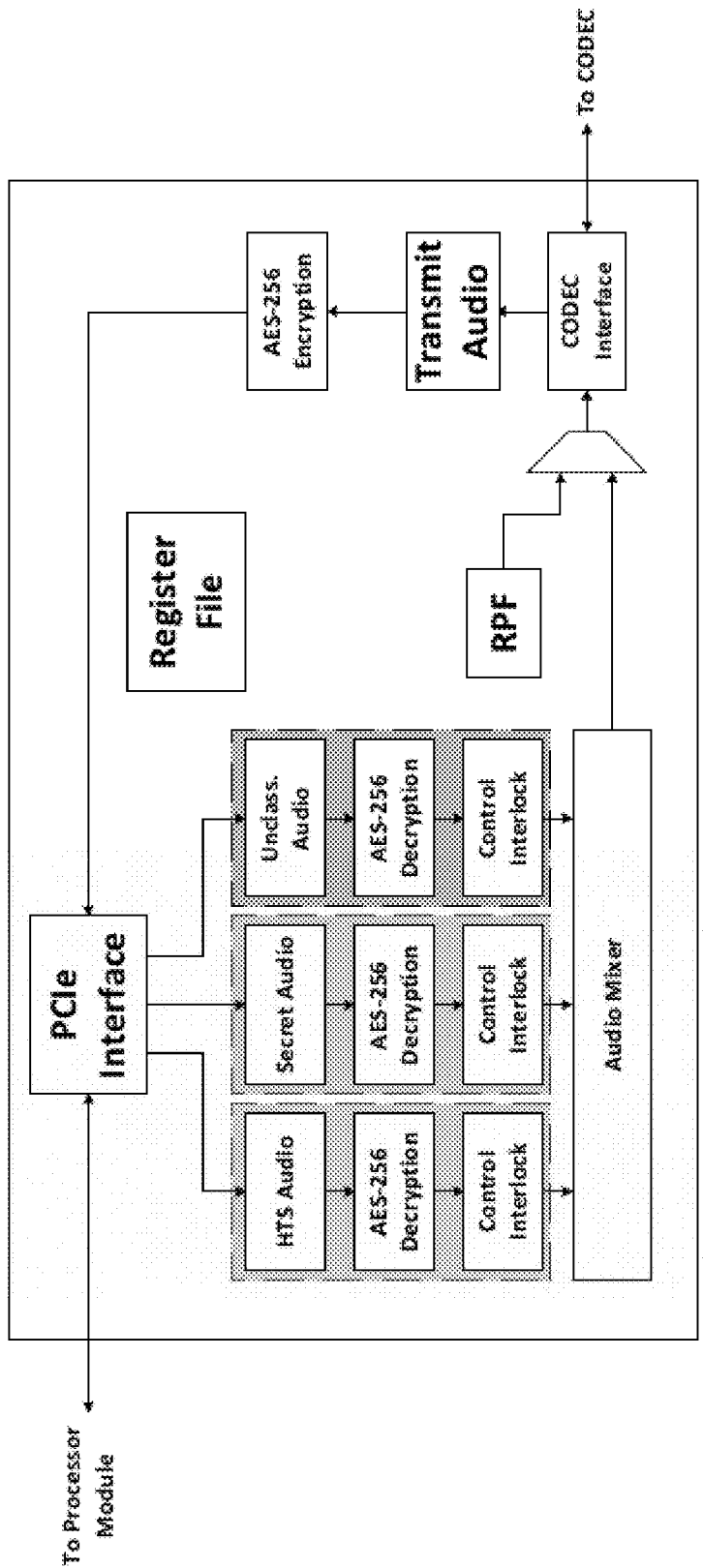
FIG. 34 is a schematic block diagram of an exemplary logic design for the headset driver of FIG. 33.

FIG. 34 illustrates an exemplary headset driver logic design. The main functionality of the FPGA includes a receive path (to the headset). The FPGA receives encrypted audio data from the Processor card. Each data path enters a dedicated partition using the same isolation methodology used in the Processor card, decrypts the encrypted audio data to raw data, and then applies data locks to prevent data leakages (classified data leaking into an unclassified transmission). After the interlock stage, the data goes to the audio mixer to be sent to the CODEC. For the transmit path (from the operator microphone), the data from the CODEC is encrypted (encryption key used is determined based on the user panel selection for transmit channel and classification) and then sent to the Processor card to be converted to AoIP and sent out to the appropriate Gateway. The Headset Driver card also has a unique feature of Record and Playback on the Fly (RPF) where it stores the headset audio on a buffer that allows the panel operator to listen to recent audio played to the headset. Buffer size is 30 seconds, although the design supports several minutes of audio. This feature is in addition to the record and playback functionality required in the SCD. The audio data is stored on volatile memory and is erased at system shut down.

Microphone audio is immediately encrypted in the transmit-selected domain. All higher security levels and non-transmit-domain receive audio is blocked by software and hardware to assure that transmit audio is not compromised. Since only single-domain is allowed to be transmitted at a time, there is no chance of simultaneous transmission on Unclassified and any Classified channel. Some interlocks are enforced from configuration (programmable logic) as well as software, such as "receive only" channels, to assure transmission cannot occur on a Receive Only channel. Configurable Transmit/Receive and Receive Only behaviors are exclusive for any circuit. The exclusive behavior is enforced as part of the state machine.

Transmission from a crew position is added to the AoIP network, enabling subscription by the appropriate-domain Gateway for PA and Radio channels. Software enforces single-radio transmit, and the Gateway routes the microphone audio to the radio after decryption for that domain. If another operator attempts to transmit on the same radio channel, a busy tone is heard by any operator who attempts to transmit at a later time. Similarly, for nets, single-domain microphone audio encryption, interlocks, and single-source transmission logic prevent simultaneous transmission on clear and secure circuits. Software assures that any operator can only receive or transmit on any radio channels that have been transmit and/or receive selected by the operator at the crew position or pre-assigned by the COMM Plan.

Figure 35:
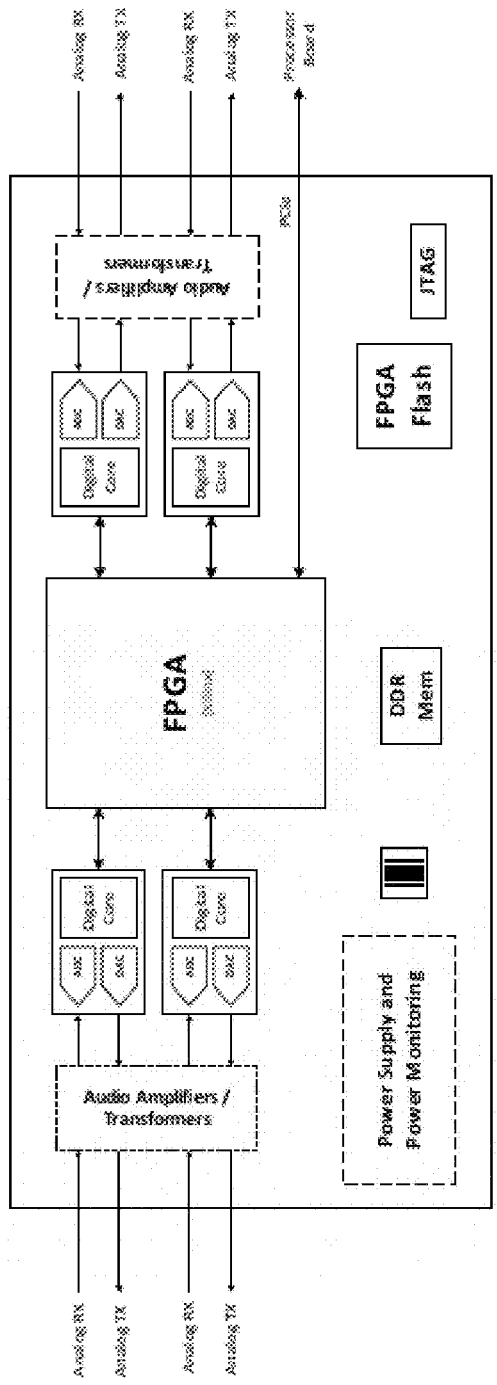
FIG. 35 is a schematic block diagram of an exemplary analog front-end card for the POD of FIG. 29.

FIG. 35 illustrates an exemplary analog front-end card. The card supports four Analog Transceivers to be used for backup and emergency modes for assets such as Air Traffic Control (ATC), mission critical assets and CALL-NET backup network. The assets connected to these channels are determined at aircraft installation. Through careful system design, connecting different assets for each crew position, the entire MVIS can support dozens of channels using this feature. For example, 11 crew positions in the mission area with four channels per crew position could support up to 44 assets with limited availability in backup mode. The Analog Front-End card is designed based on ANSI/VITA 74 (VNX) standard for rugged Small Form Factor (SFF), using the 19 mm module size. The 19 mm was chosen due to large components in the front-end. The card will communicate internally with the Processor module via a PCIe Interface. The communication will be for control and status messages, audio data, etc.

Figure 36:
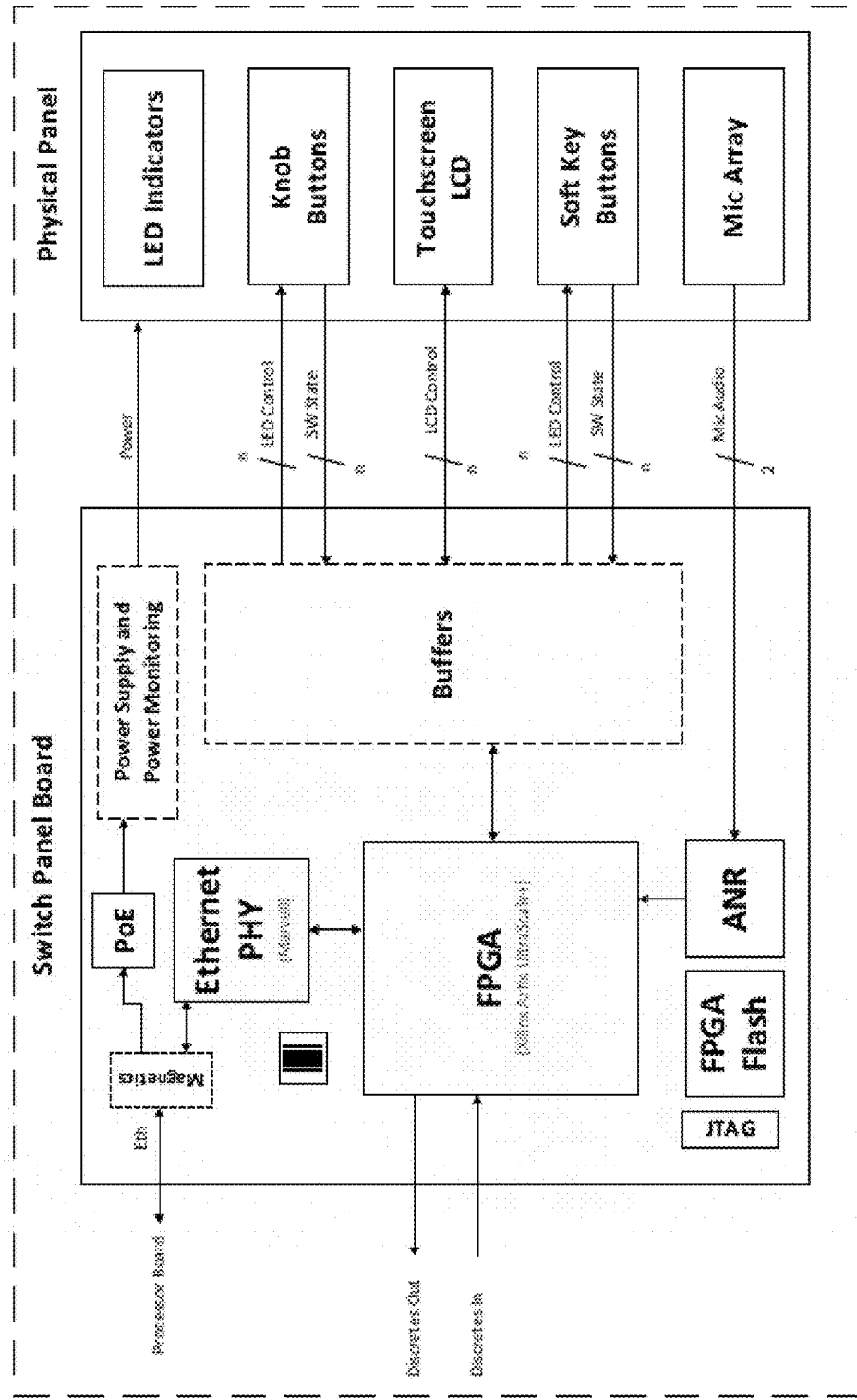
FIG. 36 is a schematic block diagram of an exemplary user panel module for the POD of FIG. 29.

FIG. 36 illustrates an exemplary user panel module. The panel electrical/electronic hardware identical across the different panels where the actual difference is in the physical switches, knobs, etc. The panel is divided into two parts—the electronic card and the physical control panel. The electronic card features an FPGA that is responsible for communication with the position Processor module via Ethernet protocol. The physical control panel manages the switches and knob activity as well as the LCD screen and provides support for noise reduction algorithm via a dedicated microphone array on the panel.

Figure 37:
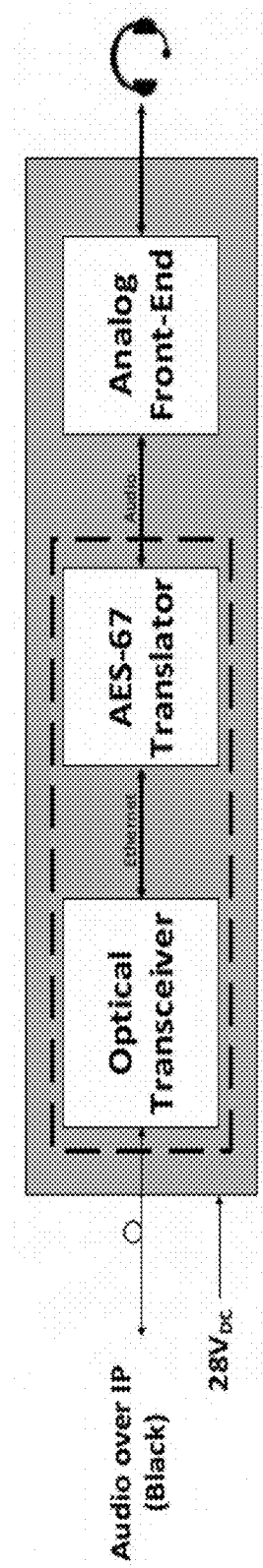
FIG. 37 is a schematic block diagram of an exemplary maintenance operator panel for the MVIS of FIG. 19.

FIG. 37 illustrates an exemplary maintenance operator panel. The MOP is connected to the Unclassified network via the Fiber-Optic switch on one side and to a headset on the other side. Since the MOP is not a full crew position and is only intended to be used for maintenance purposes, it does not feature the same hardware as the user crew positions and panels. The MOP receives audio data from the optical interface, converts it to Ethernet, decrypts the data and then sends it to the headset via a dedicated CODEC.

Figure 38:
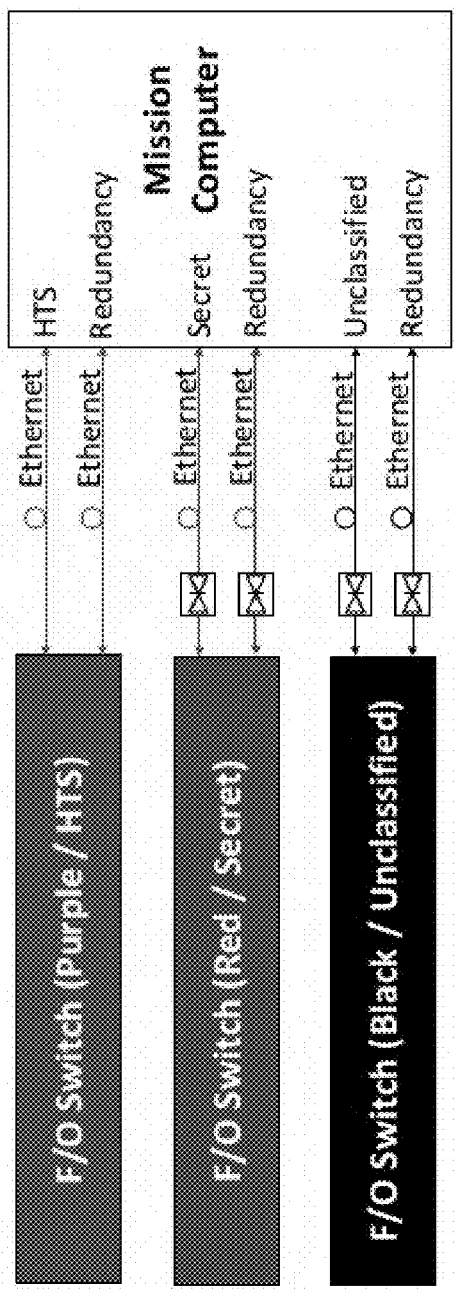
FIG. 38 is a schematic block diagram of data diodes in the MVIS of FIG. 19.

FIG. 38 illustrates exemplary data diodes connections in the MVIS. The MVIS architecture includes three networks, but there is only one mission computer available on the HTS network. To avoid data leakage between security levels, data diodes are installed in the network architecture as shown in FIG. 38. Four data diodes will be located on the Secret and Unclassified paths between the mission computer and the Fiber-Optic Switches.

Figure 39:
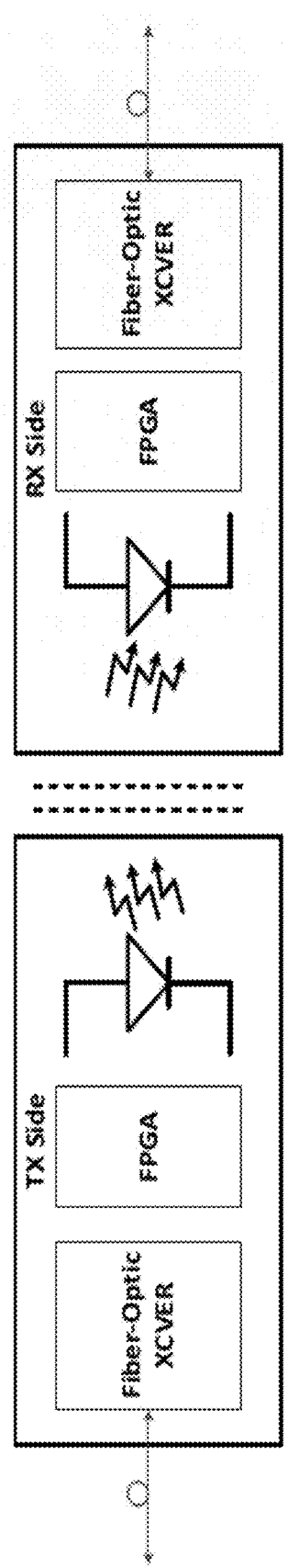
FIG. 39 is a schematic block diagram of functional aspects of the data diodes of FIG. 38.

FIG. 39 illustrates an exemplary functional diagram of the data diodes. The data diode only allows data to flow in one direction to prevent data from higher level of security going into a lower level of security network. The Data Diodes used on the MVIS architecture are bi-directional diodes.

Figure 40:
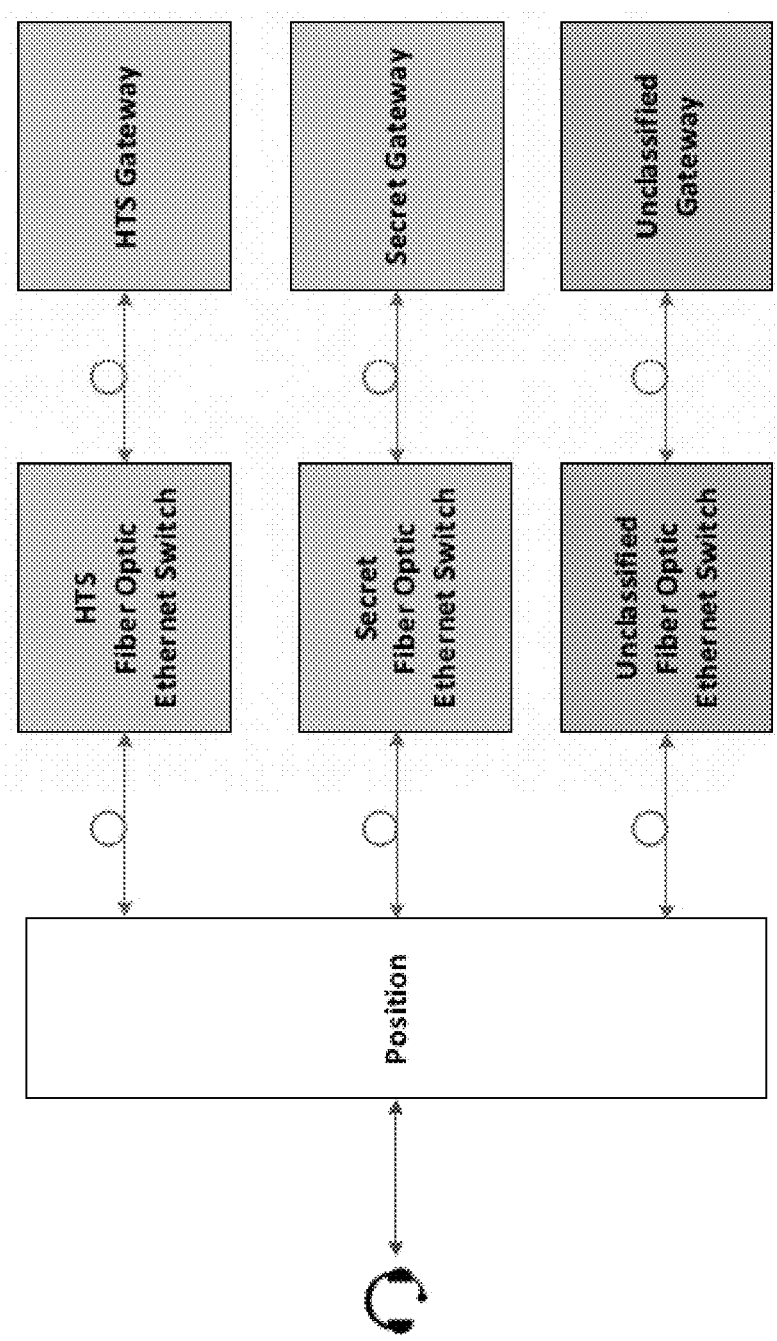
FIG. 40 is a schematic block diagram of an exemplary data path in the MVIS of FIG. 19.

Throughout the system architecture, a goal is to create a physical separation to avoid data leaks between different security compartments. Eventually, however, all the data regardless of the security level is delivered to a single headset. Given this, two main techniques are utilized. The data is encrypted as close as possible to the entrance to the MVIS. The encryption algorithm can be AES-256. Physical separation is used as much as possible. In the position units, the physical separation is maintained up to the audio mixing block, which is being implemented as close as possible to the headset input/output connection. FIG. 40 depict the data flow throughout the architecture. In this diagram, black means Unclassified data/audio, red means Secret data/audio, purple means Encrypted data/audio, and green means it is transferring encrypted data/audio.

Figure 41:
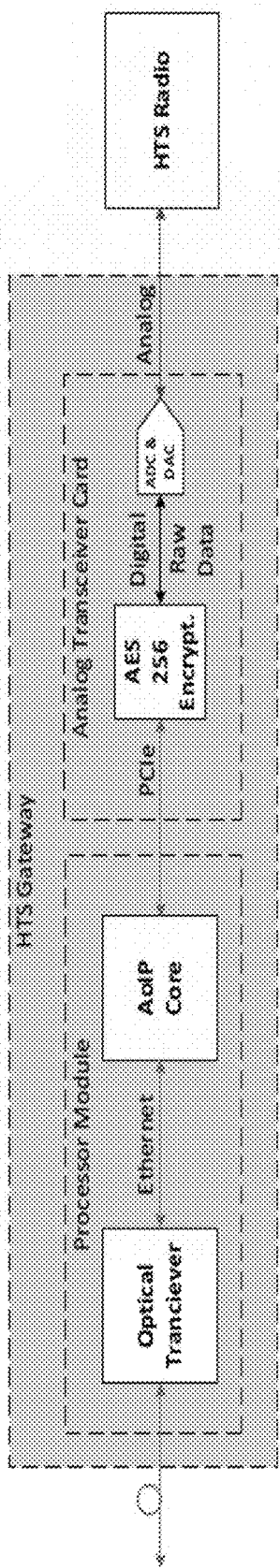
FIG. 41 is a schematic block diagram of an exemplary gateway data path.

FIG. 41 illustrates the data path inside the gateway. While the example provided is for the HTS Gateway, the design is identical across all Gateways. The data arrives from a radio asset (purple line), gets converted to digital and then encrypted with the relevant encryption key for the classification of the data (green line after the AES-256 encryption). It is important to note that the data is also encrypted on Unclassified assets, for cybersecurity purposes. Any data throughout the MVIS, either at rest or in motion is encrypted.

Figure 42:
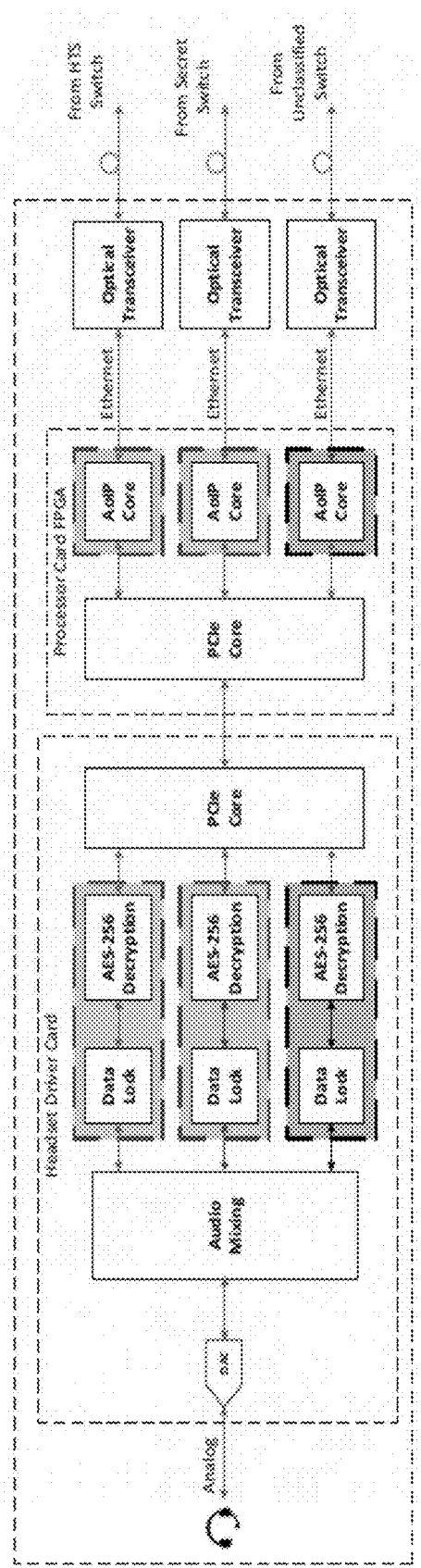
FIG. 42 is a schematic block diagram of an exemplary position device data path.

FIG. 42 illustrates the data path inside through the position unit. The data arrives at the position unit from the fiber-optic switch in encrypted form. As discussed previously, the mixing is done only in the position units, as close as possible to the headset. The audio mixing has to be performed on raw audio data. Therefore the data is decrypted before the mixer. This design provides on-chip isolation. The on-chip isolation methodology allows the placement of multiple levels of security inside one FPGA. The design utilizes AES-256 encryption. AES-256 encryption enables transferring encrypted data between modules without leakage concern (leaked data is still encrypted). The design provides data locks. In order to resolve the concern for secure data leaking to lower level of security, data locks are implemented before the mixer to ensure that secure data cannot bleed over through the open operator mic enabled for a lower security level.

Figure 43:
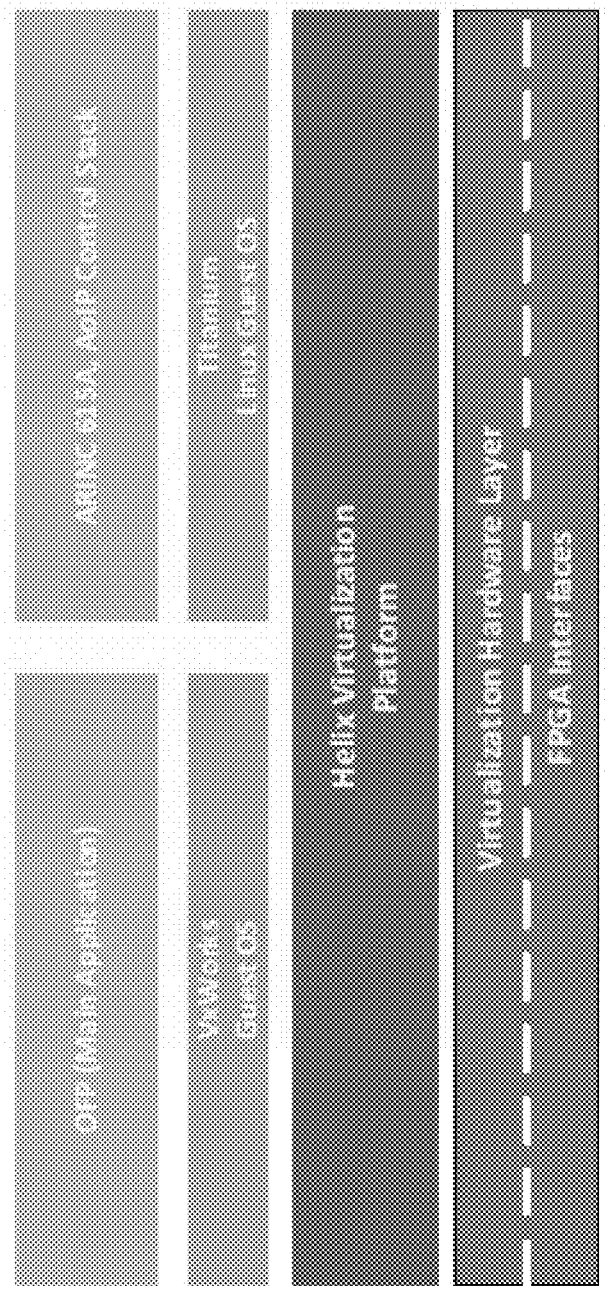
FIG. 43 is a schematic diagram of an exemplary virtualization architecture for the MVIS of FIG. 19.

Turning now to FIG. 43, an exemplary virtualization architecture is illustrated. The various units that make up the MVIS are based on an virtualization platform. The platform is a type 1 hypervisor, which in turn provides time and space partitioning to multiple "guest Operating Systems (OS)" partitions, including Linux and VxWorks 7. This partitioning is securely enforced by the Xilinx Zynq UltraScale+ embedded processor, preventing data from being "leaked" from one partition to another, as well as errors occurring in one partition from affecting any of the others. Basing the unit software on virtualization platform allows the MVIS to easily meet safety and security requirements by separating different software functions into their own partitions, each with their own Design Assurance Level (DAL). While the system consists of multiple units, the software architecture is similar for each one. The description that follows applies to all of the units in the system. The virtualization platform running on each unit is configured for two partitions: one partition runs Titanium software under Linux as the guest OS and the other runs VxWorks 7 as the guest OS.

Linux running the Titanium Security Suite partition serves as a security gateway between the network and the other software running on the unit. All network traffic into and out of the unit flows through this partition and the security-hardened Linux kernel. Since the Audio over Internet Protocol (AoIP) subsystem requires low-latency access to the network, the AoIP control stack is also located in this partition. Similarly, the ARINC 615A configuration and update module, which is also network-based, resides in this partition.

Figure 44:
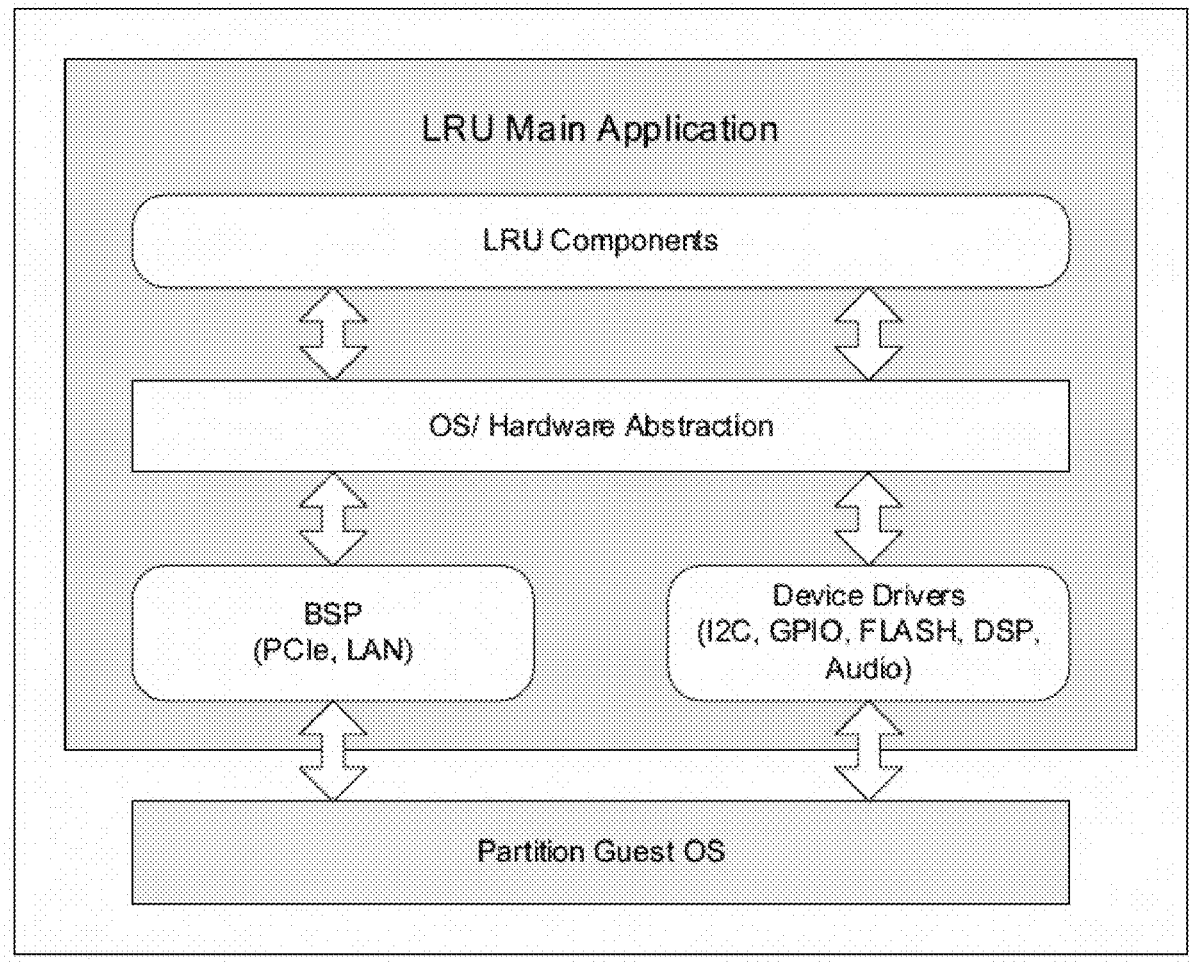
FIG. 44 is a schematic diagram of an exemplary software architecture for the MVIS of FIG. 19.

The Operational Flight Program (OFP) or Main Application runs in the second virtualization partition with the VxWorks 7 Real Time Operating System (RTOS) as the guest OS. The OFP consists of multiple layers to provide loose coupling between the components that are involved as well as separation between the hardware layers and the software application. The high-level software architecture for each partition is shown in FIG. 44.

The Main Application software consists of multiple software components, real time tasks (threads), and Interrupt Service Routines (ISRs), scheduled by the RTOS scheduler based on their respective priority and readiness to run. The watchdog component monitors every other software component in the system to detect error conditions. If any component hangs, crashes, or otherwise fails to operate properly, the watchdog will initiate a hardware reset of the application in an attempt to recover. Note that because of the time and space partitioning afforded by the hypervisor this reset only affects the one VxWorks partition not running as expected while the rest of the unit continues to function normally.

Tasks launched by the RTOS itself are called System Tasks, whereas tasks and ISRs created by the application to implement the unit's specific functionality are referred to as application tasks/ISRs. The Board Support Package (BSP) supports the RTOS kernel by providing an interface to the specific hardware on the unit Processor card.

Because the MVIS is a distributed system, the various units communicate with each other over the network using a publish/subscribe message transport protocol. This allows command and control messaging to take place using the loosest possible coupling between individual units and minimizes required pre-flight configuration. Each unit will "publish" all the data that it generates every time it is updated; other units can "subscribe" to receive these updates. When a new unit is added to the system there is no need to change any configuration on the existing units—the new unit is able to discover all existing units on the network, and the existing units also discover the new unit. All data subscriptions automatically include updates published by the new unit. The protocol uses IP Multicast to minimize network bandwidth.

Audio distribution in the MVIS has a similar architecture to the command and control described above. Using an AoIP protocol based on AES-67 standard, the MVIS publishes multiple streams of high-quality digitized audio to other units across the network. AES-67 is an established protocol within the audio industry and has a proven track record for reliably distributing high-quality audio across IP networks. As with the command and control messages, the AES-67 protocol makes use of IP Multicast to optimize network bandwidth usage. A single instance of a multicast audio stream can be subscribed by multiple units at once, obviating the need to send multiple copies of the stream to each recipient individually.

Voice over Internet Protocol (VoIP) support is provided by a software component of the Main Application. This allows each crew position to act as a standard SIP telephone to place and receive VoIP phone calls using the headset microphone and earphones. A SIP Call Manager (proxy), if needed, is a separate software module that can run either as part of another unit (such as a gateway) or on a standalone unit used specifically for that purpose. Multiple Call Manager instances can be run, if needed, to support multiple independent security levels.

The MVIS will be compliant with the ARINC 653 standard for space and time partitioning in safety-critical avionics real-time operating systems (RTOS). The RTOS provides the opportunity to use multiple partitions, each partition capable of running a different operating system. It is feasible for each partition to have a different DO-178 design assurance level, allowing a reduction of cost associated with updates and certification as each partition can be isolated and treated independently. This feature provides flexibility in the normal operation (a critical failure in one partition, does not affect another partition), as well as faster upgrades and changes, since a change to one partition does not require certification process to other partitions.

The MVIS will be compliant with ARINC 615A, Data Loader over Ethernet, to provide the capability to upload new software, new configuration files, and new aural warnings, via a dedicated data loader. The data loading can be accomplished in a field environment using a standard ARINC 615A interface (Ethernet). One major concern with the data loader is the "door" it opens for an adversary to attack the system. A software and hardware interlock mechanism, using discrete signals such as "Weight-on-Wheels", prevents data loading function while in flight. In the MVIS, this mechanism is enhanced by adding "Secure Boot" guidelines to make sure the data loader is properly authenticated before loading new software or firmware.

Given the distributed AoIP-based architecture of the MVIS, all the system position units and gateway units are capable of interfacing with the Mission Computer Data at Rest Storage (hereafter referenced as the "Mission Recorder") to send or receive audio as directed by the Comm Plan and Mission Computer. The Comm Plan specifying the channels to be recorded is distributed among the audio positions and gateways. Each position and gateway is responsible for recording the audio sources that it interfaces with and produces. Both audio and event data are recorded in a file system that effectively bundles and time stamps the audio and event (control) data. The highly precise time stamping provided by Precision Time Protocol (PTPv2) allows for precise playback synchronization. For the position units, microphone, left ear, right ear, composite audio, and local (Backup) radio transmit and receive are recorded. The gateway units would be responsible for providing Radio sources, Service Interphone Net (Unclassified), Mission Maintenance Interphone (Unclassified) and VoIP sources.

Because the MPUs are connected to each security level, they can stream the appropriate security level audio to the appropriate Mission Recorder level to keep things Multi Independent level Secure (MILS), or provide a one-directional data diode or information security guard to allow all data to be stored on the system-high (typically HTS) Mission Recorder. Playback would always occur via the System High network, but all levels and domains would be able to be played back from the crew position if units have the appropriate encryption keys.

The MVIS supports the recording and playback of mission audio and user interface events visible at each crew position control panel. Audio from all configured radios, NETS, crew position headset microphones, and crew position composite headset audio can be captured and stored to an NFS-mounted file system, the mount point of which is specified by the Mission Computer. All audio sources and events are output in their full bandwidth digitized form such that on playback, the crew position headset composite audio can be reproduced or any individual audio source or combination of sources can be selected for playback. The audio channels and crew position events to be recorded are selected by the Mission Computer; to minimize disk usage, audio sources and events not selected by the Mission Computer, as well as audio channels with no voice activity, are not captured by the MVIS.

Operator-Controlled Playback is intended primarily to be used during flight and allows an operator to rewind, fast-forward, and perform a time-based search on any audio source captured by the MVIS (subject to permissions specified in the active COMM plan).

System Playback is intended mainly for use on the ground for mission recovery and analysis. In this mode, the audio playback is synchronized with other mission recordings allowing ground crew to analyze the whole mission, including audio traffic, at one time. During System Playback, the MVIS supports playback of composite audio and all recorded events such that what occurred during the mission is recreated in both audio and events on the Operator panels. System playback is based on the recorded timestamps so that Mission Computing can synchronize the recorded Mission MVIS playback with the playback of other systems.

Each MPU and FPU is capable of displaying recorded radio activity, switch settings and On/Off software controllable setting change events during System Playback. The following events are captured: operator actions such as circuit selections for TX Select or Monitor Enable, volume adjustments, menu selections, etc; activity display such as circuit PTT indications and RX activity indications; and information display such as radio channel status (e.g. frequency, call sign) that were provided by the Mission Computer and were displayed at the MPU during the mission.

Each unit is responsible for creating and updating the data files required to store the relevant audio and events. For example, a Gateway would capture the audio data being sent to/from the radios to which it is attached; an MPU is responsible for storing microphone and headset audio as well as display and button press events generated at that position. Any annotation audio recorded at a given crew position is also stored on the server by that position.

Data will be stored in an uncompressed format (which is native to AoIP), or, optionally, in a lossless compressed file format such as FLAC to reduce transport times and storage capacity requirements while still able to reconstruct the original uncompressed data set. It is not envisioned that mu-law recording as specified in the SCD would be the best format to use. Ideally, an AoIP recorder function would be used to assure that high fidelity audio is maintained; otherwise, an AoIP/VoIP conversion function would be implemented during record and playback.

The MVIS is capable of recording all audio sources present in the system, including radios, NETs, microphones, and the composite audio being heard in every crew position headset. The actual sources that are captured is dependent upon commands from the Mission Computer as well as voice activity on the specific channel. For example, if nobody is using a NET then that silence will not be recorded in order to save space on the file system. The Mission Computer can command that recording for any particular audio source be turned on or off at any time during the mission.

The MVIS is capable of playing back recorded audio and event data. Playback falls into two broad categories: operator-Controlled Playback and system (Computer-Controlled) Playback. Within the System Playback category, two modes are available: System Playback—Multiple Positions and System Playback—Single Position.

Operator Playback allows the replay of captured audio only and is primarily intended for use during flight. It allows the operator to fast-forward, rewind, perform a time-based search, and replay a selected section of a recorded audio source. System Playback allows the replay of both captured audio and system events and is intended primarily for use on the ground post-mission.

During Operator Controlled Playback, each operator shall be capable of receiving playback audio over an assigned channel to recover critical communication during a mission. When allowed by the COMM plan, any crew position can select any previously recorded audio source for playback through the operator's headset without affecting other operations for the MVIS including recording.

Multiple positions may be specified for playback by the Mission Computing. In this mode, synchronized composite headset audio and system activities are replayed on the specified CPEs. During recreation of the mission, the MVIS supports playback of composite audio and all recorded events such that what occurred during the mission is recreated both in audio and in events on the Operator panels. System Playback shall be based on the recorded time stamps so that Mission Computing can synchronize the recorded MVIS playback with the playback of other systems. This function is also accessible on the ground during Mission recovery or training. Note that System Playback mode is exclusive of the other operating modes of the MVIS. All positions that are selected for "System Playback" mode are unavailable for "live" use by the MVIS. To restore normal functionality for these positions the Mission Computer changes their operating mode from "System Playback" mode back to "Normal" mode.

Multiple recorded channels may be directed by Mission Computing to play back on a single designated crew position. This position can then render multiple selected audio channels as they were received from the source as well as synchronized event data. Only the events corresponding to selected audio channels will appear on the selected crew position during playback. As with the Multiple Position System Playback mode, this mode is available both while in flight and on the ground.

The Record/Playback function stores files on the Mission Computer using the Network File system (NFS) protocol. Mission Computing provides a separate file system partition for each security domain of sufficient size and speed to record all required audio data and system events without impact to overall system performance. The NFS file system for each domain is specified as part of the COMM plan and can be changed by the Mission Computer at any time. The Mission Computer is connected to the MVIS via a gigabit Ethernet LAN. Data at rest is encrypted using FIPS-140-2 AES-256 encryption using keys that are managed and distributed by the Mission Computer. Files are stored as full-bandwidth linear PCM audio samples using the industry standard WAV file format.

The Event File records event data, which is used to recreate system appearance and control indications for the Playback, function. Recorded events are time tagged before storing into the Event file to allow synchronization with the audio files during Playback. The resolution of these event timestamps is better than 100 ms.

An audio file is created on the Mission Computing network file system to store recorded audio data for an audio source. In addition to the audio data, each audio file contains timing and other metadata, which are used to synchronize the audio and events during playback. Recordings captured at different security levels are each stored as separate files.

The MVIS performs Built-In Test (BIT) functions, including Startup BIT (SBIT), Initiated BIT (IBIT) and Continuous BIT (CBIT) for the Record/Playback subsystem and makes the results of these tests available as part of the overall system BIT results. BIT result logging, reporting and status is available via the RESTful API used for the MC-MVIS control and status interface.

The MVIS architecture is based on AoIP protocol, utilizing 24-bit CODECs sampling at 48 KHz with growth capability up to 192 KHz. This high resolution and high sampling rate conversion provides high fidelity audio for uncompressed types of audio. Intercom and Radio analog audio is converted to 48 kHz, 24-bit at the positions and gateways. VoIP channels will be transported on the AoIP networks as they flow through the system between the Call Manager (either external or integrated) and position equipment, to the headset, with 20 KHz audio bandwidth.

The mission position equipment is designed with a key pad to support VoIP calling as well as common phone features such as Call, Answer, Hold, Speed Dial, Call Forward, etc. The VoIP call will be originated at the position and routed as directed by the VoIP Call Manager. The MVIS incorporates Standard SIP and Secure SIP (e.g. Real Time Protocol (RTP), Secure Real Time Protocol (SRTP), User Datagram Protocol (UDP), and Internet Protocol Security (IPSec)); AS-SIP with essential DoD features, Multi-Level Precedence and Preemption (MLPP) (e.g. Communications resource priorities for SIP (RFC 4412), precedence and Preemption assuring end-to-end communications connectivity, and MLPP Authentication and Authorization; Secure Real-Time Transport Protocol (SRTP) (e.g. enables encrypted communications); Transport Layer Security (TLS) (e.g. enables encrypted communications); and other protocols (e.g. Internet Control Message Protocol (ICMP) for unicast and Internet Group Management Protocol (IGMP) for multicast).

The MVIS supports Normal, backup, and emergency modes. When the MVIS is powered on, it starts in Emergency mode, after all the units complete their power up processes, the system automatically switches to Normal mode and full MVIS functionality is available. When the MVIS powers up, the operator will have emergency radios and CALL NET connectivity within approximately 1 second and be fully operational in less than 3 minutes (typically within 30 seconds).

The MVIS will support three modes of operation to allow for "graceful" degradation in case of failure in the MVIS, aircraft power or other aircraft failure. With Normal Mode, the MVIS is operating without issues, the gateway and the position equipment are all running normally. In Backup Mode, the gateway is not responding and the positions are not able to connect to the radios connected to the gateway. This mode can be caused by MVIS network failure or power to the gateway. The crew positions will be limited to the backup radios and CALL-NET that are hard-wired to the POD. Current design supports two backup channels for radios and a CALL-NET on each position. Each position can be connected to different radios, enabling backup communication to multiple radios. With Emergency Mode, the position unit processor is not responding. In this mode the assets available for communication as well as the volume controls are fixed by hardware circuitry. The position unit would provide connectivity to the backup radios and CALL-NET using hardware support. This mode provides limited capabilities and is independent of the position unit software/firmware.

In addition, the crew positions provide manual capability to select between Normal, Backup and Emergency modes, this feature is mostly used to force a specific mode of operation as a manual override, or for testing purposes. When the system automatically enters backup or emergency mode, the crew position will automatically switch to the relevant mode and it will be indicated by the LEDs next to the state switch (the physical switch stays in Normal mode).

The ability to have radios connected to the crew position equipment in Backup mode removes the need for the Radio Access Panel unit (RAP). The RAP's primary purpose is for selection of Backup and Emergency radios. In the proposed Palomar MVIS solution, the Backup and Emergency modes allow the operator to have transmit and receive access to the radios that are hardwired to their position, as well as access to CALL-NET, maintenance net, public address, cabin alerts and chimes. The hardwiring is done in high impedance mode to allow the position and the gateway to share the radio. Any radio can be a Backup/Emergency radio allowing for a scheme to mitigate Mission Critical failure modes. Transmit and Receive access to Backup/Emergency radios and CALL-NET can be accessed within 1 second of power up.

Spatial or 3D audio allows for the separation of audio in different direction to enhance the audio experience and increase situational awareness of the crew in the flight deck or mission area. Audio channels are allocated to a specific spatial location prior to the mission and remain static for the mission duration. Dynamic allocation of channels can be available if this is, and will necessitate an external interface to provide spatial positioning data. The spatial audio configuration allows the crew to define where specific audio will be allocated to provide the desired spatial separation. The 3D audio algorithm processes audio based on the configuration, allowing it to properly place it on the horizontal plane as well as above or below the pilot.

The 3D audio model makes audio presented through the headset appear as if it is originating outside of the listener's head, and coming from a direction that can be set and manipulated by the 3D audio system. The 3D audio system provides spatial separation of communication channels. Humans are capable of processing more information, across multiple channels, if the audio appears to be coming from distinctly different directions. Further, direction audio channels are provided by selecting the direction of the audio channel, the associated audio will come from the direction selected, enhancing situational awareness without any additional cognitive burden to the pilot. Directional warning systems are provided for warning signals that correspond to a specific location or direction. It is helpful to make auditory warning signals appear to originate from the corresponding direction. For instance, the Missile Threat warnings are responded more intuitively if the warning sound appears to be coming from the direction of the approaching missile. A dynamic 3D audio system enables sound sources stay in the same position relative to the earth, regardless of the pilot's movements. A sound source placed exactly in the north will always sound from the north regardless of the pilot's head movement. This requires aircraft heading and head tracking data to be supplied via Ethernet and is especially useful for spatial warning like a Missile Threat signal. Different people have different physiological features (for example: distance between ears; which has a direct correlation to the function of hearing) and it is therefore beneficial to select from a set of predefined head related transfer function (HRTF) values that provides the best performance for an individual pilot.

The Active Noise Reduction (ANR) feature is a capability acting on microphone input data. In almost any audio communication, the microphone not only picks up the signal of interest, but also picks up noise that lowers the quality of the signal of interest (audio communication) for the user. Most speech enhancement techniques rely on being able to estimate noise spectrum, which becomes difficult when the noise sources are nonstationary. Nonstationary characteristics are problematic because quite often speech distortions can be introduced when the estimation of the noise spectrum is inaccurate. The ANR solution involves a Spectral Noise Reduction system where the speech enhancement algorithm is performed in the frequency domain. A block of time domain sampled data is required for processing the noisy speech. The delay introduced into the system by the noise reduction depends on sampling rate and is measured in milliseconds, essentially transparent to the user. The noise reduction algorithm estimates noise spectrum, from the a-posteriori SNR ratio, the a-priori SNR and the probability of speech presence are used to determine the frequency-dependent gain for attenuating the noise components.

In order to support changes to the Gateway and Position configuration, the MVIS can be provisioned with a dedicated setup tool called System Configuration Tool (SCT). The SCT supports different levels of access including operator level, admin level and technician level. Each level provides different capabilities that are not exposed to lower level user. The SCT supports COMM plan changes and configurations such as: user access to security levels, control access to specific assets, organization of assets across pages, general panel functionality, and import and export user presets (such as side-tone volume, Spatial Audio configuration and volume levels).

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

Illustrative embodiments have been described, hereinabove. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An intercommunication system, comprising:
an interface unit coupled to a baseband audio source and communicatively coupled to a network, the interface unit configured to provide a network interface to the baseband audio source;
a record/playback unit having a storage device and communicatively coupled to the network, the record/playback unit configured to capture audio on the network for storage on the storage device and playback audio stored on the storage device to the network; and
a digital crew unit coupled to at least one of an audio input device or an audio output device, the digital crew unit having a user interface and being communicatively coupled to the network, the digital crew unit configured to transmit audio captured by the at least one audio input device via the network or to receive audio from the network for output via the at least one audio output device,
wherein each of the interface unit, the record/playback unit, and the digital crew unit is configured to at least one of transmit or receive an audio stream multicasted via the network, and
wherein each unit of the interface unit, the digital crew unit, and the record/playback unit include:
a processor;
a communication interface to communicatively couple the unit to the network; and
a component interface to couple the unit to a peripheral device.

2. The system of claim 1, further comprising a plurality of units interconnected via the network, wherein the plurality of units includes at least the interface unit, the record/playback unit, and the digital crew unit.

3. The system of claim 2, wherein the plurality of units is scalable through addition of one or more units, wherein the one or more units include at least one of a second interface unit, a second record/playback unit, or a second digital crew unit.

4. The system of claim 1, wherein the interface unit, the record/playback unit, and the digital crew unit collectively operate to implement a plurality of channels on the intercommunication system.

5. The system of claim 4, wherein a total number of supportable channels is proportional to a capacity of the network.

6. The system of claim 1, wherein the audio stream is a stream of network packets converted from digitized audio.

7. The system of claim 1, wherein at least one of the interface unit, the record/playback unit, and the digital crew unit are configured to advertise the audio stream via a session announcement protocol, to describe the audio stream via a session description protocol, and to transport the audio stream via the network using a real time protocol.

8. The system of claim 7, wherein the at least one of the interface unit the record/playback unit, and the digital crew unit is configured to control transport of the audio stream via the network via corresponding control channel utilizing a real time control protocol.

9. The system of claim 1, wherein the source includes at least one of a radio source, a baseband audio source, a public address system, a cockpit voice recorder, or a warning system.

10. The system of claim 1, wherein the digital crew unit includes an interface for the at least one of the audio input device or the audio output device.

11. The system of claim 10, wherein the audio input device includes at least one of a microphone or a headset, and the audio output device includes at least one of the headset or a speaker.

12. The system of claim 1, further comprising a plurality of digital crew units, wherein each digital crew unit of the plurality of digital crew units is associated with a different crew position within a craft.

13. The system of claim 1, further comprising a plurality of interface units, wherein each interface unit of the plurality of interface units is coupled to a baseband audio source available within a craft.

14. The system of claim 1, wherein the interface unit is coupled to a plurality of sources and provides access to the network for the plurality of sources.

15. The system of claim 1, wherein the record/playback unit is configured to receive the audio stream from at least one of the interface unit or the digital crew unit, store the audio stream received in the storage device, and transmit a stored audio stream to at least one of the interface unit or the digital crew unit for playback.

16. The system of claim 1, wherein the network is configured to route packets associated with the audio stream to nodes subscribed to receive the audio stream.

17. The system of claim 1, wherein the peripheral device is the baseband audio source for the interface unit, the storage device for the record/playback unit, and the at least one of the audio input device or audio output device for the digital crew unit.

18. The system of claim 1, wherein the digital crew unit further comprising a user interface for at least one of display of available audio streams or selection of one or more of the available audio streams to monitor.

19. The system of claim 1, wherein the audio stream includes audio encoded using a 24-bit linear pulse-code modulation, encapsulated in a user datagram protocol datagram, and appended with an internet protocol header.

* * * * *